United States Patent [19]
Shigematsu et al.

[11] Patent Number: 5,721,635
[45] Date of Patent: Feb. 24, 1998

[54] OPTICAL FIBER AMPLIFIER AND OPTICAL AMPLIFIER REPEATER

[75] Inventors: Masayuki Shigematsu; Koji Nakazato; Tomonori Kashiwada; Masayuki Nishimura, all of Yokohama, Japan

[73] Assignee: Sumitomo Electric Industries, Ltd., Osaka, Japan

[21] Appl. No.: 562,631

[22] Filed: Nov. 24, 1995

Related U.S. Application Data

[63] Continuation-in-part of Ser. No. 346,256, Nov. 23, 1994, Pat. No. 5,532,870.

Foreign Application Priority Data

| Nov. 24, 1993 | [JP] | Japan | 5-293440 |
| Nov. 25, 1994 | [JP] | Japan | 6-291625 |
| Feb. 24, 1995 | [JP] | Japan | 7-036902 |

[51] Int. Cl.[6] ............................................. H01S 3/00
[52] U.S. Cl. .................................... 359/341; 359/160
[58] Field of Search ............................ 359/341, 160

[56] References Cited

U.S. PATENT DOCUMENTS

| 5,050,949 | 9/1991 | DiGiovanni et al. | 359/341 |
| 5,111,334 | 5/1992 | Heidemann | 359/341 |
| 5,115,338 | 5/1992 | DiGiovanni et al. | 359/337 |
| 5,131,069 | 7/1992 | Hall et al. | |
| 5,185,814 | 2/1993 | Healey | 385/24 |
| 5,392,153 | 2/1995 | Delavaux | 359/341 |
| 5,430,572 | 7/1995 | DiGiovanni et al. | 359/341 |

FOREIGN PATENT DOCUMENTS

| 440024 | 8/1991 | European Pat. Off. |
| 463771 | 1/1992 | European Pat. Off. |

OTHER PUBLICATIONS

Hansen et al, "Gain Tilt of Erbium–Doped Fiber Amplifiers Due to Signal–Induced Inversion Locking", IEEE Photonics Technology Letters, vol. 4, No. 4, Apr. 1993, pp. 409–411.

Kashiwada et al, "Spectral Gain Behavior of Er–Doped Fiber With Extremely High Aluminum Concentration", pp. 104–107.

Atkins et al, "High–Gain, Broad Spectral Bandwidth Erbium–Doped Fibre Amplifier Pumped Near 1.5μm", Electronics Letters, vol. 25, No. 14, Jul. 1989, pp. 910–911.

Hall et al, "Gain Spectra and Amplifier Enhancement", OFC '94 Technical Digest, Friday Morning, pp. 270–271.

Shigematsu et al, "Distortion–Free Optical Fiber Amplifier for Analog Transmission Based on Hybrid Erbium–Doped Fiber Configuration" Affiliated with Sumitomo Electric Industries, Ltd.

Kashiwada et al, "Gain Flattened Optical Fiber Amplifiers for WDM Transmission Employing Hybrid Erbium–Doped Fiber Configuration", Affiliated with Sumitomo Electric Industries, Ltd.

Kuo et al, "Low Distortion Amplifier Analog CATV Transport System", AT&T Bell Laboratories, Breinigsville, PA 18031, pp. 340–342.

Chraplyvy et al, "End–to–End Equalization Experiments in Amplified WDM Lightwave Systems", IEEE Photonics Technology Letters, vol. 4, No. 4, Apr. 1993, pp. 428–429.

(List continued on next page.)

*Primary Examiner*—Mark Hellner
*Attorney, Agent, or Firm*—Cushman Darby & Cushman IP Group of Pillsbury Madison & Sutro LLP

[57] ABSTRACT

This method comprises the steps of: introducing light signals having different wavelengths into an optical amplifier, wherein the optical amplifier has a plurality of fibers with rare earth element doped therein and P is selectively doped in said fibers; and introducing excitation light into the fibers, the excitation light being able to excite the rare earth element. At least one of the fibers has Al therein and the relationship between the Al and P concentration satisfies following expression: $C(P)/C(Al) > 2$, where, $C(P)$ is P concentration in the fiber, and $C(Al)$ is Al concentration in the fiber.

7 Claims, 34 Drawing Sheets

OTHER PUBLICATIONS

Toba et al, "A 100–Channel Optical FDM Six–Stage In–Line Amplifier System Employing Tunable Gain Equalizers", IEEE Photonics Technology Letters, vol. 5, No. 2, Feb. 1993, pp. 248–251.

Marcerou et al, "Basic Comparison Between Fluoride– and Silica–Doped Fiber Amplifiers in the 1550nm Region", MoA2.3, pp. 53–56.

Goldstein et al, "Inhomogeneously Broadened Fiber–Amplifier Cascade for Wavelength–Multiplexed Systems", pp. 45–48.

Eskildsen et al., Optical Power Equalization for Multiwavelength Fiber–Amplifier Cascades Using Periodic Inhomogeneous Broadening, IEEE Photonics Technology Letters, 5 (1993), Oct., vol. 5, No. 10, pp. 1188–1190.

Willner et al.,Passive Equalization of Nonuniform EDFA Gain by Optical Filtering for Megameter Transmission of 20 WDM Channels Through a Cascade of EDFA's,IEEE Photonics Technology Letters,4 (1993) Sep.,vol. 5,No. 9. pp. 1023–1026.

---- : COMPOSITE OPTICAL FIBER 140

——— : COMPOSITE OPTICAL FIBER 130

—·— : OPTICAL FIBER 131

— — — : OPTICAL FIBER 132

Fig. 33
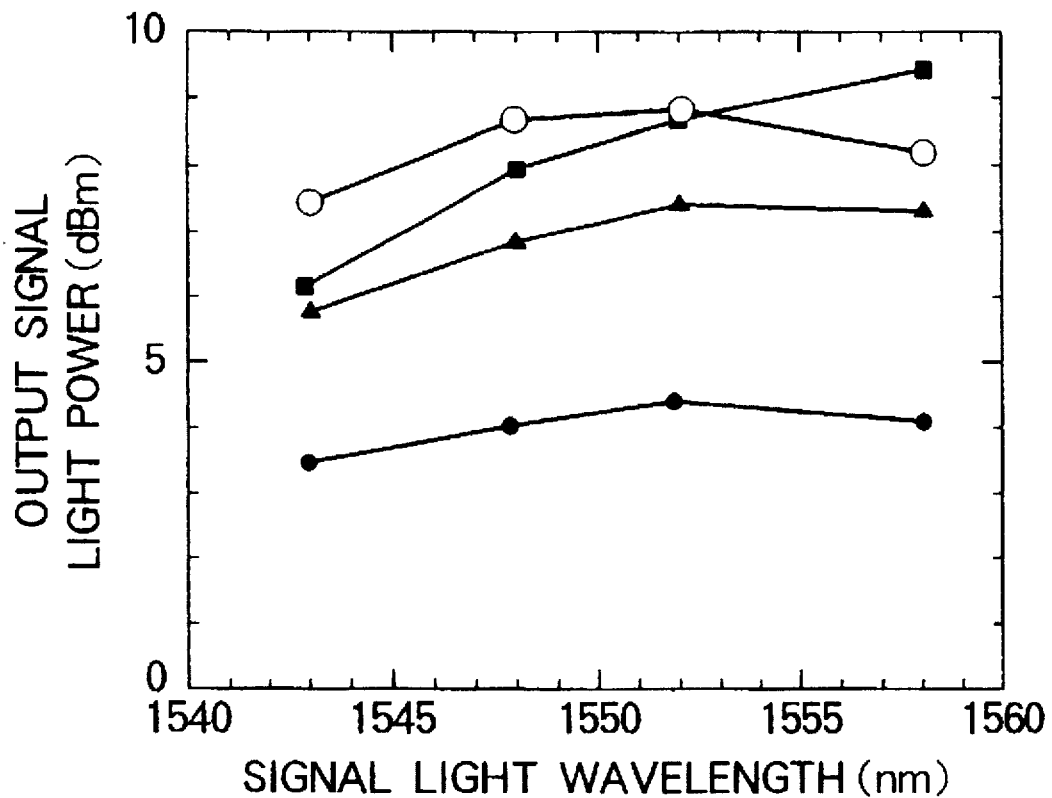
Al1.4wt%-CODOPED EDF (16m)
+
P5wt%-Al1wt%-CODOPED EDF (9m)
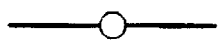
Al1.4wt%-CODOPED EDF
●— 13m
▲— 16m
■— 22m Al-P-NONDOPED EDF
—◯— 100m Al1.4wt%-CODOPED EDF
—●— 10m
—▲— 16m
—■— 22m P5wt%-Al1wt%-CODOPED EDF
- 6m
- 11m
- 22m Al-P-NONDOPED EDF
- 100m

OPTICAL FIBER AMPLIFIER AND OPTICAL AMPLIFIER REPEATER

This is a continuation in part of Ser. No. 08/346,256 now U.S. Pat. No. 5,532,870.

BACKGROUND OF THE INVENTION

1. Field of the Invention

The present invention relates to an optical fiber amplifier to be utilized in optical communication systems which perform wavelength division multiplexing transmission or optical analog transmission, and to an optical amplifier repeater to be utilized in optical communication lines relayed in multistage.

2. Related Background Art

Optical fiber amplifiers to which dynamic energy is supplied in the form of light which amplify input signal light and emitting the amplified light are mainly used in optical communication systems. Especially, an optical fiber amplifier using an optical fiber in which a rare earth element such as Er is doped is superior in high gain and low noise, and utilized in various ways.

In such optical fiber amplifiers, it is known that the gain of the rare-earth-doped optical fiber is wavelength dependent. In particular, in analog optical transmission, the wavelength dependency of the gain hinders precise amplification of signal light combined with laser chirping used as a transmitter. In order to improve this point, several attempts have been made to reduce the wavelength dependence.

The first example of these attempts is a technique to reduce the wavelength dependency of the gain by co-doping Al in an amplifying Er-doped optical fiber. This technique is reported, e.g., in "C. G. Atkins et al., Electron. Lett., Vol. 14, 1989, pp1062-1064". The second example of an attempt to reduce the wavelength dependency is a technique of shortening the amplifying Er-doped optical fiber. This technique is reported, e.g., in "S. L. Hansen et al., IEEE Photon. Technol. Lett., Vol. 4, No. 4, 1993, pp409-411".

In long-distance digital optical transmission, an optical amplifier repeater formed of an optical fiber amplifier is used to construct a multistage transmission line in order to compensate for optical loss due to transmitting optical fibers. In optical amplifier repeaters, signal light is amplified with the optical fiber amplifier but in this optical amplifier repeater, when the signal light is amplified, noise components distributed in a relatively wide wavelength range including a wavelength at a gain peak are added to signal components with transmission wavelengths of signal light. Here, when the wavelength of the signal light substantially matches with the wavelength at the gain peak of the optical amplifier repeater, the signal components are amplified by a higher amplification factor than the noise components. Consequently, discrimination of signal components and noise components is easy even in the transmission line in which the optical amplifier repeaters comprising the same kind of the optical fiber amplifiers are arranged in multistage.

On the other hand, when the transmission wavelength is different from the wavelength at the gain peak, the noise components are amplified by a higher amplification factor than the signal components. Consequently, discrimination of signal components and noise components is difficult in the transmission line in which the optical amplifier repeaters comprising the same kind of the optical fiber amplifiers are arranged in multistage. Therefore, in the optical communication line in which a plurality of optical transmission lines are connected in multistage through the optical amplifier repeaters to relay and amplify the signal light, the transmitted signal is limited substantially to an optical signal with a single wavelength, and light with a wavelength at the gain peak of the optical amplifier repeater should be employed as the wavelength of the signal light.

The wavelength dependency of the gain in the gain operation of the amplifying rare-earth-doped optical fiber depends on the glass composition of the core and the type of rare earth element to be doped. Accordingly, there is a limit on how much the wavelength dependency of the gain can be decreased by co-doping Al in high concentration or by shortening the amplifying optical fiber, and there is also a limit on the wavelength range over which the wavelength dependency can be reduced (T. Kashiwada et al., OAA '93, MA6). Shortening the amplifying optical fiber, also raises a problem in that sufficient gain cannot be attained.

As a countermeasure for these problems, a passive component (e.g., an optical filter) which has wavelength dependent of insertion loss to cancel out the wavelength dependency of the gain of the optical fiber amplifier is placed at an output of the optical fiber amplifier. However, with this countermeasure, the loss medium is present, which causes a degradation of the energy efficiency in amplification and which ultimately finally causes the amplification efficiency to be degraded.

In the optical communication line in which the optical amplifier repeaters are arranged in multistage, generally, the transmission loss between each of the adjacent optical amplifier repeaters is different because the distance between each of the adjacent optical amplifier repeaters is different.

In the amplification operation of amplifying rare-earth-doped optical fibers, the wavelength at the gain peak is varied depending on the intensity of the input light to be amplified. Consequently, in order to make the wavelength at the gain peak of every optical amplifier repeater substantially the same, the wavelength at the gain peak needs to be adjusted for every optical amplifier repeater, or the transmission loss between each of the optical amplifier repeaters needs to be fixed. However, the latter has problems that there is a limit on installation of transmitting optical fibers and that large energy for amplification is needed over the communication line.

As the former method, that is, the method to adjust the wavelength at the gain peak of every optical amplifier repeater, (1) adjusting the length of the amplifying optical fiber, and (2) adjusting the composition of the amplifying optical fiber by co-doping Al are known; however, there is a problem in the method (1) in that shortening the optical fiber causes a degradation of the gain and that lengthening the optical fiber causes a degradation of the noise characteristics. Consequently, it is difficult to independently control the wavelength at the gain peak. The method (2) can control the wavelength at the gain peak without damaging another properties; however, as shown in FIG. 1, the wavelength at the gain peak is sharply varied at 0–0.5 wt % of the Al-codoped concentration, which causes a problem that precisely adjusting the wavelength at the gain peak is difficult during the manufacturing process. Note that when a plurality of the compositions in which the optical amplifier repeater is placed in the latter stage of the communication line are connected in series, the span loss and the relay amplification are sufficiently stable in the latter, and that FIG. 1 shows a relation between the span loss and the wavelength at the gain peak in this stable condition.

SUMMARY OF THE INVENTION

It is an object of the present invention to provide an optical fiber amplifier which reduces wavelength dependency of gain in various wavelength ranges in wavelength division multiplexing transmission or in optical analog transmission, and which maintains an energy efficiency for amplification.

It is also an object of the present invention to provide an optical amplifier repeater comprising an optical fiber amplifier which makes a wavelength at a gain peak to a predetermined one in accordance with intensities of various input lights.

A first type optical fiber amplifier of the present invention is an optical fiber amplifier for amplifying a wavelength-multiplexed optical signal carrying information for each wavelength and including a composite optical fiber for receiving signal light and excitation light, amplifying the signal light. The composite optical fiber includes and emitting the amplified signal light, a plurality of serially coupled optical fibers having different compositions in which a rare earth element is doped. An excitation device is provided for generating the excitation light and supplying the excitation light to the composite optical fiber. For light having a plurality of wavelengths and carrying information with the optical signal, a difference of gains of the optical fiber amplifier due to a difference of wavelengths is less than 1 dB.

Here, a composition of each optical fiber of the plurality of the optical fibers is determined in accordance with wavelength dependency of gain measured by simultaneously amplifying lights with a plurality of wavelengths to be simultaneously transmitted to each optical fiber having the same composition as each of the optical fibers.

The excitation device can include an excitation light source for generating excitation light, and a directional coupler for receiving excitation light emitted from the excitation light source at a first terminal, and receiving one of the input signal light and light emerging from the composite optical fiber at a second terminal and emitting the excitation light to the composite optical fiber. The rare earth element in the composite optical fiber is excited by forward pumping, backward pumping or bidirectional pumping.

The rare earth element is preferably Er. Here, a difference of compositions of the plurality of the optical fibers is a difference of one of $Al_2O_3$ concentrations, $P_2O_5$ concentrations, Er doping concentrations, included in each optical fiber, and a combination of these concentrations.

A difference between a maximum gain and a minimum gain of the composite optical fiber in a predetermined wavelength range is smaller than a difference between a maximum gain and a minimum gain in the predetermined wavelength when each of the plurality of the optical fibers has the same effective length as the composite optical fiber and receives the same excitation light as the composite optical fiber.

Further, the composite optical fiber can include (1) a first optical fiber for receiving and amplifying light in the predetermined wavelength range, a ratio of gain at a predetermined wavelength to a differential coefficient relative to a variation of gain corresponding to a variation of a gain wavelength in the predetermined wavelength being a first value, and (2) a second optical fiber for receiving and amplifying light emerging from the first optical fiber, a ratio of gain at the predetermined wavelength to a differential coefficient relative to a variation of gain corresponding to a variation of a gain wavelength in the predetermined wavelength having an opposite sign and substantially the same absolute value as the first value.

A second type optical fiber amplifier of the present invention is an optical fiber amplifier for amplifying an optical analog signal carrying information with an intensity every moment. This optical fiber amplifier includes (a) a composite optical fiber for receiving signal light and excitation light, amplifying the signal light, and emitting the amplified signal light. The composite optical fiber includes a plurality of serially coupled optical fibers having different compositions in which a rare earth element is doped. The optical fiber amplifier further includes an excitation device for generating excitation light and supplying excitation light to the composite optical fiber, and a rate of change of gain of the optical fiber amplifier due to a variation of a wavelength is below 0.2 dB/nm for a plurality of wavelength components of the optical signal.

Here, a composition of each optical fiber of the plurality of the optical fibers is determined in accordance with wavelength dependency of gain measured as gain relative to a small signal while each of the optical fibers maintains a saturation region.

Further, the excitation device can include (a) an excitation light source for generating excitation light, and (b) a directional coupler for receiving excitation light emitted from the excitation light source at a first terminal, and receiving one of an input signal light and light emerging from the composite optical fiber at a second terminal and emitting the excitation light to the composite optical fiber. A rare earth element in the composite optical fiber is excited by forward pumping, backward pumping and bidirectional pumping.

The rare earth element is preferably Er. Here, a difference in compositions of the plurality of optical fibers is a difference of one of $Al_2O_3$ concentrations, $P_2O_5$ concentrations, Er doping concentrations, included in each optical fiber, and a combination of these concentrations.

A difference between a maximum gain and a minimum gain of the composite optical fiber in a predetermined wavelength range is smaller than a difference between a maximum gain and a minimum gain in the predetermined wavelength when each of the plurality of the optical fibers has the same effective length as the composite optical fiber and receives the same excitation light as the composite optical fiber.

Further, the composite optical fiber can include (1) a first optical fiber for receiving and amplifying light in the predetermined wavelength range, a ratio of gain at a predetermined wavelength to a differential coefficient relative to a variation of gain corresponding to a variation of a gain wavelength in the predetermined wavelength being a first value, and (2) a second optical fiber for receiving and amplifying light emerging from the first optical fiber, a ratio of gain at the predetermined wavelength to a differential coefficient relative to a variation of gain corresponding to a variation of a gain wavelength in the predetermined wavelength having an opposite sign and substantially the same absolute value as the first value.

A third type optical fiber amplifier of the present invention is an optical amplifier for amplifying an optical analog signal with a plurality of wavelength components carrying information with an intensity every moment for each wavelength. This amplifier includes (a) a composite optical fiber for receiving signal light and excitation light, amplifying the signal light, and emitting the amplified signal light. The composite optical fiber includes a plurality of serially coupled optical fibers having different compositions in which a rare earth element is doped, and (b) an excitation device for generating the excitation light and supplying the excitation light to the composite optical fiber. A rate of change of gain of the optical fiber amplifier due to a variation of a wavelength is below 0.2 dB/nm for a plurality of wavelength components of the optical signal.

Here, a composition of each optical fiber of the plurality of the optical fibers is determined in accordance with wavelength dependency of gain measured as gain relative to a small signal while each of the optical fibers maintains a saturation region.

Further, the excitation device can include (a) an excitation light source for generating excitation light, and (b) a directional coupler for receiving excitation light emitted from the excitation light source at a first terminal, and receiving one of the input signal light and light emerging from the composite optical fiber at a second terminal. The excitation device emits excitation light to the composite optical fiber, and the rare earth element in the composite optical fiber is excited by forward pumping, backward pumping and bidirectional pumping.

The rare earth element is preferably Er. Here, a difference in compositions of the plurality of the optical fibers is a difference in one of the $Al_2O_3$ concentrations, $P_2O_5$ concentrations, and Er doping concentrations, included in each optical fiber, and a combination of these concentrations.

A difference between a maximum gain and a minimum gain of the composite optical fiber in a predetermined wavelength range is smaller than a difference between a maximum gain and a minimum gain in the predetermined wavelength when each of the plurality of the optical fibers has the same effective length as the composite optical fiber and receives the same excitation light as the composite optical fiber.

Further, the composite optical fiber can include (1) a first optical fiber for receiving and amplifying light in the predetermined wavelength range, a ratio of gain at a predetermined wavelength to a differential coefficient relative to a variation of gain corresponding to a variation of a gain wavelength in the predetermined wavelength being a first value, and (2) a second optical fiber for receiving and amplifying light emerging from the first optical fiber, a ratio of gain at the predetermined wavelength to a differential coefficient relative to a variation of gain corresponding to a variation of a gain wavelength in the predetermined wavelength having an opposite sign and substantially the same absolute value as the first value.

A fourth type optical fiber amplifier of the present invention includes (a) a composite optical fiber for receiving signal light and excitation light, amplifying the signal light, and emitting the amplified signal light. The composite optical fiber includes a plurality of serially coupled optical fibers having different compositions in which a rare earth element is doped, a relation between an intensity of input signal light and a wavelength at which gain is the largest being different from a relation between an intensity of input signal light and gain when each of the plurality of the optical fibers has the same effective length as the composite optical fiber and receives the same excitation light as the composite optical fiber. The optical fiber amplifier further includes an excitation device for generating excitation light and supplying the excitation light to the composite optical fiber. A rate of change of a gain of the optical fiber amplifier due to a variation of a wavelength is below 0.2 dB/nm for a plurality of wavelength components of the optical signal.

Here, the excitation device can include an excitation light source for generating excitation light, and a directional coupler for receiving excitation light emitted from the excitation light source at a first terminal, and receiving one of the input signal light and light emerging from the composite optical fiber at a second terminal and emitting the excitation light to the composite optical fiber. The rare earth element in the composite optical fiber is excited by forward pumping, backward pumping and bidirectional pumping.

The rare earth element is preferably Er. Here, a difference in composition of the plurality of the optical fibers is a difference of one of $Al_2O_3$ concentrations, $P_2O_5$ concentrations, Er doping concentrations, included in each optical fiber, and a combination of these concentrations.

Further, the composite optical fiber can include (1) a first optical fiber for receiving signal light having a wavelength in a predetermined wavelength range and excitation light and amplifying the signal light, an intensity of the signal light and a wavelength at which gain is the largest in the predetermined wavelength having a first relation, and (2) a second optical fiber for receiving and amplifying signal light having a wavelength in the wavelength range emerging from the first optical fiber and excitation light, an intensity of the signal light and a wavelength at which gain is the largest in the predetermined wavelength having a second relation different from the first relation.

An optical amplifier repeater can be constructed using the above-described optical fiber amplifiers.

FIG. 2 is a conceptional view of an optical fiber amplifier of the present invention. As shown in FIG. 2, the optical fiber amplifier of the present invention includes a composite optical fiber in which a plurality of at least two kinds of amplifying rare-earth-doped optical fibers with different glass compositions are connected in series, and an excitation device for supplying energy for amplification in a form of excitation light to the composite optical fiber. Here, either forward pumping, backward pumping, or bidirectional pumping can be employed by the excitation device.

When light with assumed intensity ($I_0$) is incident on the optical fiber amplifier with the above configuration, assuming the gain of each optical fiber is $g_i(\lambda)$, the gain $g(\lambda)$ of the whole optical fiber amplifier is expressed by the following equation.

$$g(\lambda) = \prod_i g_i(\lambda) \tag{1}$$

Consequently, the wavelength dependency $dg(\lambda)/d\lambda$ of the gain $g(\lambda)$ of the whole optical fiber amplifier is expressed by the following equation.

$$\frac{dg(\lambda)}{d\lambda} = \sum_i \left( \frac{dg_i(\lambda)}{d\lambda} \cdot \frac{g(\lambda)}{g_i(\lambda)} \right) \tag{2}$$

$$= g(\lambda) \sum_i \left( \left( \frac{dg_i(\lambda)}{d\lambda} \right) / g_i(\lambda) \right)$$

As shown in the above, the wavelength dependency $dg_i(\lambda)/d\lambda$ of each amplifying optical fiber can be adjusted by controlling the co-doping concentration such as Al, and the gain of each amplifying optical fiber can be adjusted by controlling its length so that the noise property is not degraded or by controlling the rare earth element concentration to be doped. Therefore, if both the composition and the length of each amplifying optical fiber are adjusted, an optical fiber amplifier in which the wavelength dependency of gain is reduced in a predetermined wavelength range, and an optical fiber amplifier in which a predetermined wavelength at a gain peak can be attained are formed in wavelength division multiplexing transmission or optical analog transmission.

Note that the wavelength dependency of the gain of the optical fiber amplifier, that is, the wavelength of the gain of each amplifying optical fiber varies in accordance with the intensity ($I_0$) of incident light. However, taking the variation of the wavelength dependency of the gain due to glass composition into consideration, to reduce the wavelength dependency, even with the optical fiber amplifier formed with the assumed specified intensity of incident light, the wavelength dependency of the gain can be reduced in the predetermined wavelength range if the intensity of incident light is not largely different from the assumed intensity of incident light. To set a predetermined wavelength at a gain peak in the optical fiber amplifier to be utilized in the optical amplifier repeater, the intensity of incident light can be preset because the transmission loss between each of the optical amplifier repeaters is known at the time the communication line is installed.

The operations of the first-third optical fiber amplifiers will be explained.

In wavelength division multiplex (WDM) transmission, the wavelength dependency of the gain when lights with a plurality of wavelengths are simultaneously amplified with an optical fiber amplifier in which a rare-earth-doped optical fiber is used (multi-wavelength amplification), is different from the wavelength dependency of the gain when light is amplified for each wavelength (single wavelength amplification). FIG. 3 is a graph showing the wavelength dependency of the gain in four-wavelength amplification and the wavelength dependency of the gain in single-wavelength amplification. As seen from FIG. 3, between the wavelength dependency of the gain in multi-wavelength amplification and the wavelength dependency of the gain in single-wavelength amplification, not only the gain is different but also the differential coefficient at each wavelength relative to a variation of a gain wavelength is different. The first type optical amplifier of the present invention is an optical fiber amplifier using a composite optical fiber in which rare-earth-doped amplifying optical fibers having at least two kinds of glass compositions with different wavelength gain dependency characteristics are connected in series, based on the evaluation of the wavelength dependency of the gain of the rare-earth-doped optical fibers having various kinds of glass compositions for multi-wavelength amplification, which is performed by the inventors. With this optical fiber amplifier, a difference of the gain relative to wavelengths of lights for wavelength division multiplex transmission may be suppressed to less than 1 dB.

Bidirectional pumping is performed with a composite optical fiber in which a plurality of rare-earth-doped optical fibers are directly coupled with each other without any inclusion, so that each rare-earth-doped optical fiber can be sufficiently excited, and the noise factor can excellently be maintained while the amplifying efficiency is maintained. If a filter, an isolator, or a coupler is provided between each of the rare-earth-doped optical fibers, the amplifying efficiency will be degraded only with the excitation light supplied from the both ends of the composite optical fiber.

In analog transmission, an amplitude of transmitted light is varied constantly. In this case, it has been known that the wavelength dependency of the gain of an optical fiber amplifier using a rare-earth-doped optical fiber is different from the wavelength dependency of the gain for continuous light having substantially constant intensity (S. L. Hansen, et al., IEEE Photon. Technol. Lett. Vol. 4, No. 4, 1993, pp409–411). On the other hand, in single light analog transmission, an optical signal has a wavelength distribution in a small region when a laser diode used as a transmitter is directly modulated. The second type optical fiber amplifier of the present invention is an optical fiber amplifier using a composite optical fiber in which rare-earth-doped amplifying optical fibers having at least two kinds of glass compositions with different wavelength gain dependency are connected in series, based on the evaluation of the wavelength dependency of the gain of the rare-earth-doped optical fibers having various kinds of glass compositions for small signals while the optical fibers maintain the saturation region (Locked-Inversion (LI)), which is performed by the inventors. In this optical fiber amplifier, a rate of change of the gain of the optical fiber amplifier due to a variation of a wavelength is suppressed to below 0.2 dB/nm.

The third type optical fiber amplifier of the present invention is based on the same knowledge as the second type optical fiber amplifier of the present invention, and a rate of change of the gain of the optical fiber amplifier due to a variation of a wavelength is suppressed to below 0.2 dB/nm for each wavelength in the wavelength division multiplex transmission.

Further, the optical amplifier has a plurality of fibers with rare earth element doped therein and P is selectively doped in the fibers. At least one of the fibers has Al therein that the relationship between the Al and P concentration satisfies following expression: $C(P)/C(Al)>2$, where $C(P)$ is the P concentration in the fiber, and $C(Al)$ is the Al concentration in the fiber.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

FIG. 33 is a graph showing power of output signal light of the optical amplifier repeater in the seventh embodiment of the present invention with respect to optical signal wavelength.

DETAILED DESCRIPTION OF THE PREFERRED EMBODIMENTS

Figure 1:
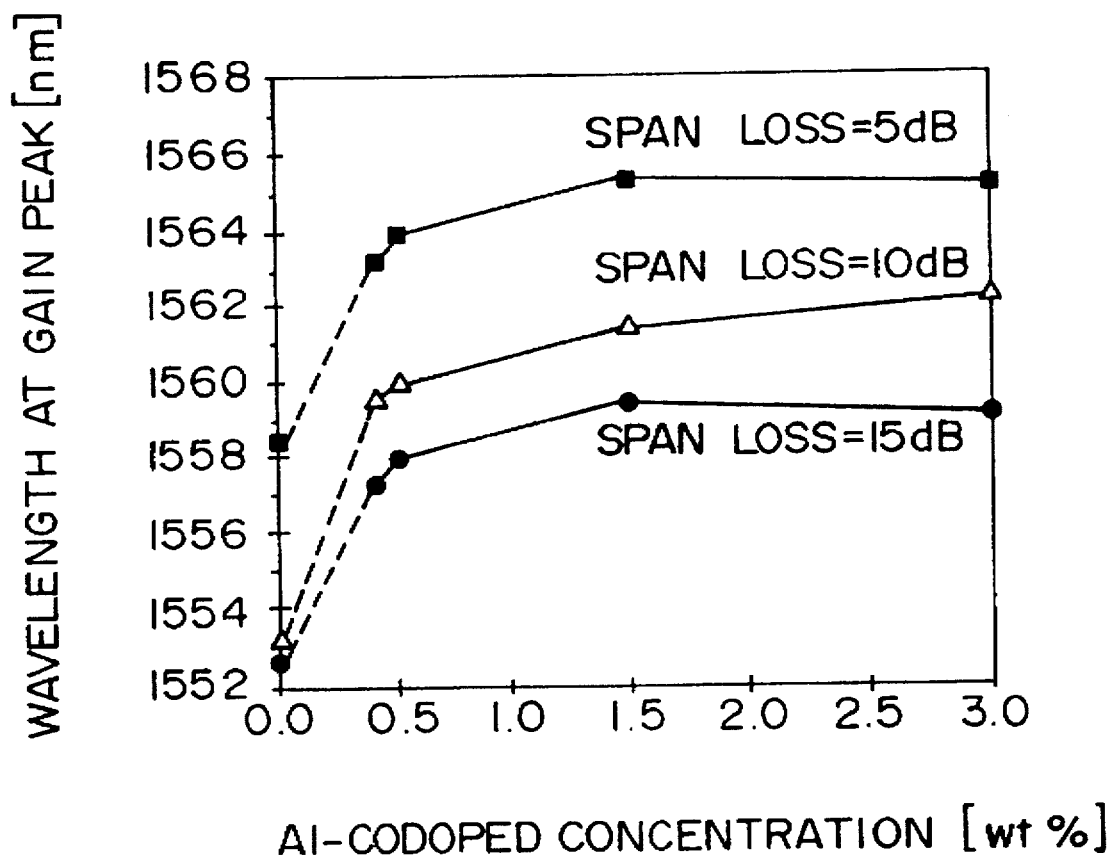
FIG. 1 is a graph showing characteristics of a conventional optical amplifier repeater.
Figure 2:
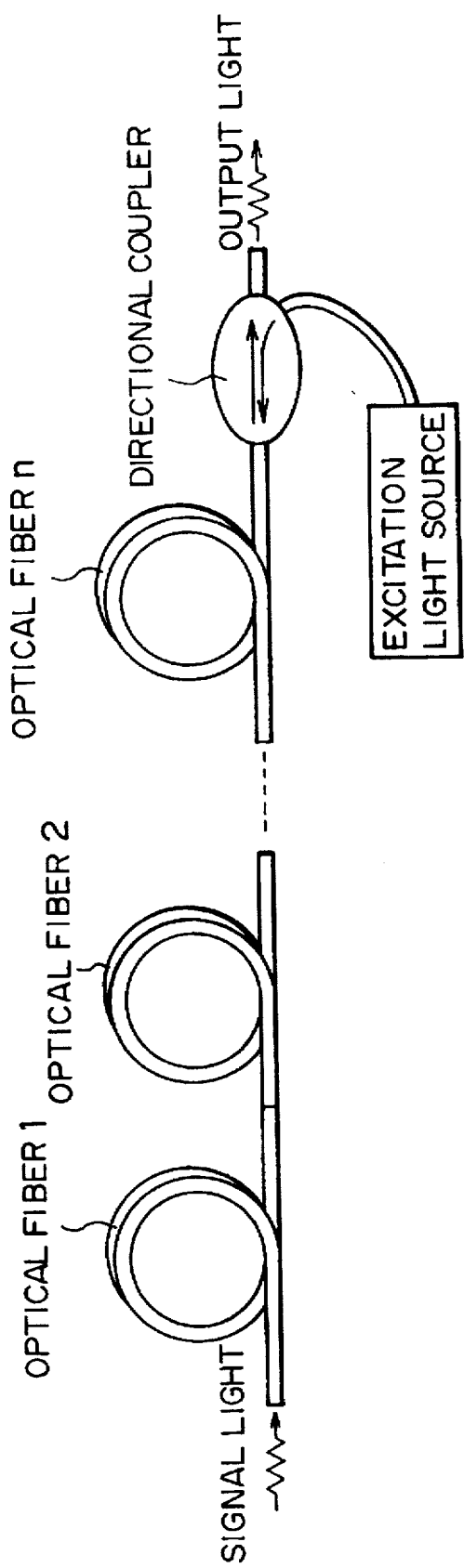
FIG. 2 is a conceptional view showing an optical fiber amplifier of the present invention.

The embodiments of the present invention will be described with reference to the accompanying drawings. In the description of drawings, the same components are represented by the same reference numerals, and repetitive descriptions of the same components have been omitted.

(First Embodiment)

Figure 4:
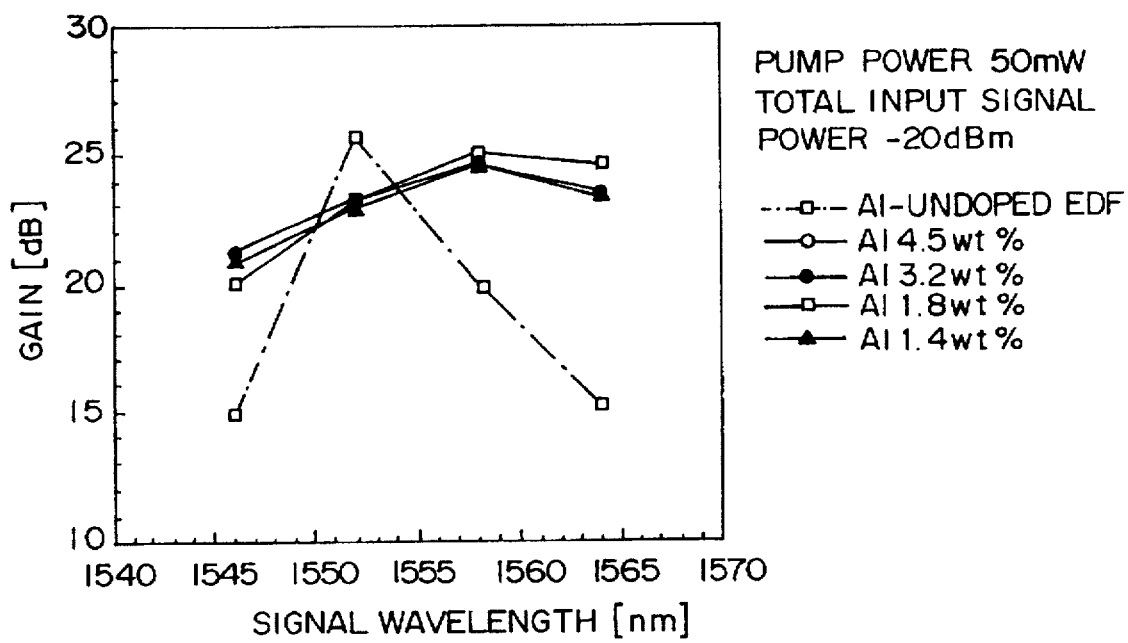
FIG. 4 is a graph showing wavelength dependency of gain of four-wavelength simultaneous amplification.

An optical fiber amplifier of the present embodiment belongs to the first type optical fiber amplifier of the present invention and it reduces the wavelength dependency of the gain in a predetermined wavelength range (1.5 µm band). Before explaining the present embodiment, however, the variation of multi-wavelength amplification properties of an Er-doped optical fiber (EDF) for multi-wavelength due to the type of dopant, the doping concentration and the change of the length of the optical fiber will be described. FIG. 4 is a graph showing the wavelength dependency of the gain of four-wavelength simultaneous amplification for five kinds of EDFs with different Al concentrations. Here, the signal wavelengths are 1546, 1552, 1558 and 1564 nm and the total intensity of the input signal lights is −14 dBm (−20 dBm/one wavelength). The Total Er loss for each EDF is adjusted so as to be constant ($\alpha_{153}$'L (length of optical fiber)=120 dB). It is seen from FIG. 4 that that in the Al-doped EDF, regardless of the doping amount, a difference in gain due to a different wavelength is 3–4.5 dB. On the other hand, in the Al-undoped EDF, fiber a difference in gains due to a different wavelengths is 11 dB.

Figure 5:
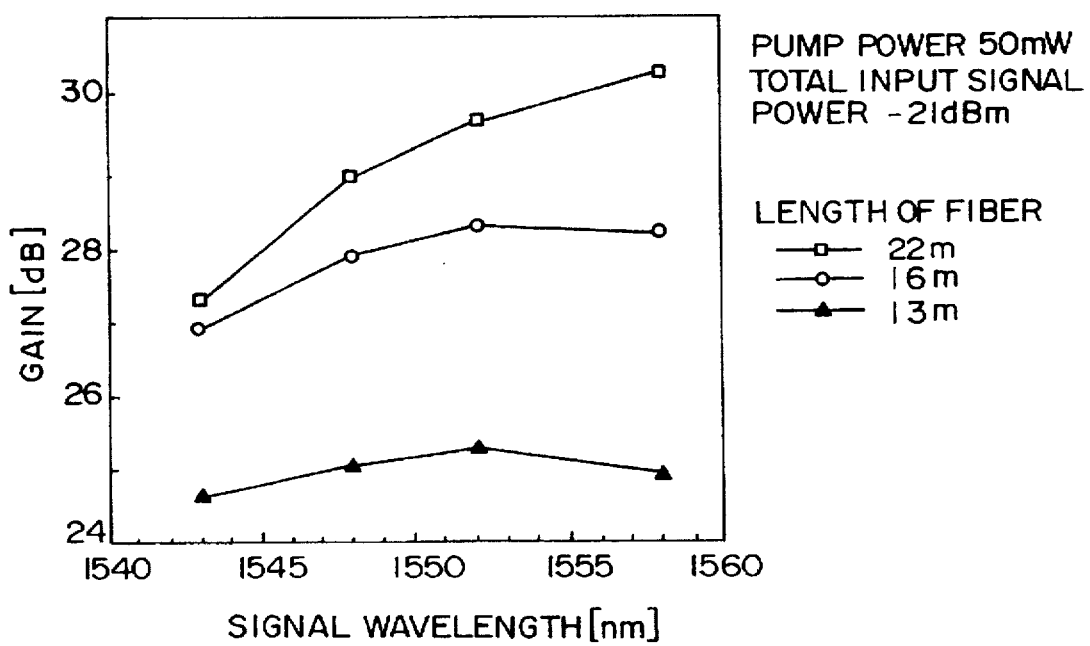
FIG. 5 is a graph showing wavelength dependency of gain in a case that the length of an EDF is varied.

FIG. 5 is a graph showing the wavelength dependency of the gain when the length of an EDF having an Al concentration of 1.4 weight % is varied. Here, the signal wavelengths are 1543, 1548, 1552 and 1558 nm. The common specifications of these optical fibers are shown in Table 1.

TABLE 1

|  | Al-Doped EDF |
| --- | --- |
| Al Concentration (wt %) | 1.4 |
| P Concentration (wt %) | — |
| Er Absorption Loss (dB/m) | 5.2 (@1.53) |
| $\alpha_{1.2}$ (dB/km) | 9 |
| Cut-Off Wavelength (μm) | 1.3 |
| MFD @1.55 (μm) | 3.8 |

It is seen from FIG. 5 that as the optical fiber is shortened, the gain over different wavelengths becomes flat, and that as the optical fiber is lengthened, the wavelength dependency of the gain becomes large. It should be noted that if the optical fiber is shortened, the total output intensity is lowered.

Figure 6:
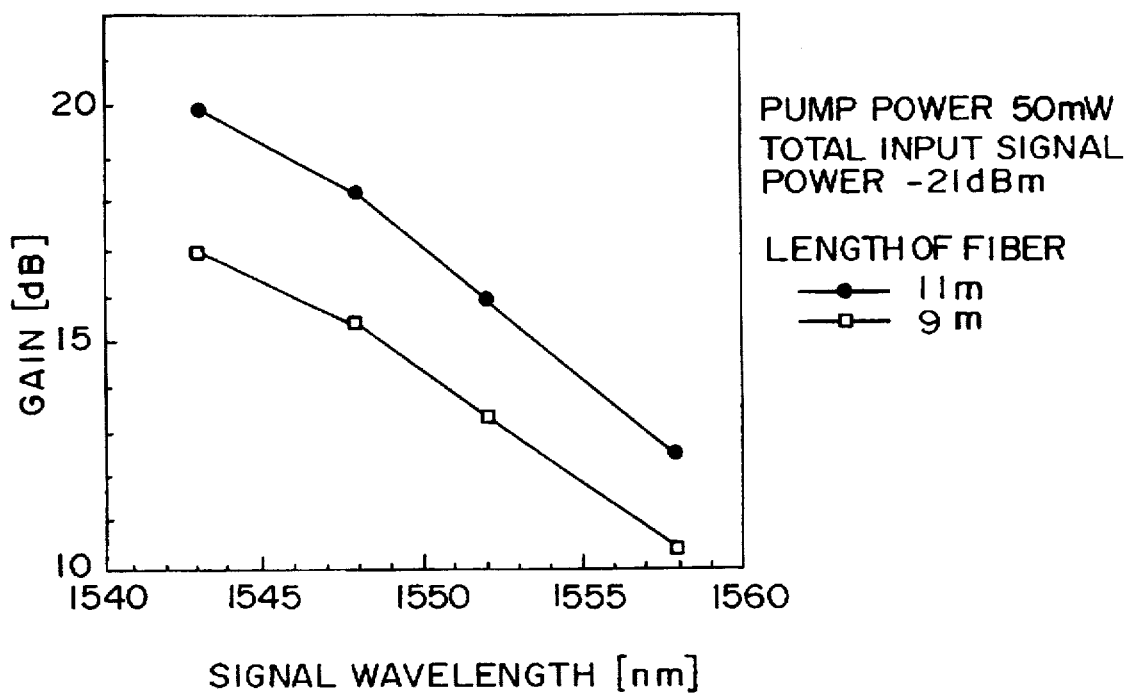
FIG. 6 is a graph showing wavelength dependency of gain in a case that the length of a P-Al-codoped EDF is changed.

FIG. 6 is a graph showing the wavelength dependency of the gain in the case that the length of a P-Al-codoped EDF having a P concentration of 5 weight % and an Al concentration of 1 weight % is changed. Here, the signal wavelengths are 1543, 1548, 1552 and 1558 nm. The common specification of these optical fibers is shown in Table 2.

TABLE 2

|  | P—Al-Doped EDF |
| --- | --- |
| Al Concentration (wt %) | 1 |
| P Concentration (wt %) | 5 |
| Er Absorption Loss (dB/m) | 3.1 (@1.54) |
| $\alpha_{1.2}$ (dB/km) | 9 |
| Cut-Off Wavelength (μm) | 1.2 |
| MFD @1.55 (μm) | 4.5 |

It is seen from the comparison of the wavelength dependency of the gain shown in FIG. 5 and FIG. 6 that there is a wavelength range where a tendency of the variation of the gain in accordance with increase of wavelength is opposite, depending on the length of the optical fiber.

The optical fiber amplifier of the present embodiment reduces the wavelength dependency in a predetermined wavelength range with a combination of optical fibers having plural kinds of compositions, utilizing the wavelength dependency of the gain due to a type of dopant, a doping concentration and a change of the length of the optical fiber.

Figure 7:
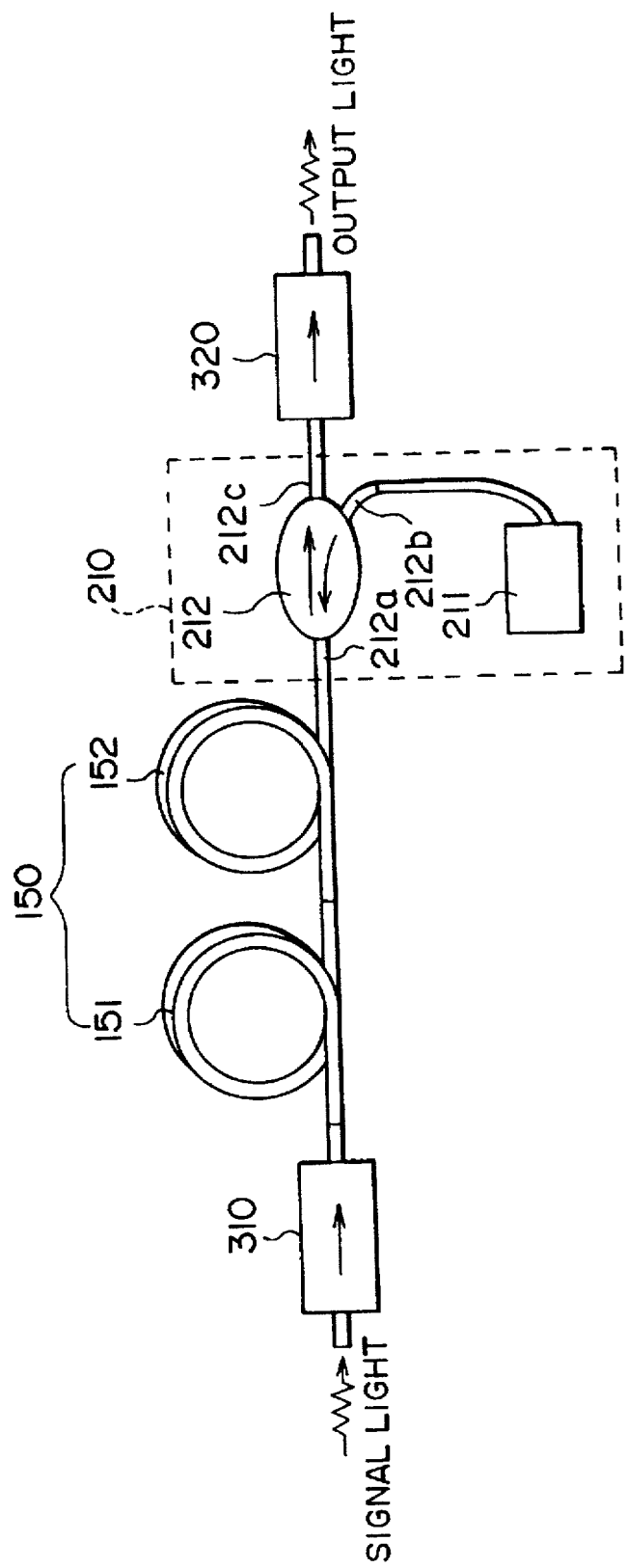
FIG. 7 is a view showing a configuration of an optical fiber amplifier of the first embodiment of the present invention.

FIG. 7 shows a configuration of an optical fiber amplifier of the present embodiment. As shown in FIG. 7, the optical fiber amplifier includes (a) a composite optical fiber 150 in which a 16 m-optical fiber 151 with a composition shown in Table 1 having a core in which Er is doped in a glass composition made of $SiO_2$, $GeO_2$ and $Al_2O_3$ is serially coupled by fusion with a 9 m-optical fiber 152 with a composition shown in Table 2 having a core in which Er is doped in a glass composition made of $SiO_2$, $GeO_2$, $Al_2O_3$ and $P_2O_5$, (b) an excitation device 210 for supplying excitation light to the composite optical fiber 150, (c) an optical isolator 310 for receiving input signal light and transmitting only light propagating in a propagating direction of the input signal light so that the transmitted light is incident on the composite optical fiber 150, and (d) an optical isolator 320 for transmitting only light propagating in a propagating direction of light, emerging from the composite optical fiber 150.

Figure 8:
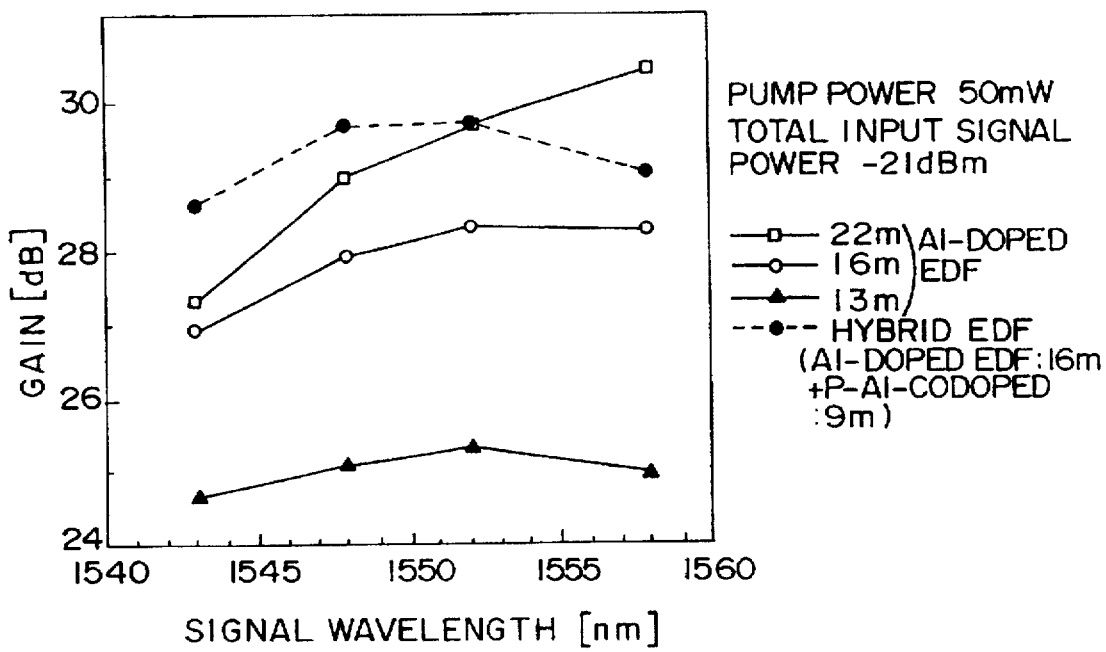
FIG. 8 is a graph showing the results of the measurement of wavelength dependency of gain of a composite optical fiber of the first embodiment of the present invention.

The results of the measurement of the wavelength dependency of the gain of the composite optical fiber 150 in which the optical fiber 151 is coupled with the optical fiber 152 by fusion are shown in FIG. 8. Note that the amplification property of the Al-doped optical fiber shown in FIG. 5 is also shown in FIG. 8 for comparison. It is seen from the graph of FIG. 8 that the wavelength dependency of the gain in a 1535–1565 nm-wavelength range of incident light is reduced as compared with the wavelength dependency of the gain of the optical fiber 151 or the optical fiber 152.

The excitation device 210 includes (1) an excitation light source 211 for generating excitation light and (2) a directional coupler 212 for receiving amplified light emerging from the composite optical fiber 110 from a terminal 212 and emitting the light from a terminal 212c, and receiving the excitation light generated from the excitation light source 211 from the terminal 212b and emitting the excitation light from the terminal 212a to the composite optical fiber 150.

Note that to form a composite optical fiber which reduces the wavelength dependency of the gain with the above-described two kinds of amplifying optical fibers, it is effective for a ratio of gain at a predetermined wavelength to a differential coefficient relative to a variation of a gain wavelength for the two kinds of the amplifying optical fibers to be set to a value such that a sign is opposite and that an absolute value is the same.

Figure 9:
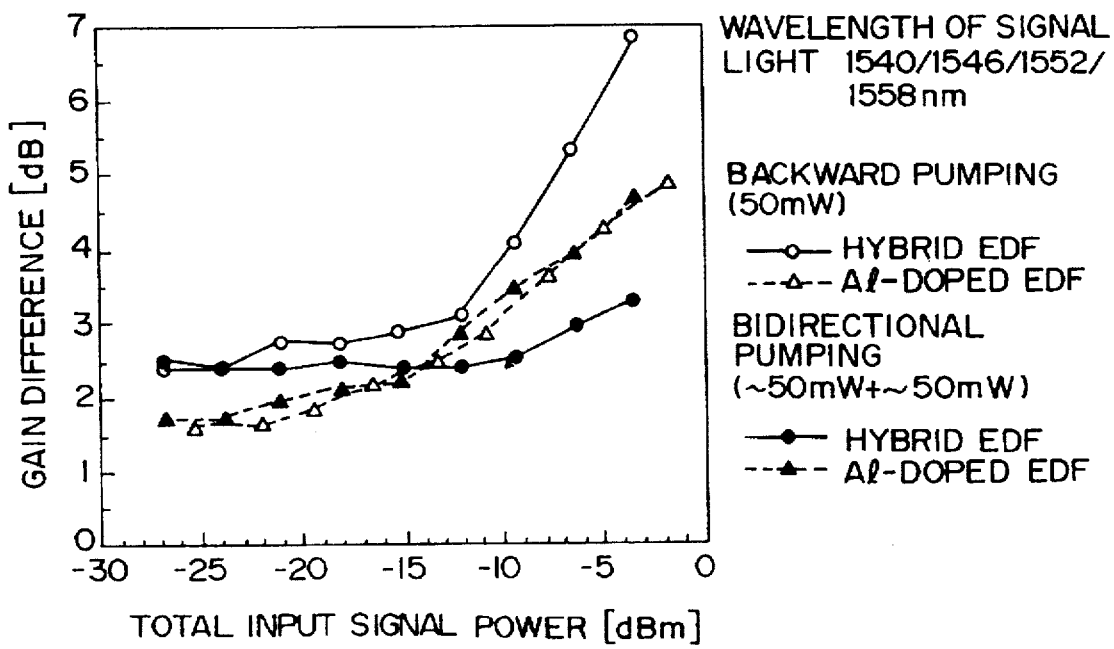
FIG. 9 is a graph showing a difference of amplification properties between backward pumping and bidirectional pumping of the first embodiment of the present invention.

In the present embodiment, backward pumping is employed as a method for supplying excitation light but forward pumping and bidirectional pumping can be employed. FIG. 9 is a graph showing a difference of amplification properties between the backward pumping and the bidirectional pumping. It is seen from FIG. 9 that the wavelength dependency of the gain is reduced more with bidirectional pumping than with backward pumping with the same intensity of input signal lights.

(Second Embodiment)

An optical fiber amplifier of the present embodiment belongs to the second type optical fiber amplifier of the present invention and it reduces the wavelength dependency of the gain in a predetermined wavelength range (1.5 μm band).

Figure 10:
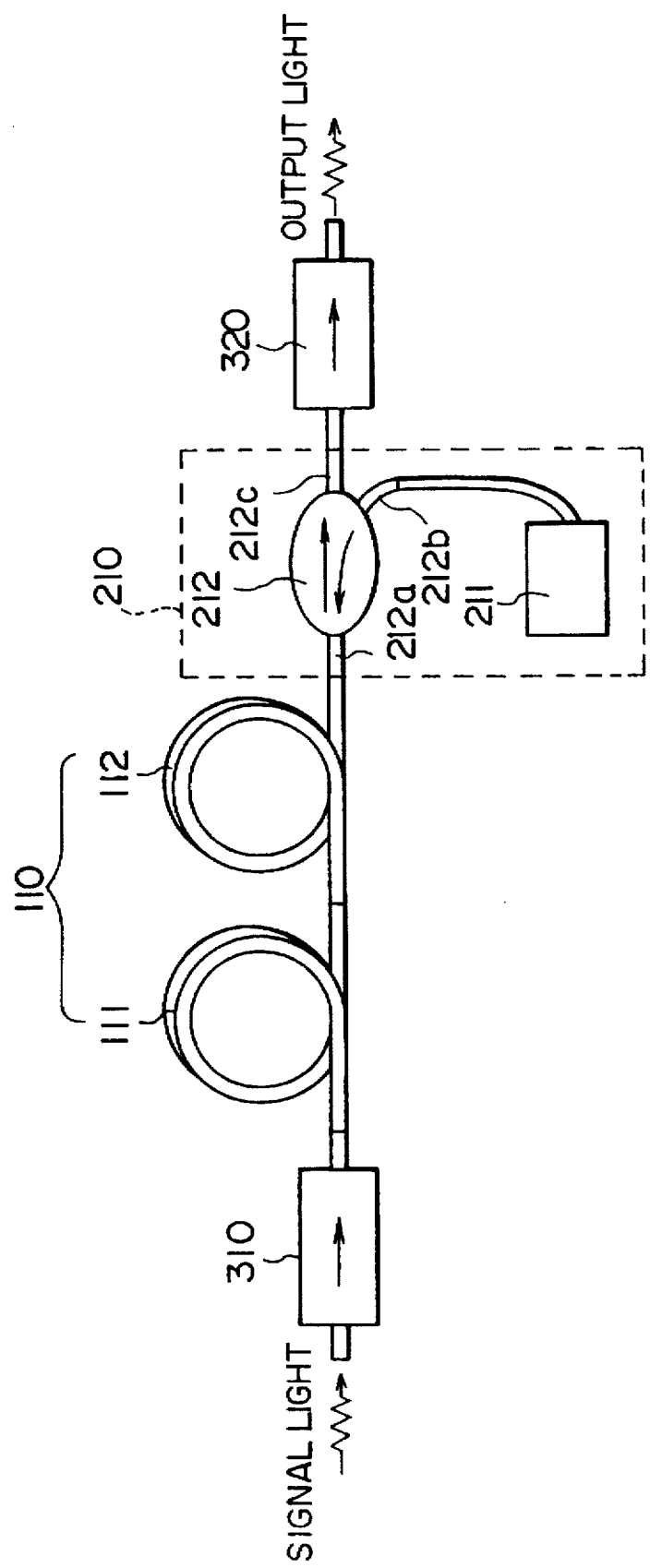
FIG. 10 is a view showing a configuration of an optical fiber amplifier of the second embodiment of the present invention.

FIG. 10 shows a configuration of an optical fiber amplifier of the present embodiment. As shown in FIG. 10, the optical fiber amplifier includes (a) a composite optical fiber 110 in which an optical fiber 111 having a core in which Er is doped in a glass composition made of $SiO_2$, $GeO_2$ and $Al_2O_3$ is coupled by fusion with an optical fiber 112 having a core in which Er is doped in a glass composition made of $SiO_2$, $GeO_2$, $Al_2O_3$ and $P_2O_5$, (b) an excitation device 210 for supplying excitation light to the composite optical fiber 110, (c) an optical isolator 310 for receiving input signal light and transmitting only light propagating in a propagating direction of input signal light so that the transmitted light is incident on the composite optical fiber 110, and (d) an optical isolator 320 for transmitting only light propagating in a propagating direction of light, emerging from the composite optical fiber 110.

The optical fiber 111 has an Er concentration of 0.1 wt % and an Al concentration of 3.0 wt %, and a total Er loss in the optical fiber 111 is 35 dB. The optical fiber 112 has an Er concentration of 0.1 wt %, an Al concentration of 3.0 wt % and a P concentration of 3.9 wt %, and a total Er loss in the optical fiber 112 is 5 dB. Here, the "total Er loss" is used to express the characteristic of the amplifying optical fiber, which totally shows the characteristic of the amplifying optical fiber against a gain difference owing to the glass composition of the core, the Er-doping concentration, and the length of the fiber. The "total Er loss" is a product (α'L: unit is dB) of "loss per unit length (α: unit is dB/m) at a certain wavelength due to presence of Er" and "fiber length (L: unit is m)". Note that the amplifying optical fibers which have the same total Er loss can be considered to have the same amplification ability.

Figure 11:
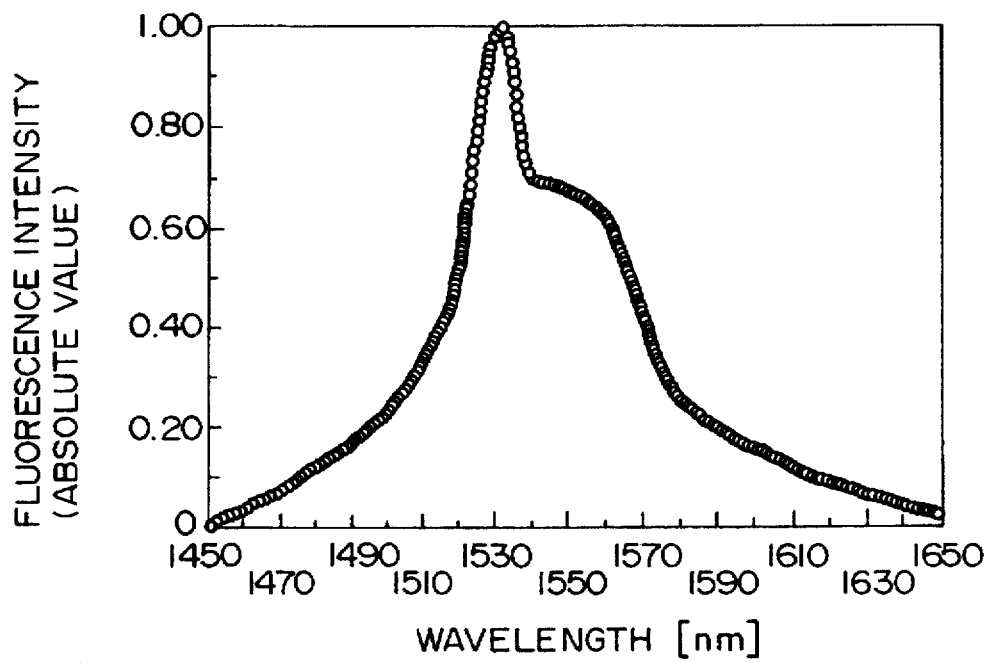
FIG. 11 and FIG. 12 are graphs showing characteristics of an amplifying optical fiber of the second embodiment.
Figure 12:
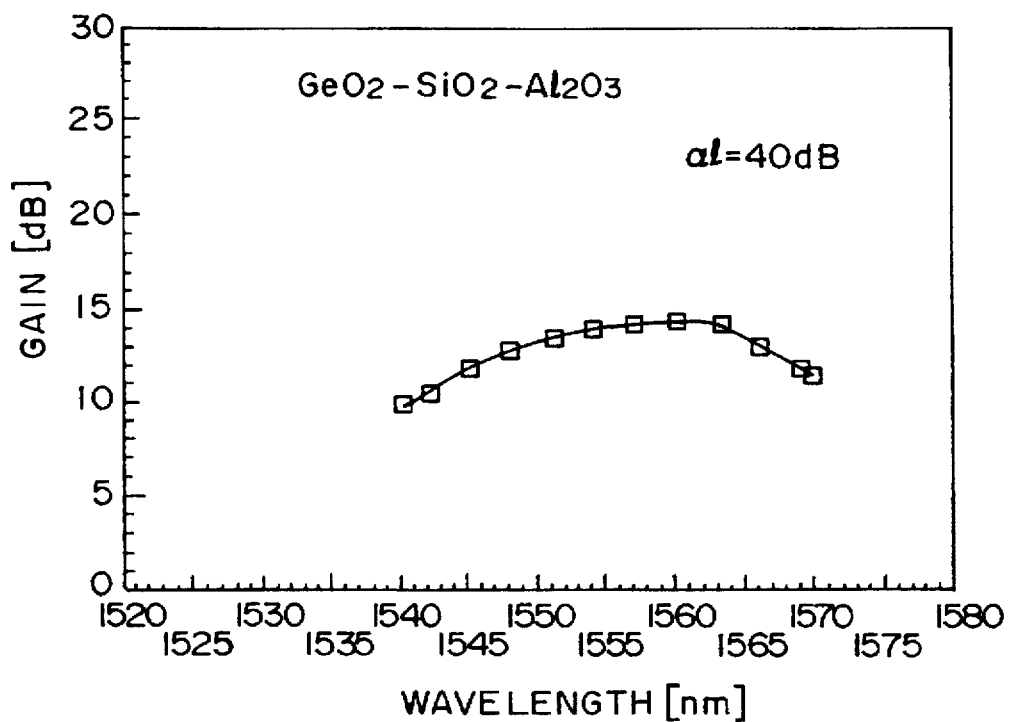
Figure 13:
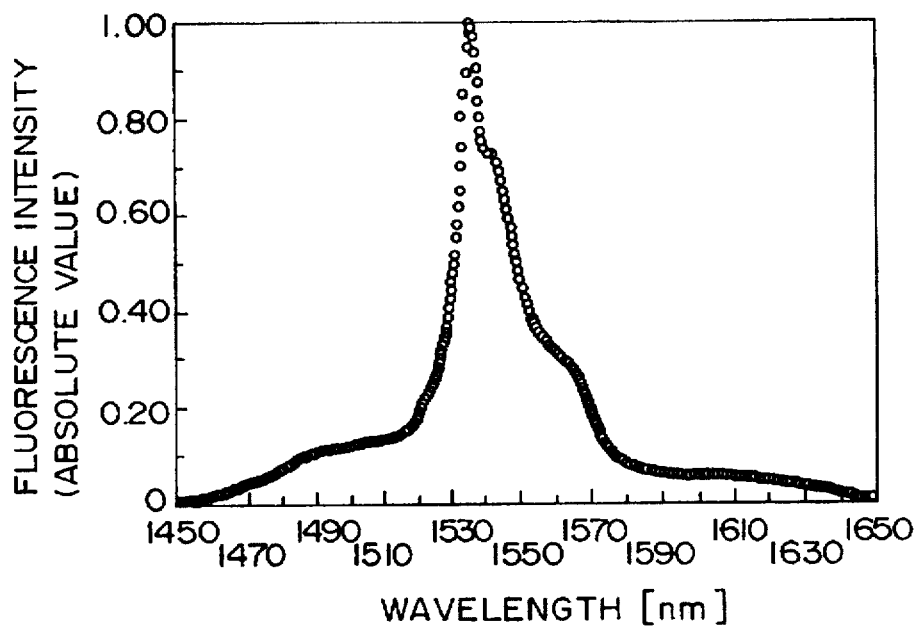
FIG. 13 and FIG. 14 are graphs showing characteristics of an amplifying optical fiber of the second embodiment.
Figure 14:
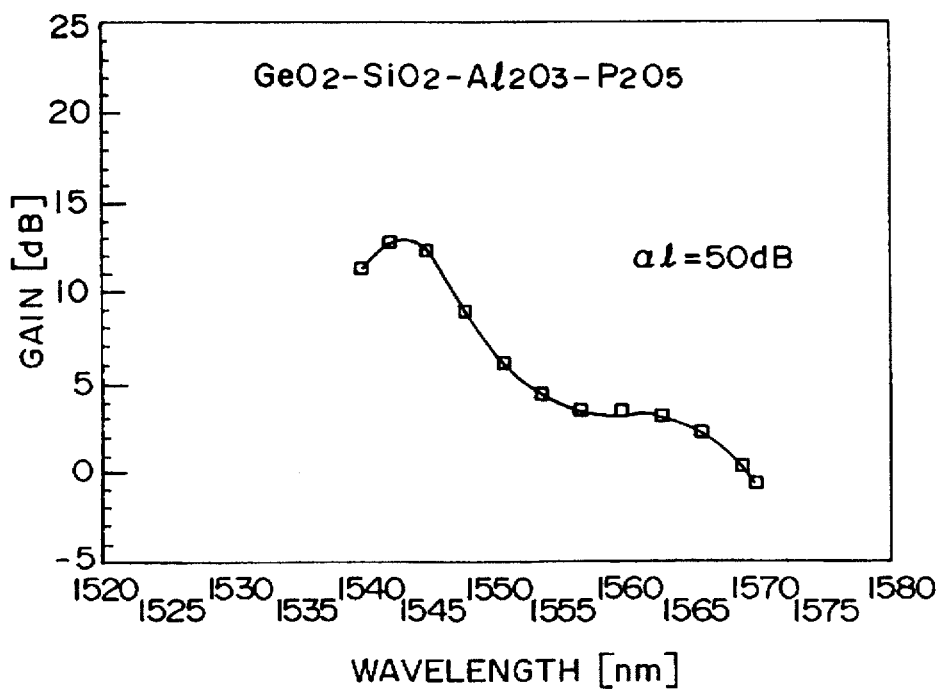

FIG. 11 and FIG. 12 are graphs showing a characteristic of the optical fiber 111. FIG. 11 shows the wavelength dependency of an intensity of fluorescence (spontaneous emission from the excited Er) generated when only excitation light is incident without signal light incidence. FIG. 12 shows the wavelength dependency of the gain of an amplifying optical fiber having the same composition as the optical fiber 112 and a 40 dB total Er loss at a 1.55 μm wavelength, with sufficiently excited Er (induced emission from the excited Er). Since the tendency of the wavelength dependency (wavelength at which a maximum gain is observed) is not varied with a difference of total Er losses, the optical fiber 111 also shows the same tendency of the wavelength dependency. Note that a method disclosed in the aforementioned "S. L. Hansen et al., IEEE Photon. Technol. Lett. Vol. 4, No. 4, 1993, pp409–411" is used to measure the gain except that backward pumping is employed. FIG. 13 shows the wavelength dependency of the intensity of fluorescence (spontaneous emission from the excited Er) generated when only excitation light is incident without signal light incidence. FIG. 14 shows the wavelength dependency of the gain of an amplifying optical fiber having the same composition as the optical fiber 112 and a 50 dB total Er loss, with sufficiently excited Er (induced emission from the excited Er). Note that to measure the gain, the same method as in FIG. 12 is used.

Figure 15:
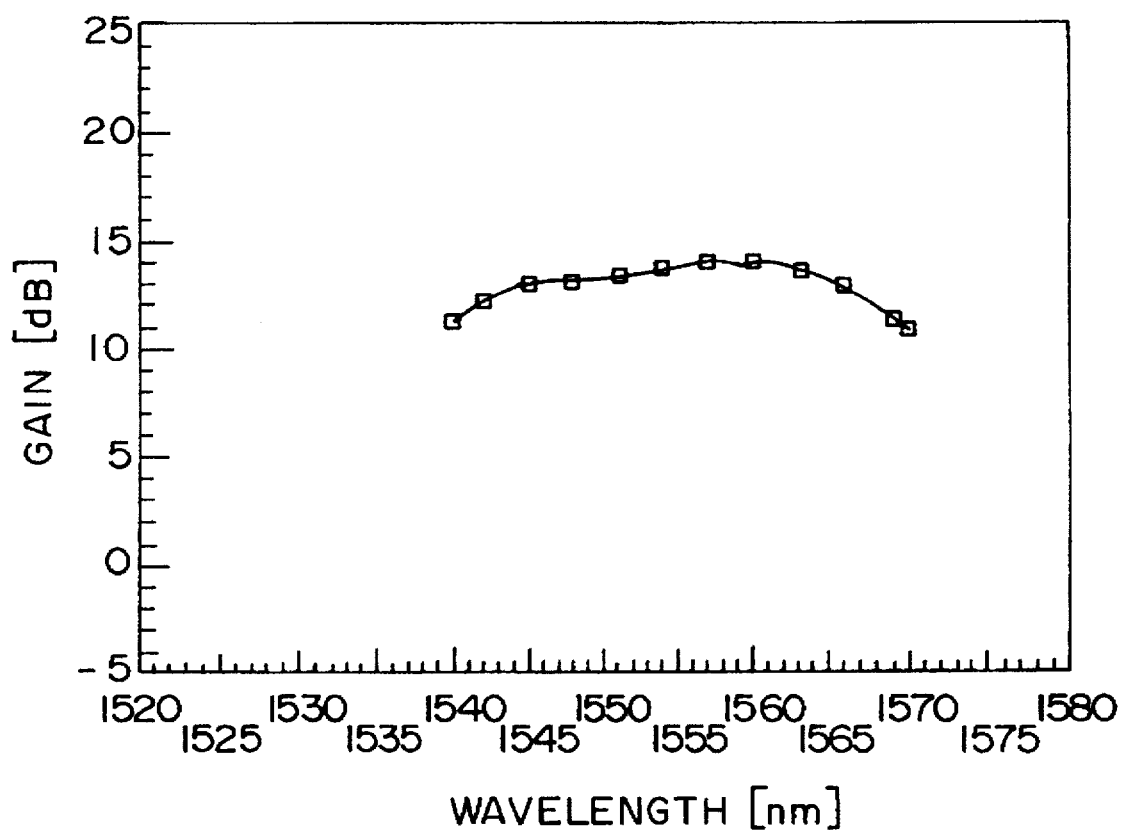
FIG. 15 is a graph showing characteristics of a composite optical fiber of the second embodiment.

The results of the measurement of the wavelength dependency of the gain of the composite optical fiber 110 in which the optical fiber 111 and the optical fiber 112 having the characteristics of FIGS. 11–14 are coupled by fusion are shown in FIG. 15. Note that the measurement of the gain, the same method as in FIG. 12 is used. As the graph of FIG. 15 is compared with the graph of FIG. 12 and the graph of FIG. 14, the wavelength dependency of the gain in the 1540–1570 nm-wavelength range of the input light is reduced more than the wavelength dependency of the gain of the optical fiber 111 or the optical fiber 112.

Further, the excitation device 210 includes (1) an excitation light source 211 for generating excitation light and (2) a directional coupler 212 for receiving amplified light emerging from the composite optical fiber 110 at a terminal 212a and emitting the light from a terminal 212c, and receiving the excitation light generated by the excitation light source 211 at the terminal 212b and emitting the excitation light from the terminal 212a to the composite optical fiber 110.

In this optical fiber amplifier, Er in the composite optical fiber 110 is excited with excitation light supplied from the excitation device 210, and both the optical fiber 111 and the optical fiber 112 are set in a ready state for amplifying input signal light. With this state, when signal light (1.5 μm band) is incident on the composite optical fiber 110 through the optical isolator 310, first the signal light is amplified so as to have the wavelength dependency shown in FIG. 12 by induced emission from the excited Er in the optical fiber 111. At the same time as the amplification of the signal light, light with the wavelength dependency shown in FIG. 11 is generated due to spontaneous emission and the generated light together with the induced emission light is incident on the optical fiber 112. The light incident on the optical fiber 112 is amplified so as to have the wavelength dependency shown in FIG. 14 by the induced emission from the excited Er in the optical fiber 112. At the same time as the amplification of the light, light with the wavelength dependency shown in FIG. 13 is generated due to spontaneous emission and the generated light together with the induced emission light emerges from the composite optical fiber 110. Light emerged from the composite optical fiber 110 is amplified so as to have the wavelength dependency shown in FIG. 15 while propagating successively through the directional coupler 212 and the optical isolator 320, and then becomes the output light of the optical fiber amplifier.

In the present embodiment, the two optical fibers, the optical fiber 111 and the optical fiber 112 form the composite optical fiber 110 but an optical fiber having the same composition as the optical fiber 111, a shorter length than the optical fiber 111, and a $n_1$ total Er loss is serially coupled with an optical fiber having the same composition as the optical fiber 112, a shorter length than the optical fiber 112, and an $n_2$ (=$n_1$/7) total Er loss to form a pair of the fibers, and a plurality of the pairs of the fibers can be coupled in series so that the total Er loss is 40 dB as the composite optical fiber. In this composite optical fiber, the difference of excitation light intensities between each of the adjacent optical fibers is small, when compared with the present embodiment, so that a task of considering a relative difference of gain characteristics and a variation of the intensity of excitation light due to fiber compositions can be reduced. In other words, a composite optical fiber which has characteristics which are simply expected from the relative relations of the characteristics of the single optical fiber can be formed.

Note that to form a composite optical fiber which reduces the wavelength dependency of the gain with the above-described two kinds of the amplifying optical fibers, it is effective that a ratio of gain at a predetermined wavelength to a differential coefficient relative to a variation of a gain wavelength for the two kinds of amplifying optical fibers is set to a value which has an is opposite sign the same an absolute value.

In the present embodiment, backward pumping is employed as the method for supplying excitation light but forward pumping or bidirectional pumping can also be employed, by which the wavelength dependency of the composite optical fiber 110 can also be set different from the wavelength dependency of the optical fiber 111 or the optical fiber 112.

(Third Embodiment)

Figure 16:
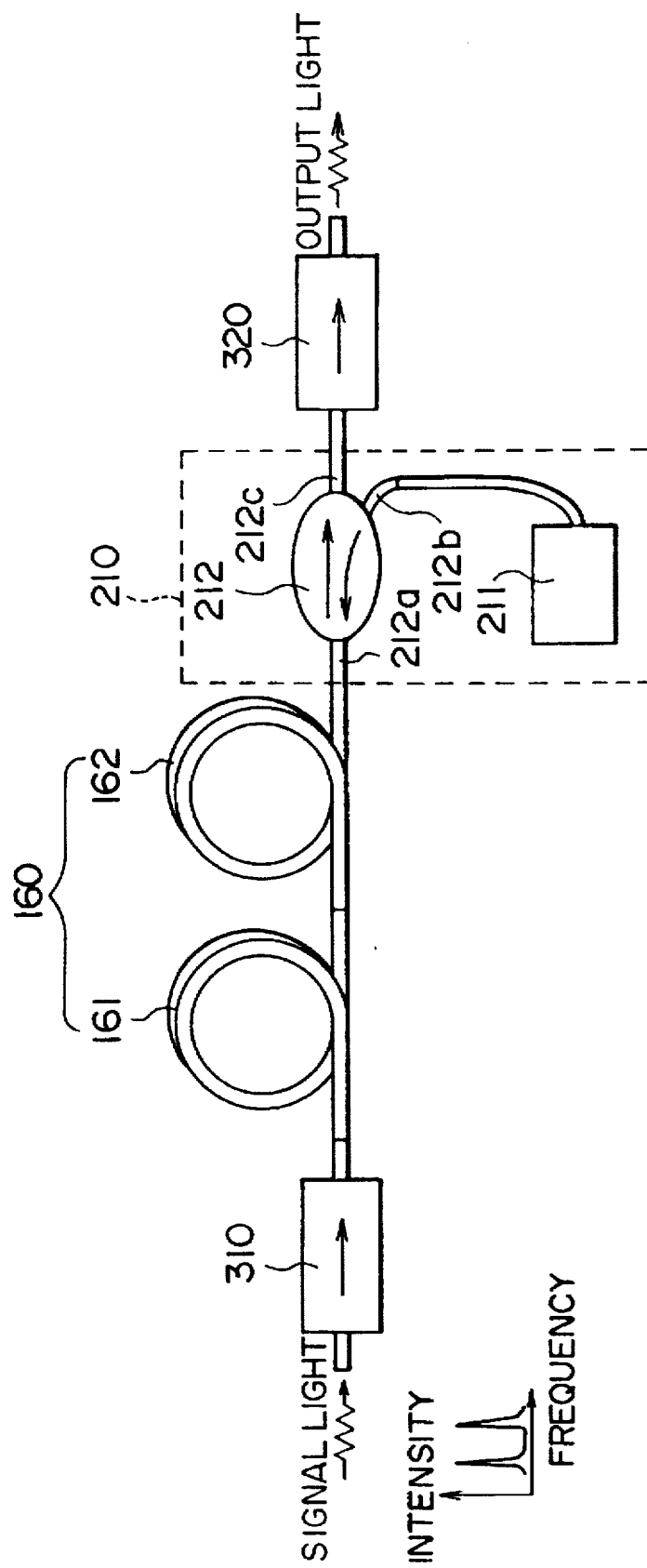
FIG. 16 is a view showing a configuration of an optical fiber amplifier of the third embodiment of the present invention.

FIG. 16 shows a configuration of an optical fiber amplifier of the present embodiment. This amplifier amplifies light which includes two or more waves. As shown in FIG. 16, the optical fiber amplifier includes (a) a composite optical fiber 160 in which a 16 m-optical fiber 161 having a core in which Er is doped in a glass composition made of $SiO_2$, $GeO_2$ and $Al_2O_3$, is coupled by fusion with a 9 m-optical fiber 162 having a core in which Er is doped in a glass composition made of $SiO_2$, $GeO_2$, $Al_2O_3$ and $P_2O_5$, (b) an excitation device 210 for supplying excitation light to the composite optical fiber 160, (c) an optical isolator 310 for receiving input signal light and transmitting only light propagating in a propagating direction of input signal light so that the transmitted light is incident on the composite optical fiber 160, and (d) an optical isolator 320 for transmitting only light propagating in a propagating direction of light, emerging from the composite optical fiber 160.

The composition of the optical fiber 161 is shown in Table 3, and the composition of the optical fiber 162 is shown in Table 4.

TABLE 3

|  | Al-Doped EDF |
| --- | --- |
| Al Concentration (wt %) | 1.4 |
| P Concentration (wt %) | — |
| Er Absorption Loss (dB/m) | 5.2 (@1.53) |
| $\alpha_{1.2}$ (dB/km) | 9 |
| Cut-Off Wavelength (μm) | 1.3 |
| MFD @1.55 (μm) | 3.8 |
| Total Er Absorption Loss (dB) | 15 |

TABLE 4

|  | P—Al-Doped EDF |
| --- | --- |
| Al Concentration (wt %) | 1 |
| P Concentration (wt %) | 5 |
| Er Absorption Loss (dB/m) | 3.1 (@1.54) |
| $\alpha_{1.2}$ (dB/km) | 9 |
| Cut-Off Wavelength (μm) | 1.2 |
| MFD @1.55 (μm) | 4.5 |
| Total Er Absorption Loss (dB) | 30 |

Figure 17:
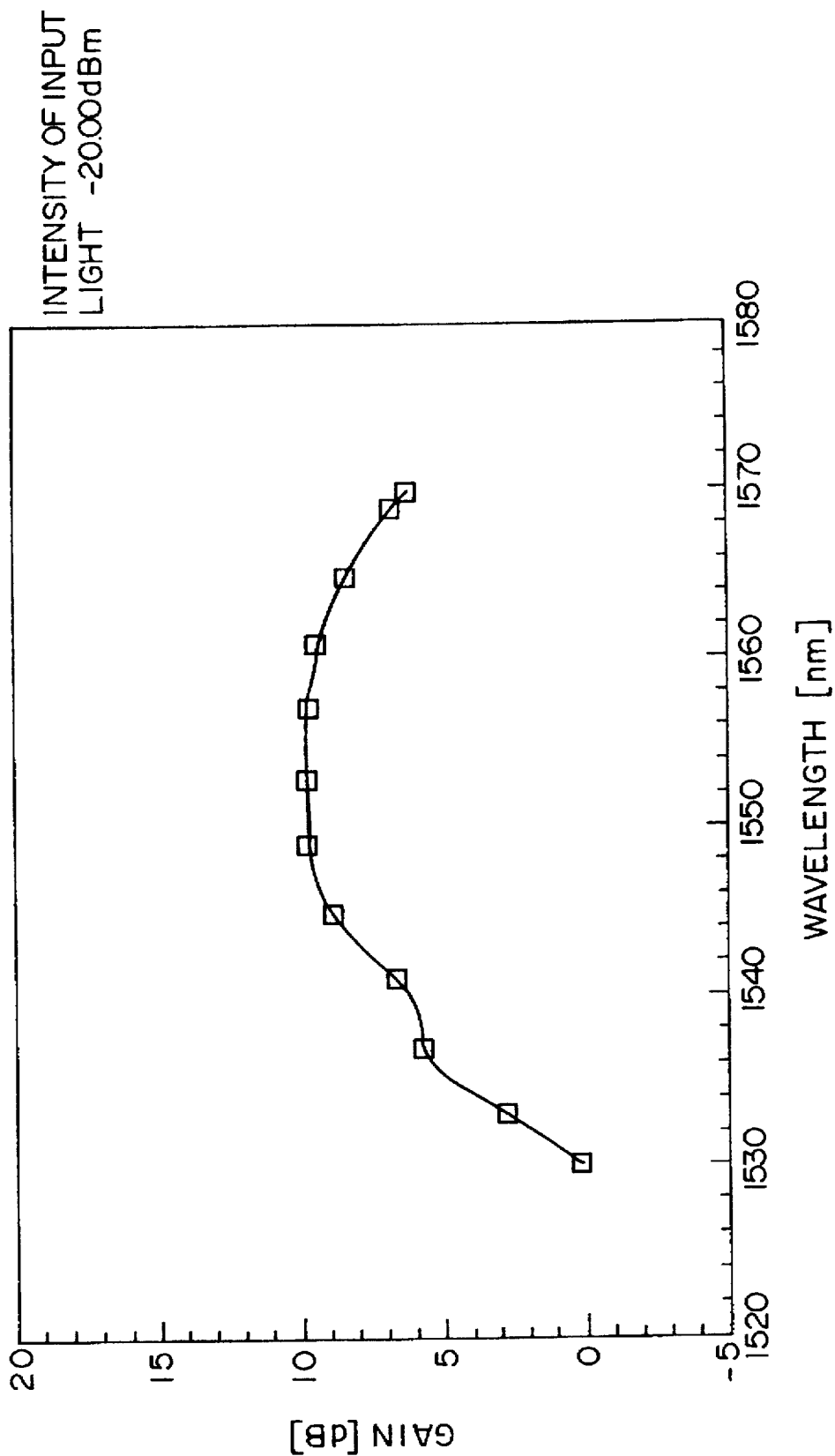
FIG. 17 is a graph showing the results of the measurement of wavelength dependency of gain of a composite optical fiber of the third embodiment of the present invention.

The results of measurement of the wavelength dependency of the gain of the composite optical fiber 160 in which the optical fiber 161 and the optical fiber 162 are coupled by fusion are shown in FIG. 17. It is seen from the graph of FIG. 17 that the wavelength dependency of the gain in the 1535–1565 nm-wavelength range of input light is reduced, as compared with the wavelength dependency of the gain of the optical fiber 161 or the optical fiber 162.

The excitation device 210 comprises (1) an excitation light source 211 for generating excitation light and (2) a directional coupler 212 for receiving amplified light emerging from the composite optical fiber 110 from a terminal 212a and emitting the light from a terminal 212c, and receiving the excitation light generated from the excitation light source 211 from the terminal 212b and emitting the excitation light from the terminal 212a to the composite optical fiber 160.

Note that to form a composite optical fiber which reduces the wavelength dependency of the gain with the above-described two kinds of amplifying optical fibers, a ratio of gain at a predetermined wavelength to a differential coefficient relative to a variation of a gain wavelength for the two kinds of the amplifying optical fibers may be set to a value which has the opposite sign but the same absolute value.

Note that the measurement system is the same as in the embodiment 2, and that the input signal light power for LI=+1.4 dBm/one wavelength, the signal light wavelengths for LI=1552 and 1558 nm, the excitation light power=70 mW.

(Fourth Embodiment)

An optical fiber amplifier of the present embodiment belongs to the fourth type of the present invention, and it controls a gain peak wavelength at which the gain is the largest in a predetermined wavelength range (1.5 μm band). Note that the optical fiber amplifier of the present embodiment has the same configuration as in the first embodiment except for the composite optical fiber 120.

Figure 18:
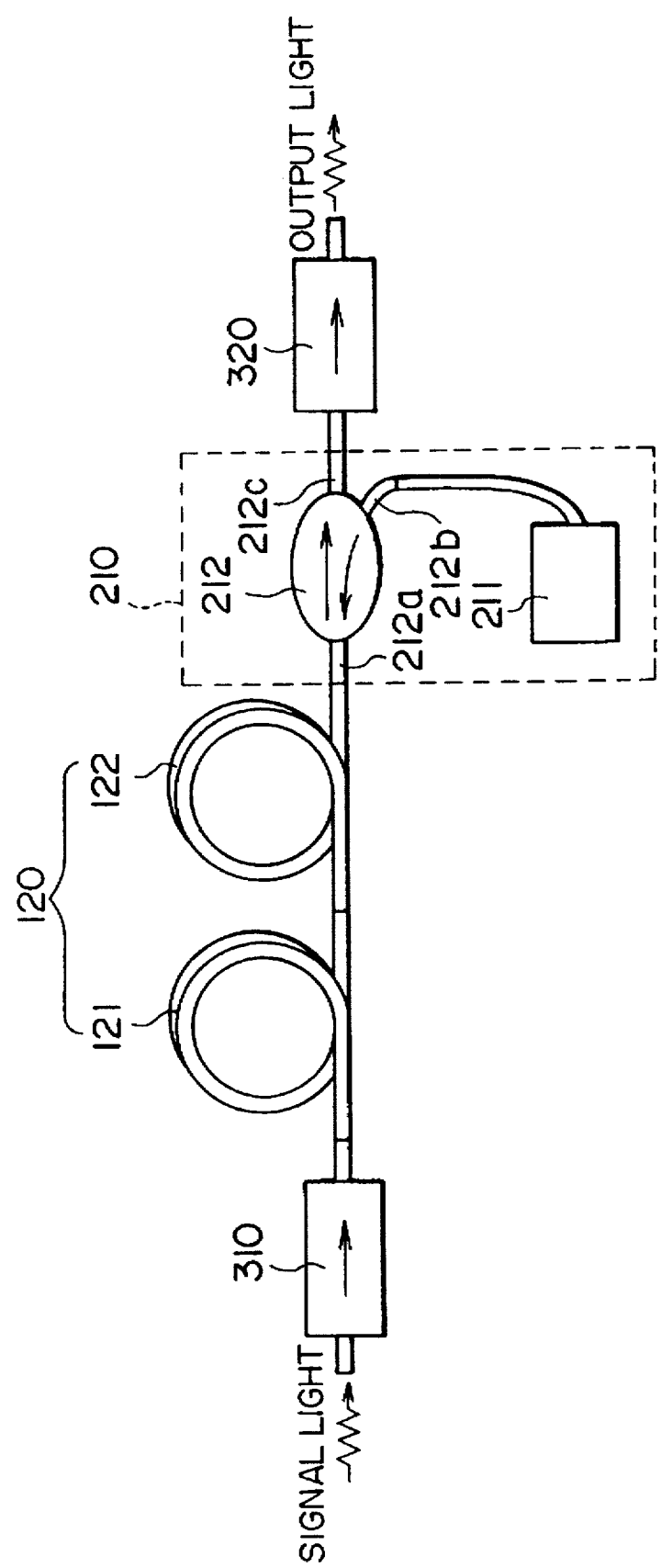
FIG. 18 is a view showing a configuration of an optical fiber amplifier of the fourth embodiment of the present invention.

FIG. 18 shows a configuration of an optical fiber amplifier of the present invention. As shown in FIG. 18, the optical fiber amplifier includes (a) a composite optical fiber 120 in which an optical fiber 121 having a core in which Er is doped in a glass composition made of $SiO_2$ and $GeO_2$ is coupled by fusion with an optical fiber 122 having a core in which Er is doped in a glass composition made of $SiO_2$, $GeO_2$ and $Al_2O_3$, (b) an excitation device 210 for supplying excitation light to the composite optical fiber 120, (c) an optical isolator 310 for receiving input signal light and transmitting only light propagating in a propagating direction of input signal light so that the transmitted light is incident on the composite optical fiber 120, and (d) an optical isolator 320 for transmitting only light propagating in a propagating direction of light, emerging from the composite optical fiber 120.

The optical fiber 121 has an Er concentration of 0.04 wt % and a total Er loss in the optical fiber 121 is 20 dB. The optical fiber 122 has the same composition as in the first embodiment, and the total Er loss in the optical fiber 122 is 20 dB.

Figure 19:
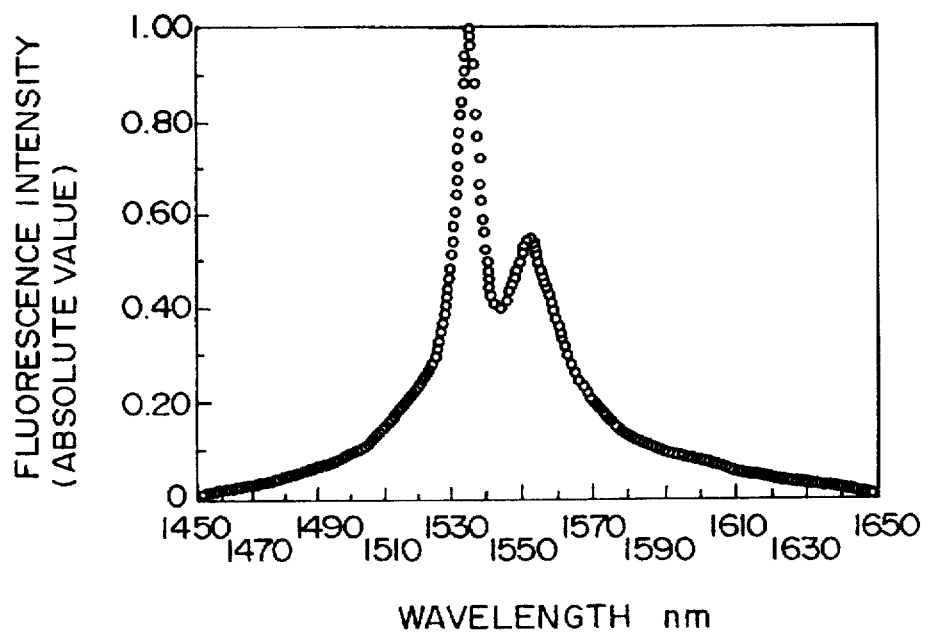
FIG. 19 and FIG. 20 are graphs showing characteristics of an amplifying optical fiber of the fourth embodiment.
Figure 20:
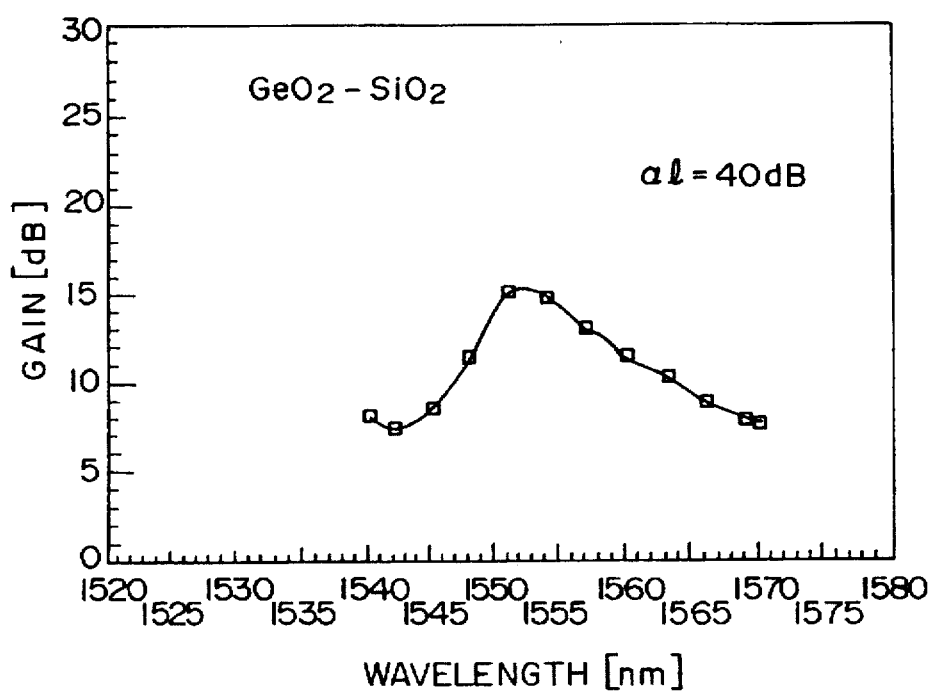

FIG. 19 and FIG. 20 are graphs showing a characteristic of the optical fiber 121. FIG. 19 shows the wavelength dependency of an intensity of fluorescence (spontaneous emission from the excited Er) generated when only excitation light is incident without signal light incidence. FIG. 20 shows the wavelength dependency of the gain of an amplifying optical fiber having the same composition as the optical fiber 121 and the 40 dB total Er loss at a 1.55 μm wavelength with the sufficiently excited Er (induced emission from the excited Er). Since the tendency of the wavelength dependency (e.g., a wavelength at which a maximum gain is observed) is not varied with a difference of total Er losses, the optical fiber 121 also shows the same tendency of the wavelength dependency. Note that the same method as in FIG. 12 is used for the measurement of the gain. The characteristics of the optical fiber 122 are shown in FIG. 13 and FIG. 14.

Figure 21:
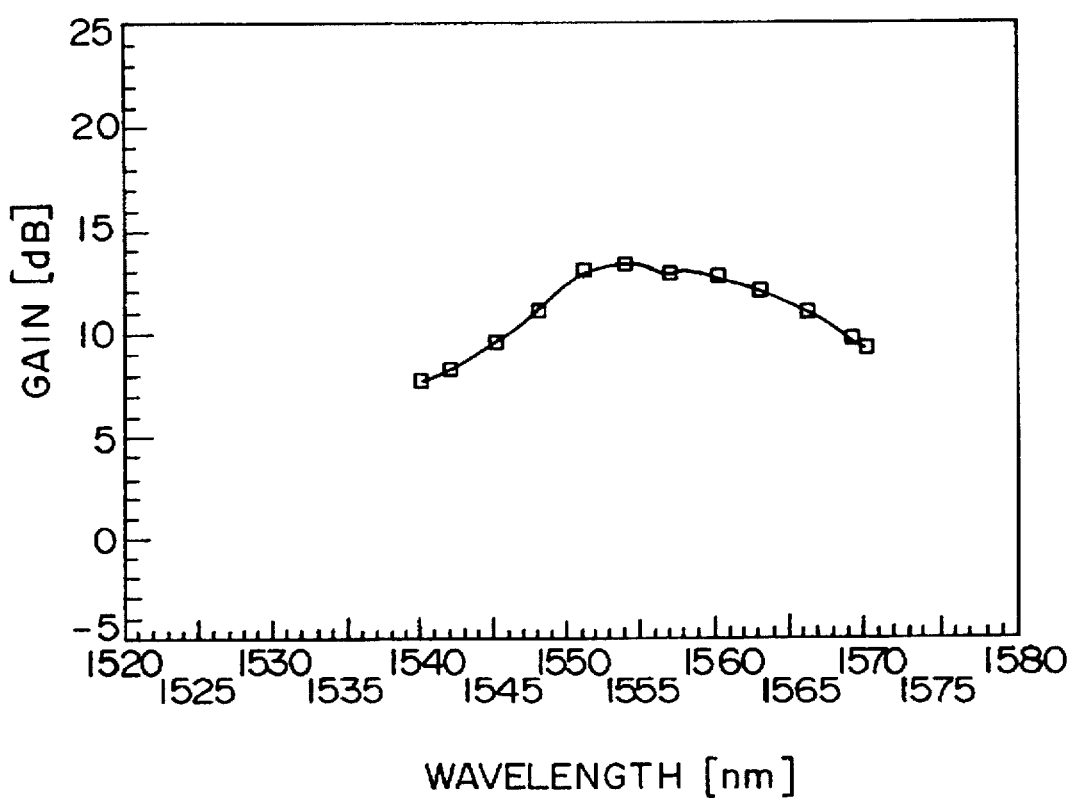
FIG. 21 is a graph showing characteristics of a composite optical fiber of the fourth embodiment.

The results of measurement of the wavelength dependency of the gain of the composite optical fiber 120, in which the optical fiber 121 and the optical fiber 122 having the characteristics shown in FIGS. 19 and 20, and FIGS. 13 and 14, respectively are coupled, is shown in FIG. 21. Note that the same method as in FIG. 12 is used to measure the gain. As the graph of FIG. 21 is compared with the graph of FIG. 20 and the graph of the FIG. 12, it is seen that the wavelength at which the maximum gain appears in the 1530–1570 nm-wavelength range of input light is different from the case of the optical fiber 121 or the optical fiber 122.

In this optical fiber amplifier, Er in the composite optical fiber 120 is excited with excitation light supplied from the excitation device 210, and both the optical fiber 121 and the optical fiber 122 are set in a ready state for amplifying input signal light. With this state, when signal light (1.5 μm band) is incident on the composite optical fiber 120 through the optical isolator 310, first the signal light is amplified so as to have the wavelength dependency shown in FIG. 20 by induced emission from the excited Er in the optical fiber 121. At the same time as the amplification of the signal light, light with the wavelength dependency shown in FIG. 19 is generated due to spontaneous emission and the generated light together with the induced emission light is incident on the optical fiber 122. The light incident on the optical fiber 122 is amplified so as to have the wavelength dependency shown in FIG. 12 by induced emission from the excited Er in the optical fiber 122. At the same time as the amplification of the light, light with the wavelength dependency shown in FIG. 11 is generated due to spontaneous emission and the generated light together with the induced emission light emerges from the composite optical fiber 120. Light emerging from the composite optical fiber 120 is amplified so as to have the wavelength dependency shown in FIG. 21 while propagating successively through the directional coupler 212 and the optical isolator 320, and then becomes output light of the optical fiber amplifier.

In the present embodiment, backward pumping is employed as a method for supplying excitation light but forward pumping and bidirectional pumping can be employed, by which the wavelength dependency of the composite optical fiber 120 can also be set different from the wavelength dependency of the optical fiber 121 or the optical fiber 122.

It should be noted that the ratio of total Er losses, and the composition of the amplifying optical fiber are not limited to the above-described first embodiment or the second embodiment, and also the amplifying optical fibers forming the composite optical fiber are not limited to the two kinds. As the ratio of the total Er losses, the composition of the amplifying optical fiber, or the number of kinds of the amplifying optical fibers is controlled, the optical fiber amplifiers with various wavelength gain dependencies can be achieved.

(Fifth Embodiment)

The present embodiment is an optical amplifier repeater, and forms the fourth type optical fiber amplifier of the present invention.

Figure 22:
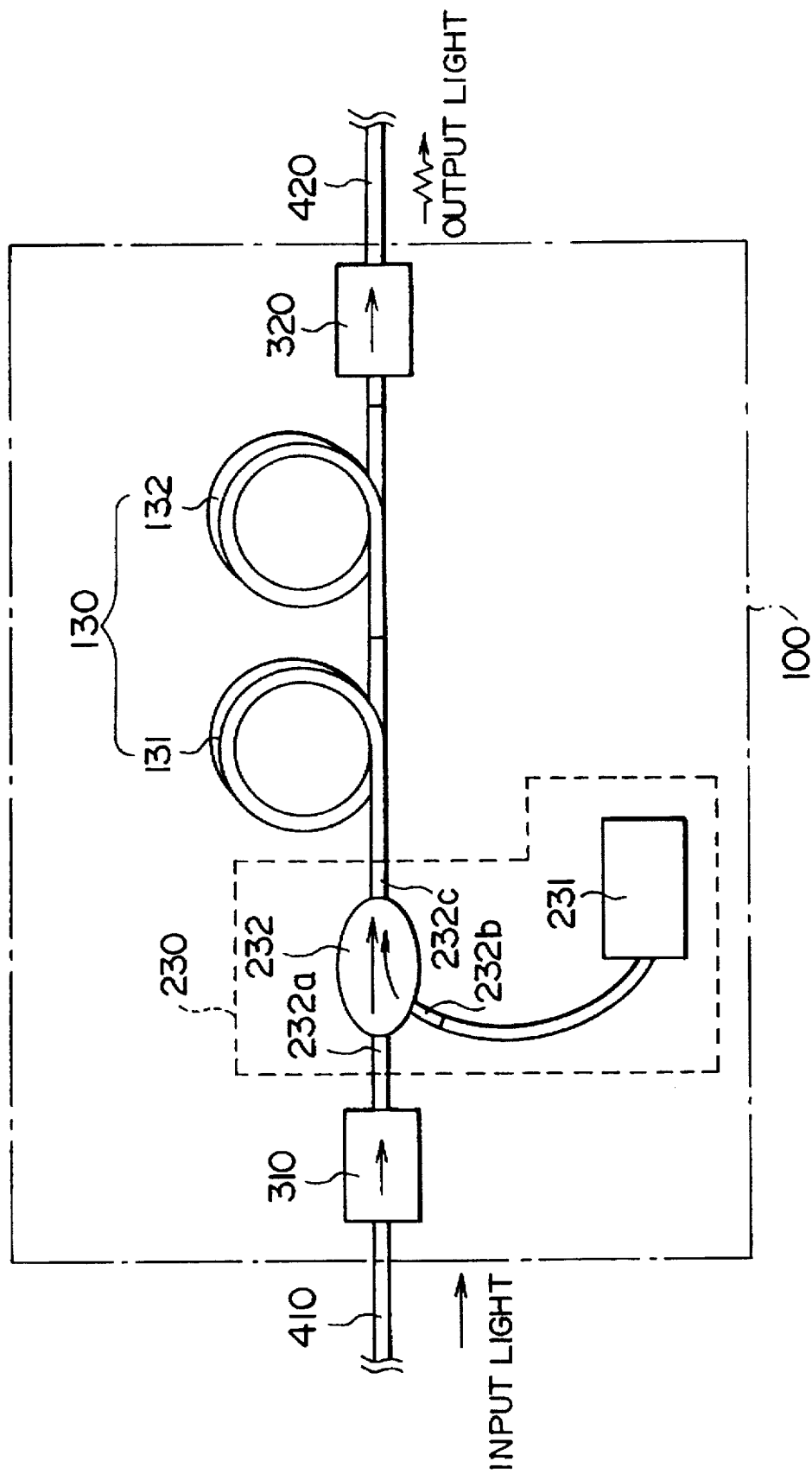
FIG. 22 is a view showing a configuration of an optical amplifier repeater of the fifth embodiment of the present invention.

FIG. 22 shows a configuration of an optical fiber amplifier of the present invention. As shown in FIG. 22, the optical amplifier repeater includes an optical fiber amplifier 100, which receives signal light through a transmitting optical fiber 410, amplified the signal light, and emits the amplified signal light to a transmitting optical fiber 420. The optical fiber amplifier 100 includes (a) a composite optical fiber 130 in which an optical fiber 131 having a core in which Er is doped in a first glass made of $SiO_2$, $GeO_2$ and $Al_2O_3$ is coupled by fusion with an optical fiber 132 having a core in which Er is doped in a second glass made of $SiO_2$, $GeO_2$ and $Al_2O_3$, (b) an excitation device 230 for supplying excitation light to the composite optical fiber 130, (c) an optical isolator 310 for receiving input signal light and transmitting only light propagating in a propagating direction of input signal light so that the transmitted light is incident on the composite optical fiber 130, and (d) an optical isolator 320 for transmitting only light propagating in a propagating direction of light, emerging from the composite optical fiber 130.

The optical fiber 131 has an Er concentration of 0.1 wt % and an Al concentration of 0.2 wt %, and a total Er loss in the optical fiber 131 is 40 dB. The optical fiber 132 has an Er concentration of 0.1 wt % and an Al concentration of 1.0 wt %, and a total Er loss in the optical fiber 132 is 40 dB.

Further, the excitation device 230 includes (1) an excitation light source 231 for generating excitation light and (2) a directional coupler 232 for receiving signal light emitted from the optical isolator 310 at a terminal 232a and emitting the light to the composite optical fiber 310 from a terminal 232c, and receiving the excitation light generated by the excitation light source 231 at the terminal 232b and emitting the excitation light from the terminal 232c to the composite optical fiber 130.

Figure 23:
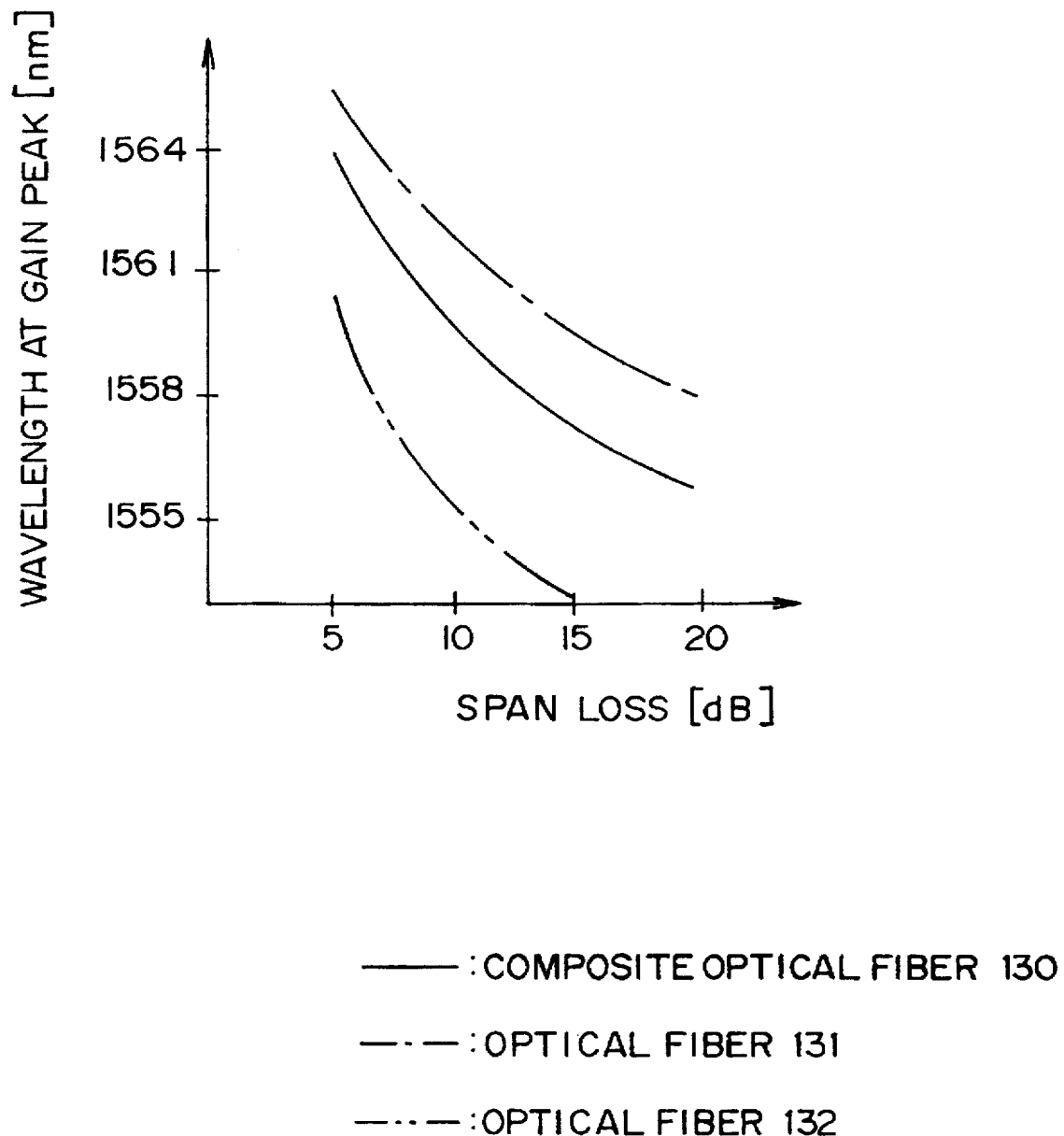
FIG. 23 is a graph showing characteristics of an optical amplifier repeater of the fifth embodiment.

FIG. 23 is a graph showing a characteristic of a span loss when the optical amplifier repeater of the present embodiment is used in a multistage relay transmission line. When a plurality of the compositions in which the optical amplifier repeater is placed in the latter stage of the communication line with a certain span loss are connected in series, the span loss and the relay amplification are sufficiently stable in the latter, and FIG. 23 shows a relation between the span loss and the wavelength at the gain peak with this stable condition. Note that a characteristic of an optical fiber in which the total Er loss is 80 dB at a 1.53 μm wavelength and which has the same composition as the optical fiber 131, and a characteristic of an optical fiber in which the total Er loss is 80dB and which has the same composition as the optical fiber 132 are also shown in FIG. 23 for comparison. It is seen from the comparison in the graph of FIG. 23 that the dependency of the wavelength at the gain peak of the composite optical fiber 130 due to the span loss is a variation of the dependency of the wavelength at the gain peak of the single optical fiber due to the span loss.

In this optical fiber amplifier, Er in the composite optical fiber 130 is excited with excitation light supplied from the excitation device 230, and both the optical fiber 131 and the optical fiber 132 are set in a ready state for amplifying input signal light. With this state, when signal light (1.5 μm band) is incident on the composite optical fiber 130 through the optical isolator 310 and the directional coupler 232, first the signal light is amplified by induced emission from the excited Er in the optical fiber 131. At the same time as the amplification of the signal light, light is generated due to spontaneous emission, and the generated light together with the induced emission light is incident on the optical fiber 132. The light incident on the optical fiber 132 is amplified by the induced emission from the excited Er in the optical fiber 132. At the same time as the amplification of the light, light is generated due to spontaneous emission, and the generated light together with the induced emission light emerges from the composite optical fiber 130. Light emerging from the composite optical fiber 130 is amplified to have the amplification property that the wavelength at the gain peak is determined in accordance with the dependence on the span loss as shown in FIG. 23, and then passes through the optical isolator 320 and becomes output light of the optical amplifier repeater.

In the present embodiment, forward pumping is used to supply excitation light but backward pumping and bidirectional pumping can also be employed, by which the wavelength dependency of the composite optical fiber 130 can also be set different from the wavelength dependency of the optical fiber 131 or the optical fiber 132.

In the above first through fifth embodiments components of the cores are made of $SiO_2$ and $GeO_2$ but if they are made of $SiO_2$, the same effects will be obtained.

(Sixth Embodiment)

The present embodiment is an optical amplifier repeater as similar to the fifth embodiment, and forms the second type of optical fiber amplifier of the present invention.

Figure 24:
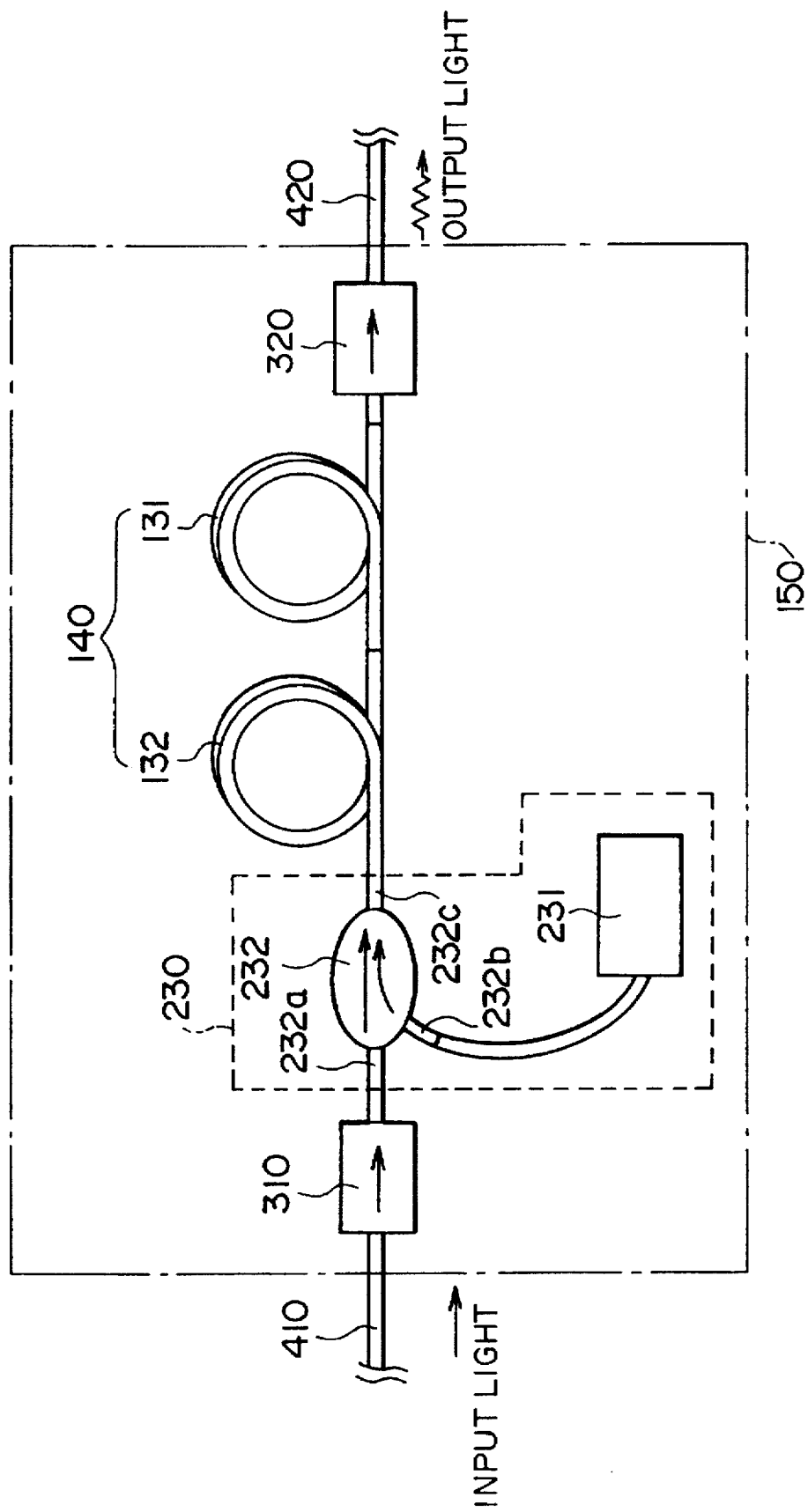
FIG. 24 is a view showing a configuration of an optical amplifier repeater of the sixth embodiment of the present invention.

FIG. 24 shows a configuration of an optical fiber amplifier of the present invention. As shown in FIG. 22, the optical amplifier repeater includes an optical fiber amplifier 150 similar to the fifth embodiment, receives signal light through a transmitting optical fiber 410, amplifies the signal light, and emits the amplified signal light to a transmitting optical fiber 420. The optical fiber amplifier 150 has the same configuration as the optical fiber amplifier 100 in the third embodiment except that the arrangement order of the optical fiber 131 and the optical fiber 132 in the optical fiber 140 reversed.

Figure 25:
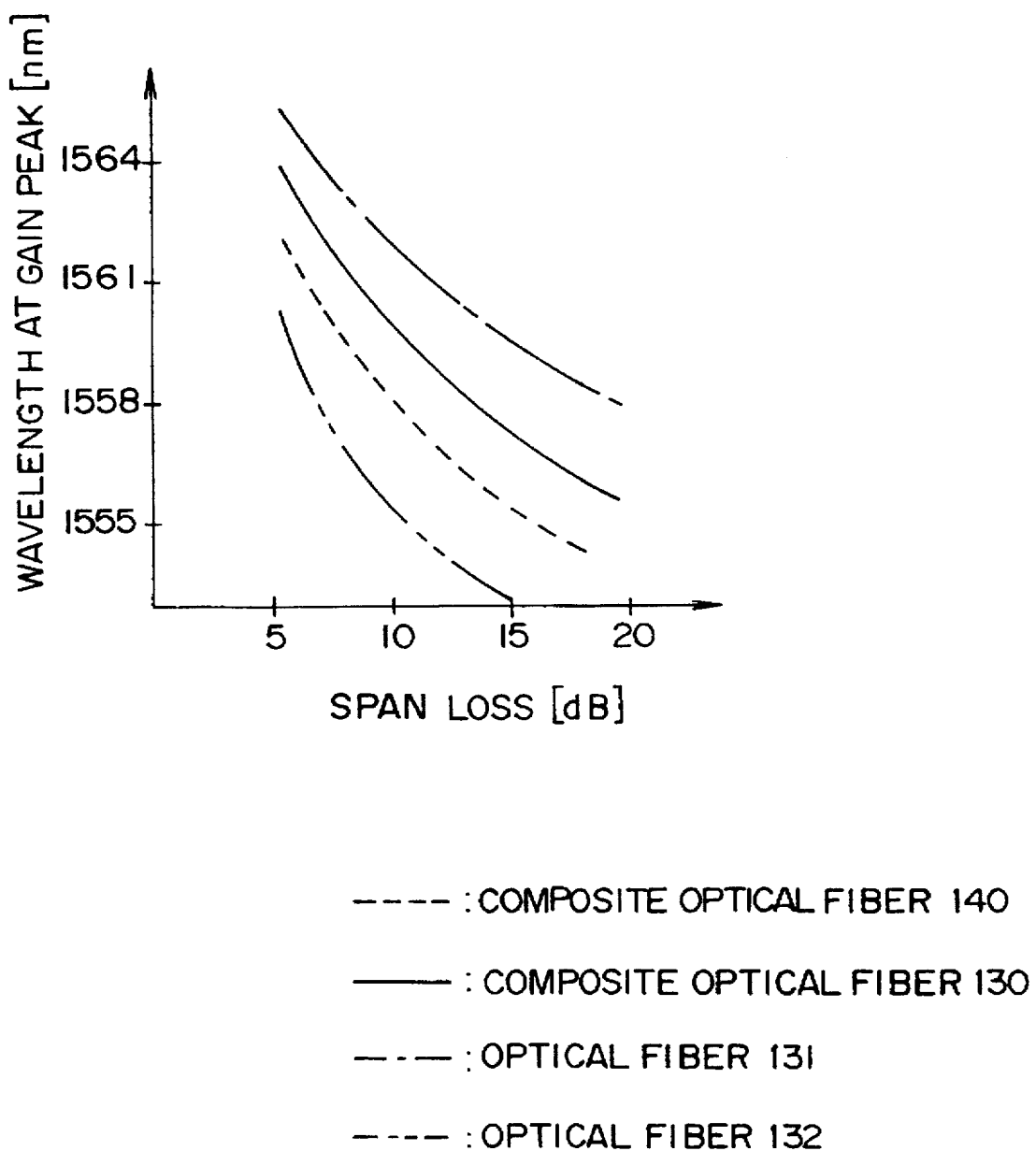
FIG. 25 is a graph showing characteristics of an optical amplifier repeater of the sixth embodiment.
Figure 26A:
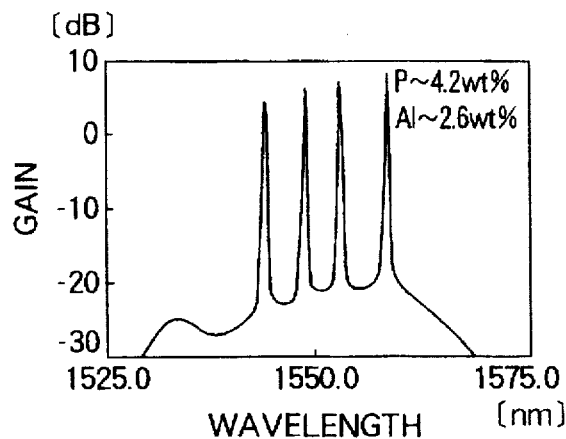
FIGS. 26A to 26D are graphs showing wavelength characteristics of amplification gain when 4 waves (with wavelengths of 1,543 nm, 1,548 nm, 1,552 nm, and 1,558 nm) are collectively amplified.
Figure 26B:
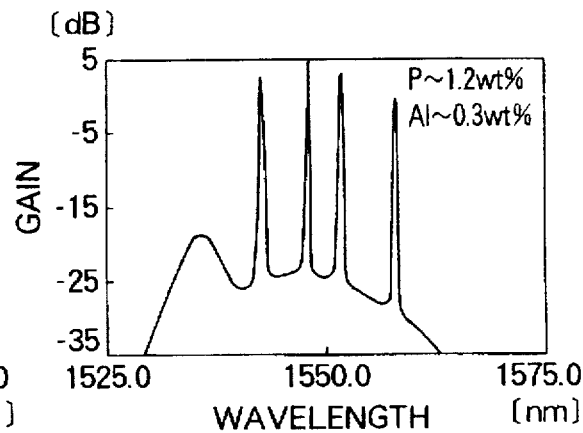
Figure 26C:
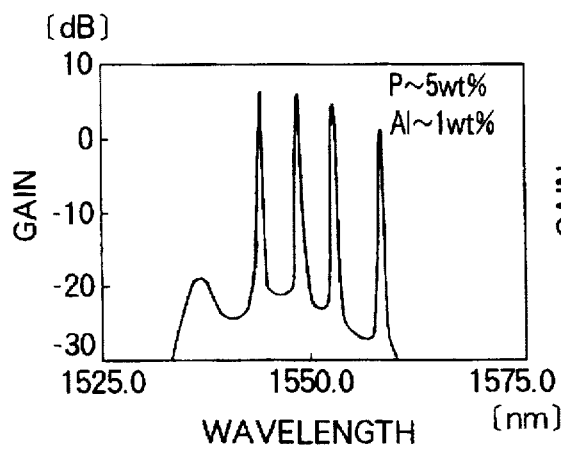
Figure 26D:
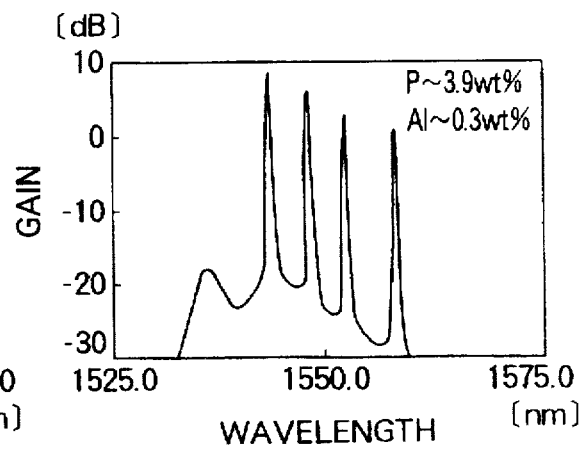

FIG. 25 is a graph showing a characteristic of a span loss where the optical amplifier repeater of the present embodiment is used in the multistage relay transmission line. Note that a characteristic of an optical fiber of which the total Er loss is 80 dB and which has the same composition as the optical fiber 131, a characteristic of an optical fiber of which the total Er loss is 80 dB and which has the same composition as the optical fiber 132, and a characteristic of the third embodiment are also shown in FIG. 25 for comparison. It is seen from the comparison in the graph of FIG. 25 that the dependency of the wavelength at the gain peak of the composite optical fiber 140 due to the span loss is a variation of the dependency of the wavelength at the gain peak of the single optical fiber due to the span loss. It is also seen that as the arrangement order of the optical fibers in the composite optical fiber is changed, the dependency of the wavelength at the gain peak due to span loss is varied.

In this optical fiber amplifier, Er in the composite optical fiber 140 is excited with excitation light supplied from the excitation device 230, and both the optical fiber 131 and the optical fiber 132 are set in a ready state for amplifying input signal light. With this state, when signal light (1.5 μm band) is incident on the composite optical fiber 140 through the optical isolator 310 and the directional coupler 232, first the signal light is amplified by induced emission from the excited Er in the optical fiber 132. At the same time as the amplification of the signal light, light is generated due to spontaneous emission and the generated light together with the induced emission light is incident on the optical fiber 131. The light incident on the optical fiber 131 is amplified by the induced emission from the excited Er in the optical fiber 131. At the same time as the amplification of the light, light is generated due to spontaneous emission and the generated light together with the induced emission light emerges from the composite optical fiber 140. Light emerging from the composite optical fiber 140 is amplified so as to have the amplification property that the wavelength at the gain peak is determined in accordance with the dependence on the span loss as shown in FIG. 25, and then passes through the optical isolator 320 and becomes output light of the optical amplifier repeater.

In the present embodiment, forward pumping is employed as a method for supplying excitation light but backward pumping bidirectional pumping can be employed, by which the wavelength dependency of the composite optical fiber 140 can also be set to be different from the wavelength dependency of the optical fiber 131 or the optical fiber 132.

Note that in the third embodiment and the fourth embodiment, the amplifying optical fibers of which the total Er losses are substantially the same are used but the ratio of the total Er losses can arbitrarily be set. Further, the composition of the amplifying optical fiber is not limited to the above examples, and also the amplifying optical fibers forming the composite optical fiber are not limited to the two kinds. As the ratio of the total Er losses, the composition of the optical fiber for amplifier, or the number of kinds of the amplifying optical fiber is controlled, optical amplifier repeaters with various relations of the span loss and the wavelength at the gain peak can be achieved.

Thus, as described above, according to an optical fiber amplifier of the present invention, a composite optical fiber in which amplifying optical fibers with different compositions are serially coupled is used for amplification, so that an optical fiber amplifier in which wavelength dependency of gain is reduced, and an optical fiber amplifier in which a wavelength at a gain peak is precisely controlled can be achieved.

Further, according to an optical amplifier repeater of the present invention, an optical fiber amplifier of the present invention in which a wavelength at a gain peak is precisely controlled is used, so that an optical amplifier repeater in which a wavelength of signal light becomes a wavelength at a gain peak in accordance with a span loss due to the location of the optical amplifier repeater during formation of the transmission line can be achieved, and a multistage relay transmission line in which signal light is appropriately filtered can be constructed.

Figure 39:
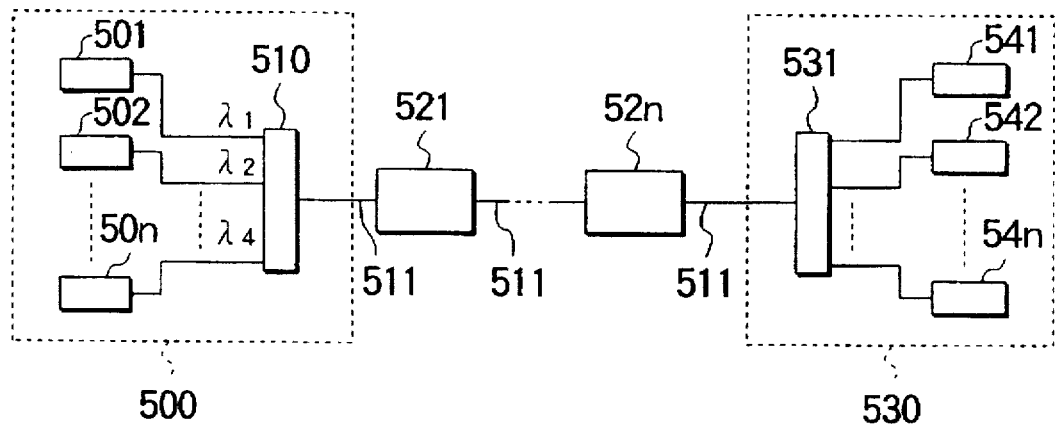
FIG. 39 is a view showing a configuration of a conventional optical repeating and transmitting apparatus.

Before next embodiment is described, the outline of the following embodiments are described below:

Optical communication in which light having a plurality of different wavelengths is transmitted as composite signal light, for example, that performing wavelength division multiplexing transmission, is effected by using an optical repeating and transmitting apparatus such as that shown in FIG. 39.

First, at a transmitting terminal station 500, n pieces of information signals are converted into optical signals having wavelengths of $\lambda 1, \lambda 2, \ldots,$ and $\lambda n$ by optical transmitters 501, 502, ..., and 50n, respectively. These n waves of optical signals are wavelength-multiplexed by an optical multiplexer 510. This wavelength-multiplexed optical signal is transmitted to an optical fiber transmission path 511.

In the optical fiber transmission path 511, optical amplifiers 521, ..., and 52n are disposed. The wavelength-multiplexed optical signal is collectively amplified by these optical amplifiers 521, ..., and 52n. In this manner, the optical signal is transmitted to a receiving terminal station 530, while its loss during transmission is being compensated for.

At the receiving terminal station 530, the wavelength-multiplexed optical signal is demultiplexed into optical signals having wavelengths of $\lambda 1, \lambda 2, \ldots,$ and $\lambda n$ by an optical demultiplexer 531. Further, these n waves of optical signals are converted into n pieces of information signals by optical receivers 541, 542, ..., and 54n and then extracted.

As an optical amplifier used in such an optical repeating and transmitting apparatus which transmits light having a plurality of different wavelengths as signal light, an optical fiber amplifier using an amplifying fiber whose core is doped with a rare earth element has recently been studied in view of its high gain and excellent low noise characteristics. In particular, an erbium-doped fiber amplifier (EDFA) using an erbium-doped fiber (EDF), namely, an optical fiber doped with Er which is a rare earth element, has been considered to be promising as an optical amplifier for a wavelength band of 1.55 μm.

In order to attain faithful amplification of optical signals, it is necessary for an amplifier used in an optical repeating and transmitting apparatus, which transmits light having a plurality of different wavelengths as signal light, to satisfy the following requirements:

(1) that a flat amplification characteristic is attained with respect to wavelengths when a plurality of wavelengths are simultaneously amplified, namely, the gains for respective wavelengths coincide with each other; and (2) that the relationship between the gains of the wavelengths is constant with respect to fluctuation in the level of signal light input into the amplifier.

However, since the amplification gain of the above-mentioned EDFA has a wavelength dependency, the gains for different wavelengths do not usually become flat when two or more waves of optical signals are amplified. Also, the relationship between the wavelengths depends on the level of the signal light input to the EDFA.

In order to solve these problems, the following measures, for example, have been studied:

1) The power of the signal light input to the EDFA is set and the power values of the optical signals with the respective wavelengths at the transmitting terminal are adjusted such that the power values of the optical signals with the respective wavelengths are identical to each other at the receiving terminal, thereby enabling wavelength-multiplexed transmission (cf. A. R. Chraplyvy, et al., IEEE Photonics Technol. Lett. 1993, 5, (4), pp. 428–429).

2) The power of the signal light input to the EDFA is set and a gain equalizer or the like is disposed within the EDFA so as to flatten the gain with respect to wavelength (cf. H. Toba, et al., IEEE Photonics Technol. Lett. 1993, 5, (2), pp. 248–251).

3) The EDF is actuated under a low temperature condition (77K) so as to flatten the gain with respect to wavelength (cf. E. L. Goldstein, et al., Tech. Dig. OFC '93, 1993, Paper PD10).

4) In place of quartz glass, fluoride glass is used as a host glass of the EDF so as to flatten the gain with respect to wavelength (cf. J. F. Marcerou, et al., Tech. Dig. ECOC '92, Paper Mo A2.3 and D. Ronarc 'h, et al., Tech. Dig. Topic Meeting on Optical Amplifiers '93, Paper PD10).

Figure 40:
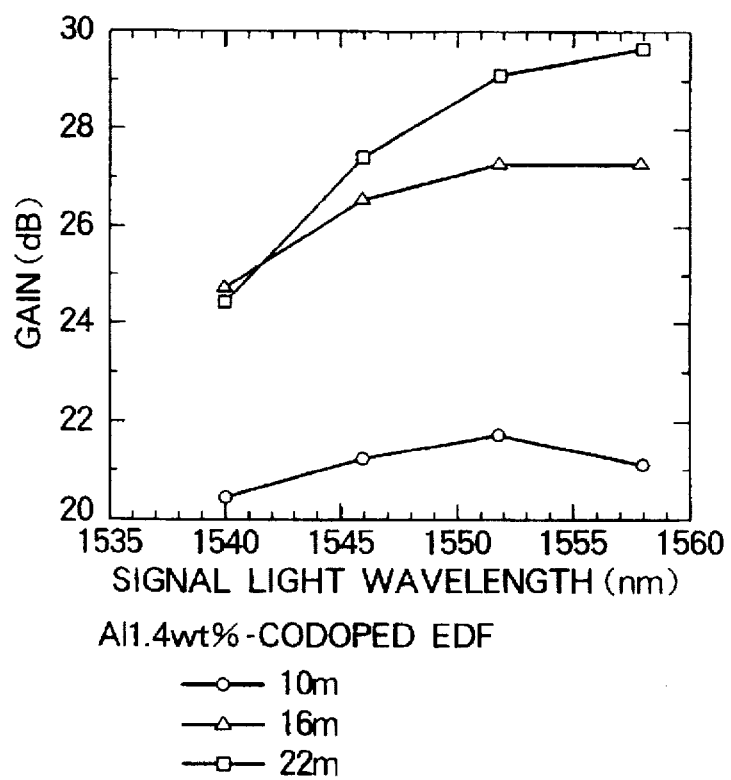
FIG. 40 is a graph showing a multiple-wavelength collective amplification characteristic of an optical fiber amplifier using an EDF codoped with 1.4 wt % of Al.

However, in each of these techniques, since the level of the signal light input to the EDFA has to be constant as a prerequisite, the power values of the optical signals with the respective wavelengths at the receiving terminal may be different from each other when the level of the signal light input to the EDFA fluctuates, for some reason, at the time of actual operation of the light repeating and transmitting apparatus. Accordingly, the length of the EDF may be shortened so as to make the difference in gain between individual wavelengths constant with respect to the fluctuation in the level of the input signal light. Namely, as shown in the graph of FIG. 40, which indicates multiple-wavelength collective amplification characteristics of optical signals in an optical fiber amplifier using an EDF codoped with 1.4 wt % of Al, for example, there is a tendency that the change in amplification gain with respect to signal light wavelength becomes smaller as the fiber length of the EDF is shorter. Thus, the wavelength dependency of the amplification gain becomes smaller and the amplification characteristic becomes flatter.

However, when the length of the EDF is shortened, occurs in a problem that the number of $Er^{3+}$ ions in the fiber decreases and thereby the output of the EDFA is lowered.

In order to overcome the foregoing problems, the object of the following embodiments are to provide an optical repeating and transmitting apparatus in which, in transmission of an optical signal having a plurality of wavelength components, multiple-wavelength collective amplification is effected so as to attain substantially a constant gain for individual wavelengths, regardless of the level of the input signal light, thereby compensating for loss in transmission.

Another object of the following embodiments are to provide a method of optical communication in which, in transmission of an optical signal having a plurality of wavelength components, multiple-wavelength collective amplification is effected so as to attain substantially a constant gain for individual wavelengths, regardless of the level of the input signal light, thereby compensating for loss in transmission.

The optical repeating and transmitting apparatus is an optical repeating and transmitting apparatus in an optical fiber transmission path for transmitting a wavelength-multiplexed optical signal and includes (a) a transmitting terminal station for converting a plurality of information signals to optical signals having a plurality of wavelengths and then wavelength-multiplexing these optical signals having a plurality of wavelengths; (b) a repeater which is disposed in the optical fiber path and in which a plurality of optical fiber amplifiers having wavelength dependency characteristics of amplification gain with respect to the wavelength-multiplexed optical signal different from each other are serially connected; and (c) a receiving terminal station for demultiplexing the wavelength-multiplexed signal, which has been subjected to multiple-wavelength collective amplification by the repeater and transmitted through the optical fiber transmission path, into a plurality of wavelengths and then converting thus demultiplexed optical signals having a plurality of wavelengths into a plurality of information signals, while a plurality of the optical fiber amplifiers in the repeater, as a whole, make the amplification gains of the individual wavelengths of the wavelength-multiplexed optical signal substantially constant.

The optical repeating and transmitting apparatus is an optical repeating and transmitting apparatus in an optical fiber transmission path for transmitting a wavelength-multiplexed optical signal and includes a plurality of repeaters which are disposed in a predetermined order in the optical fiber transmission path and have a plurality of kinds of wavelength dependency characteristics of amplification gain with respect to the above-mentioned optical signal, while each of the repeaters has an optical fiber amplifier for amplifying the optical signal and a plurality of the repeaters disposed in the optical fiber transmission path, as a whole, make the amplification gains of the individual wavelengths of the wavelength-multiplexed optical signal substantially constant.

In this optical repeating and transmitting apparatus, each of the above-mentioned repeaters may have a single optical fiber amplifier. Also, a plurality of the repeaters may have two kinds of wavelength dependency characteristics of amplification gain with respect to the above-mentioned optical signal, while the repeaters having the respective kinds of wavelength dependency characteristics may be alternately disposed in the optical fiber transmission path.

The optical fiber amplifier in the optical repeating and transmitting apparatus may include i) a plurality of amplifying fibers which are doped with a rare earth element and have compositions different from each other and ii) an excitation device which generates excitation light for amplifying the signal light and supplies the excitation light to a plurality of the amplifying fibers.

The optical fiber amplifier in the optical repeating and transmitting apparatus may include i) an amplifying fiber which is doped with a rare earth element and ii) an excitation device which generates excitation light for amplifying the signal light and supplies the excitation light to the amplifying fiber.

Here, the amplifying fiber preferably includes i) an Er-doped fiber containing at least 0.1 wt % of Al or ii) an Er-doped fiber containing at least 0.1 wt % of P.

Also, the amplifying fiber may include i) an Er-doped fiber containing neither Al nor P or ii) an Er-doped fiber containing at least 0.1 wt % of Al.

Further, the amplifying fiber may include i) an Er-doped fiber containing at least 0.1 wt % of P or ii) an Er-doped fiber containing neither Al nor P.

The Er-doped fiber containing at least 0.1 wt % of P may also contain Al in addition to P. The content of P may be twice as much by weight as the content of Al, or more.

The optical communication method in accordance with the following embodiments includes the steps of (a) at a transmitting terminal station, converting a plurality of information signals to optical signals having a plurality of wavelengths and then wavelength-multiplexing these optical signals having a plurality of wavelengths; (b) transmitting, through an optical fiber transmission path, the wavelength-multiplexed optical signal which has been output from the transmitting terminal station; (c) at a repeater disposed in the optical fiber transmission path, by using a plurality of optical fiber amplifiers having wavelength dependency characteristics of amplification gain with respect to the wavelength-multiplexed optical signal different from each other, sequentially amplifying the wavelength-multiplexed optical signal with the respective wavelength dependency characteristics and, by using the plurality of the optical fiber amplifiers as a whole, making the amplification gains of the individual wavelengths of the wavelength-multiplexed optical signal substantially constant; and (d) at a receiving terminal station, demultiplexing the wavelength-multiplexed signal, which has been subjected to multiple-wavelength collective amplification by the repeater and transmitted through the optical fiber transmission path, into a plurality of wavelengths and then converting thus demultiplexed optical signals having a plurality of wavelengths into a plurality of information signals.

Also, the optical communication method in accordance with the following embodiments includes the steps of (a) transmitting an optical signal having a plurality of wavelength components through an optical fiber transmission path; (b) by using a plurality of repeaters which are disposed in a predetermined order in the optical fiber transmission path and have a plurality of kinds of wavelength dependency characteristics of amplification gain with respect to the optical signal having a plurality of wavelength components, sequentially amplifying the optical signal having a plurality of the wavelengths with the respective wavelength dependency characteristics and, by using a plurality of the repeaters as a whole, making the amplification gains of the individual wavelengths of the optical signal having a plurality of the wavelength components substantially constant.

In one of the optical repeating and transmitting apparatus in accordance with the following embodiments, since a repeater including a plurality of optical fiber amplifiers having wavelength dependency characteristics of amplification gain with respect to the wavelength-multiplexed optical signal different from each other is disposed in the optical fiber transmission path, the wavelength dependency characteristics of the amplification factors in a plurality of the optical fiber amplifiers are offset against each other so as to attain a flat amplification characteristic, for a plurality of the optical fiber amplifiers serially connected in the repeater as a whole, with respect to wavelength, thereby making the amplification gains of the individual wavelengths in the wavelength-multiplexed optical signal substantially constant. Also, the fiber lengths of the individual optical fiber amplifiers may be adjusted so as to make the difference in amplification gains between the individual wavelengths with respect to fluctuation in the level of input optical signal as constant as possible. Accordingly, in the wavelength-multiplexed transmission of optical signals, there can be realized an optical repeating and transmitting apparatus which enables multiple-wavelength collective amplification so as to make the gains in individual wavelengths substantially constant regardless of the level of input signal light and thereby compensates for loss in transmission.

Also, in the other optical repeating and transmitting apparatus in accordance with the following embodiments, since a plurality of optical fiber amplifiers having wavelength dependency characteristics of amplification gain with respect to the optical signal having a plurality of wavelength components (including the wavelength-multiplexed optical signal) different from each other are alternately disposed in the optical fiber transmission path in a predetermined order, the wavelength dependency characteristics of the amplification factors in a plurality of the optical fiber amplifiers are offset against each other so as to attain a flat amplification characteristic, for a plurality of the optical fiber amplifiers disposed in the optical fiber transmission path as a whole, with respect to wavelength, thereby making the amplification gains of the individual wavelengths in the optical signal substantially constant. Also, the fiber lengths of the individual optical fiber amplifiers may be adjusted so as to make the difference in amplification gains between the individual wavelengths with respect to fluctuation in the level of input optical signal as constant as possible. Accordingly, in the wavelength-multiplexed transmission of optical signals, there can be realized an optical repeating and transmitting apparatus which enables multiple-wavelength collective amplification so as to make the gains in individual wavelengths substantially constant regardless of the level of input signal light and thereby compensates for loss in transmission.

Further, in one of the optical communication method in accordance with the following embodiments, when a wavelength-multiplexed optical signal is transmitted through an optical fiber transmission path, in the repeater disposed in the optical fiber transmission path, a plurality of optical fiber amplifiers having wavelength dependency characteristics of amplification gain with respect to the wavelength-multiplexed optical signal different from each other can be used to sequentially amplify the wavelength-multiplexed optical signal with the respective wavelength dependency characteristics and offset the wavelength dependency characteristics of the amplification factors against each other, so as to attain a flat amplification characteristic, for a plurality of the optical fiber amplifiers in the repeater as a whole, with respect to wavelength, thereby making the amplification gains of the individual wavelengths in the wavelength-multiplexed optical signal substantially constant. Also, the fiber lengths of the individual optical fiber amplifiers may be adjusted so as to make the difference in amplification gains between the individual wavelengths with respect to fluctuation in the level of input optical signal as constant as possible. Accordingly, in the wavelength-multiplexed transmission of optical signals, there can be realized an optical communication method which enables multiple-wavelength collective amplification so as to make the gains in individual wavelengths substantially constant regardless of the level of input signal light and thereby compensates for loss in transmission.

Also, in the other optical communication method in accordance with the following embodiments, when an optical signal having a plurality of wavelength components (including the wavelength-multiplexed optical signal) is transmitted through an optical fiber transmission path, a plurality of optical fiber amplifiers disposed in the optical fiber transmission path in a predetermined order having wavelength dependency characteristics of amplification gain with respect to the optical signal different from each other can be used to sequentially amplify the optical signal with the respective wavelength dependency characteristics and offset the wavelength dependency characteristics of the amplification factors against each other, so as to attain a flat amplification characteristic, for a plurality of the optical fiber amplifiers disposed in the optical fiber transmission path as a whole, with respect to wavelength, thereby making the amplification gains of the individual wavelengths in the wavelength-multiplexed optical signal substantially constant. Also, the fiber lengths of the individual optical fiber amplifiers may be adjusted so as to make the difference in amplification gains between the individual wavelengths with respect to fluctuation in the level of input optical signal as constant as possible. Accordingly, in the wavelength-multiplexed transmission of optical signals, there can be realized an optical communication method which enables multiple-wavelength collective amplification so as to make the gains in individual wavelengths substantially constant regardless of the level of input signal light and thereby compensates for loss in transmission.

Next, before explaining the following embodiments of the present invention, explanation will be provided for the discovery obtained by the inventor as a result of studies concerning an Er-doped optical amplifying fiber used in the optical repeating and transmitting apparatus in accordance with the present invention. The optical repeating and transmitting apparatus in accordance with the present invention utilizes the fact that the wavelength characteristic of amplification gain varies depending on the kind and amount of elements codoped with Er. Namely, a plurality of Er-doped fibers having different kinds or amounts of codoped elements are serially connected so as to construct a transmission path which, as a whole, reduces the wavelength dependency characteristic of amplification gain.

The inventor measured, by experiments, the wavelength characteristics of amplification gain obtained when multiple wavelengths were collectively amplified with various dopant amounts. FIGS. 26A, 26B, 26C, and 26D are graphs showing wavelength characteristics of amplification gain when 4 waves (with wavelengths of 1,543 nm, 1,548 nm, 1,552 nm, and 1,558 nm) are collectively amplified. During measurement, a bidirectional pumping method was used under the condition where excitation light wavelength was 1.47 µm, forward pumping light intensity was 25 mW, and backward pumping light intensity was 25 mW. Also, the length Li [m] of each Er-doped fiber was adjusted such that the absorption loss of each Er-doped fiber at a wavelength of 1.55 µm, i.e., $\alpha_{1.55,i}$ [dB/m], and the length Li [m] of each Er-doped fiber satisfied the following relationship:

$$\alpha_{1.55,i} Li = 60 [dB]$$

Figure 27:
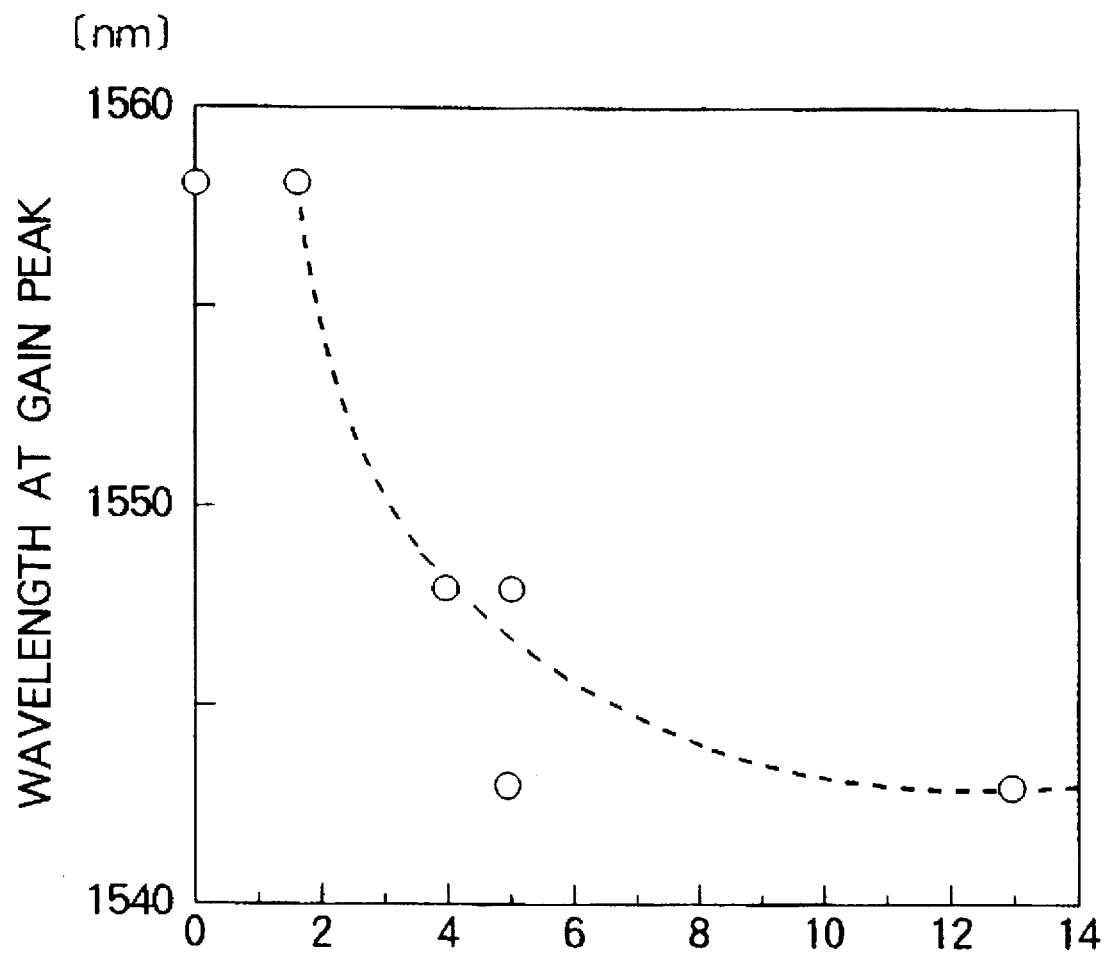
FIG. 27 is a graph showing change in amplification peak wavelength according to change in (added P amount)/(added Al amount).

FIGS. 26A, 26B, 26C, and 26D respectively show measured results of the fiber codoped with 4.2 wt % of P and 2.6 wt % of Al, that codoped with 1.2 wt % of P and 0.3 wt % of Al, 5 wt % of P and 1 wt % of Al, and that codoped with 3.9 wt % of P and 0.3 wt % of Al. While measurement was also effected at dopant amounts other than those of FIGS. 26A to 26D, it has been found that the wavelength characteristic of amplification gain is determined by the value of β=(added P amount)/(added Al amount) and substantially constant within the range of β=0 to 2. FIG. 27 is a graph showing the change in amplification peak wavelength according to change in β under the experimental condition of FIGS. 26A to 26B.

Namely, in multiple wavelength amplification in the 1.55 µm-band, when α>2, it has been observed that as the wavelength the increase, the gain decreases. In contrast, when β=0, i.e. when only Al and Er are doped into a fiber, as the wavelength increases, the gain also increases in this band.

Accordingly, based on the above-mentioned discovery, when a plurality of Er-doped fibers having different kinds or amounts of codoped elements are serially connected, the wavelength dependency characteristic of amplification gain can be flattened as a whole.

Next, embodiments of the present invention will be explained with reference to the attached drawings. In explanation of drawings, the same elements will be referred to by the same marks while omitting overlapping explanations.
(Seventh Embodiment)

Figure 28A:
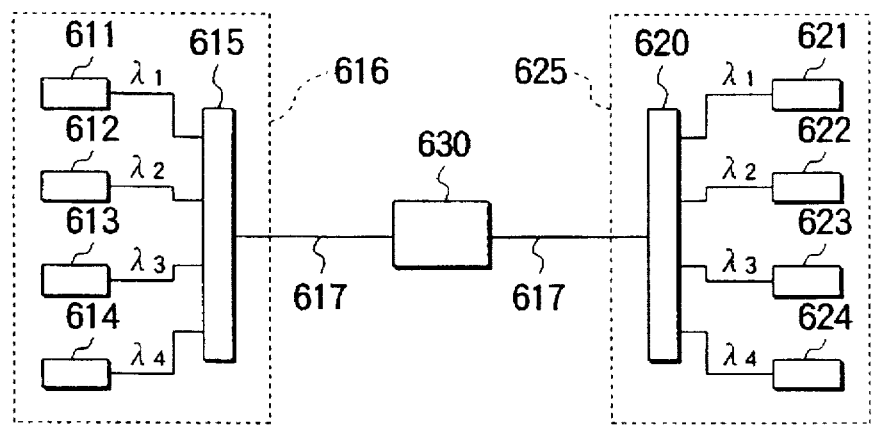
FIGS. 28A and 28B are views showing a configuration of an optical repeating and transmitting apparatus in accordance with the seventh embodiment of the present invention, respectively representing an Overall configuration of the optical repeating and transmitting apparatus and a configuration of an optical amplifier repeater thereof.
Figure 28B:
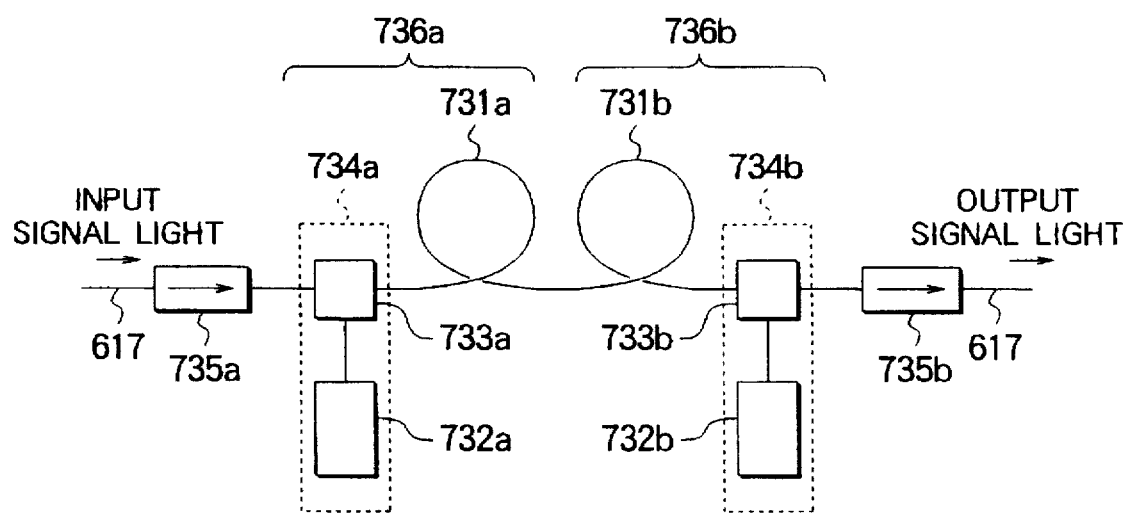

The optical repeating and transmitting apparatus in this embodiment belongs to the first optical repeating and transmitting apparatus in accordance with the present invention in which, in wavelength-multiplexed transmission of an optical signal, multiple-wavelength collective amplification is performed so as to make the gains of individual wavelengths substantially constant, regardless of the level of the input signal light, thereby compensating for loss in transmission. FIGS. 28A and 28B are views showing a configuration of an optical repeating and transmitting apparatus in accordance with this embodiment. Namely, FIG. 28A represents an overall configuration of the 5 optical repeating and transmitting apparatus, while FIG. 28B represents a configuration of an optical amplifier repeater thereof.

As shown in FIG. 28A, the optical repeating and transmitting apparatus of this embodiment includes (a) a transmitting terminal station 616 which has comprising optical transmitters 611, 612, 613, and 614 which convert, for example, 4 pieces of information signals into optical signals with wavelengths λ1, λ2, λ3, and λ4 in the wavelength band of 1.55 µm, respectively, and an optical multiplexer 615 which wavelength-multiplexes these 4 waves of the optical signals; (b) an optical fiber transmission path 617 for transmitting the optical signal output from the optical multiplexer 615 of the transmitting terminal station 616; (c) a receiving terminal station 625 formed of an optical demultiplexer 620, which demultiplexes the optical signal transmitted through the optical fiber transmission path 617 into optical signals respectively having wavelengths λ1, λ2, λ3, and λ4, and optical receivers 621, 622, 623, and 624 which convert thus demultiplexed signals into 4 pieces of information signals; and (d) an optical amplifier repeater 630 which is disposed in the optical fiber transmission path 617 and in which a plurality of optical fiber amplifiers having wavelength dependency characteristics of amplification gain with respect to the wavelength-multiplexed optical signal which tend to be different from each other are serially connected.

Also, as shown in FIG. 28B, the optical amplifier repeater 630 includes i) an EDF 731a codoped with 1.4 wt % of Al, for example, as an Er-doped fiber containing at least 0.1 wt % of Al; ii) an EDF 731b codoped with 5 wt % of P and 1 wt % of Al, as an Er-doped fiber containing at least 0.1 wt % of P, which is serially connected to the EDF 731a by fusing; iii) an excitation device 734a for supplying excitation light to the EDF 731a and EDF 731b which includes an excitation light source 732a for generating the excitation light and a multiplexer 733a which receives the excitation light generated by the excitation light source 732a and outputs it to the input side of the EDF 731a; iv) excitation device 734b for supplying excitation light to the EDF 731a and EDF 731b which includes an excitation light source 732b for generating the excitation light and a multiplexer 733b which receives the excitation light generated by the excitation light source 732b and outputs it to the output side of the EDF 731b; v) an optical isolator 735a which receives the signal light transmitted through the optical fiber transmission path 617 and only transmits a light component proceeding in the direction of progress of the input signal light so as to output it to the EDF 731a; and vi) an optical isolator 735b which transmits only a light component proceeding in the direction of progress of the signal light output from the EDF 731b so as to output it to the optical transmission path 617. As the excitation device for supplying excitation light to EDF 731a and EDF 731b, both or one of the excitation device 734a and the excitation device 734b may be used to excite the EDF 731a and EDF 731b by forward pumping or backward pumping method.

Thus, a first optical fiber amplifier 736a is constructed by the EDF 731a, the excitation device 734a, and the excitation device 734b; while a second optical fiber amplifier 736b is constructed by the EDF 731b, the excitation device 734a, and the excitation device 734b.

In the following, various characteristics of the first optical fiber amplifier 736a using the EDF 731a and the second optical fiber amplifier 736b using the EDF 731b will be explained. Here, the explanation will be based on the data of experiments which were independently performed with respect to an optical fiber amplifier using an EDF codoped with 1.4 wt % of Al and that using an EDF codoped with 5 wt % of P and 1 wt % of Al.

Figure 29:
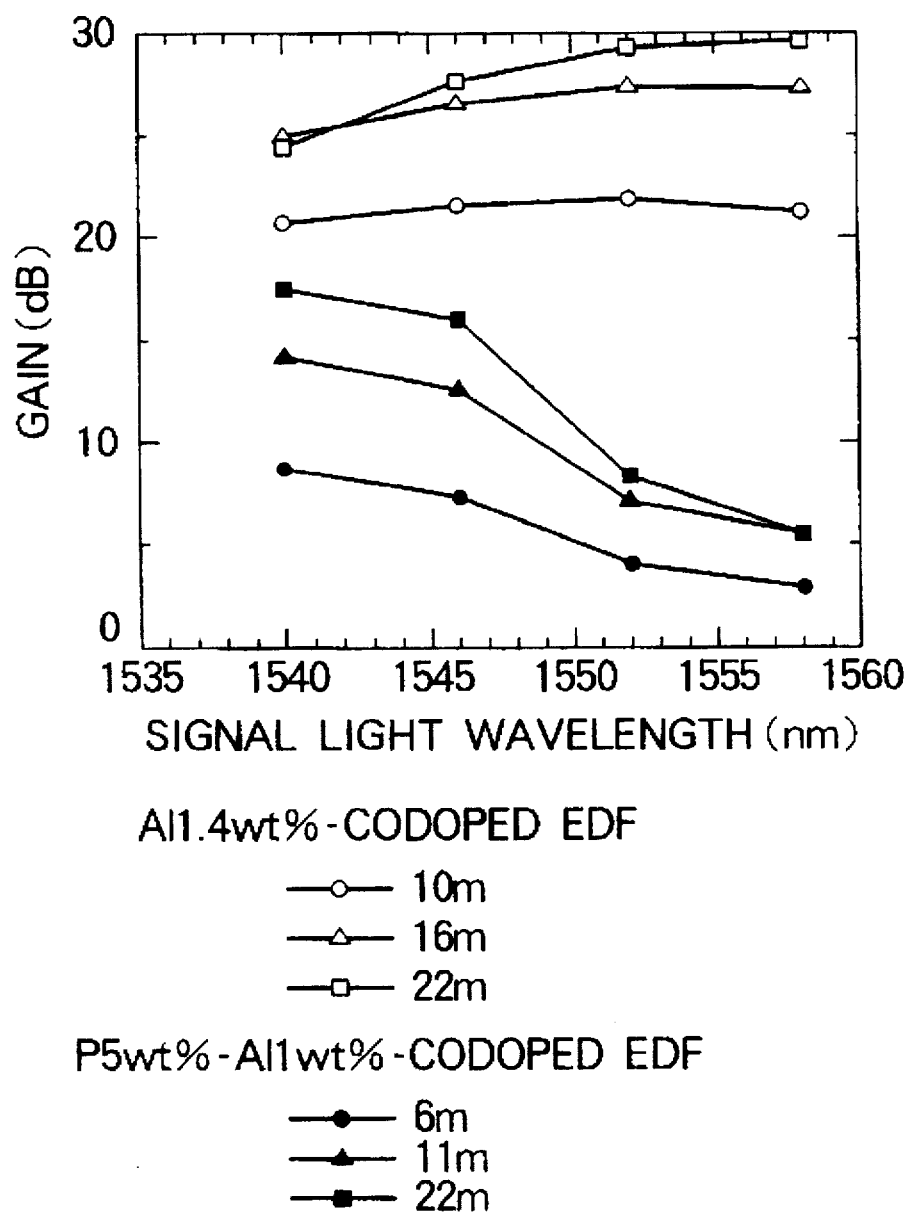
FIG. 29 is a graph showing multiple-wavelength collective amplification characteristics of an optical fiber amplifier using an EDF codoped with 1.4 wt % of Al and that using an EDF codoped with 5 wt % of P and 1 wt % of Al concerning a wavelength-multiplexed optical signal.

FIG. 29 is a graph showing multiple-wavelength collective amplification characteristics of an optical fiber amplifier using an EDF codoped with 1.4 wt % of Al and that using an EDF codoped with 5 wt % of P and 1 wt % of Al concerning a wavelength-multiplexed optical signal. For this measurement of amplification gain, a backward pumping method was used under conditions where the excitation wavelength was 1.47 μm, the pumping power was 50 mW, the input signal light power was −20 dBm/channel, the signal light wavelength were 1,540; 1,546; 1,552; and 1,558 nm, the fiber length of the EDF 731a codoped with 1.4 wt % of Al were 10, 16 and 27 m, the fiber length of the EDF 731b codoped with 5 wt % of P and 1 wt % of Al were 6, 11 and 22 m.

As shown in this graph, at the wavelength band of 1.55 μm, the optical fiber amplifier using the EDF codoped with 1.4 wt % of Al has a tendency that the amplification gain becomes higher as the wavelength of the signal light is longer, while the optical fiber amplifier using the EDF codoped with 5 wt % of P and 1 wt % of Al has a tendency that the amplification gain becomes lower as the wavelength of the signal light is longer. Namely, their wavelength dependency characteristics of amplification gain with respect to the wavelength of the signal light tend to be contrary to each other. Also, in both of the optical fiber amplifier using the EDF codoped with 1.4 wt % of Al and that using the EDF codoped with 5 wt % of P and 1 wt % of Al, there is a tendency that the rate of change in amplification gain with respect to the wavelength of the signal light becomes smaller as the fiber length of the EDF is shorter. Namely, there is a tendency that the wavelength dependency of the amplification gain becomes smaller and thus the amplification characteristic at the wavelength band of 1.55 μm becomes flatter.

Figure 30A:
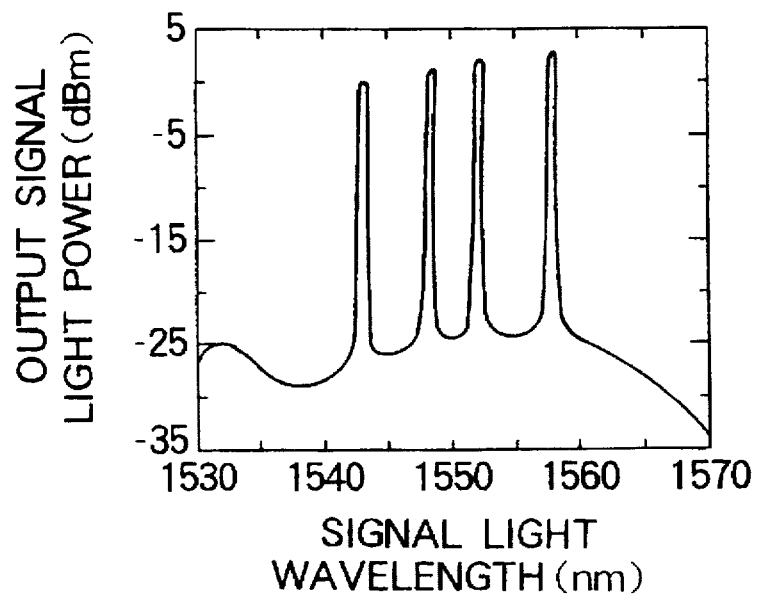
FIGS. 30A and 30B are graphs respectively showing output waveforms of an optical fiber amplifier using an EDF codoped with 1.4 wt % of Al and that using an EDF codoped with 5 wt % of P and 1 wt % of Al during multiple-wavelength collective amplification of a wavelength-multiplexed optical signal.
Figure 30B:
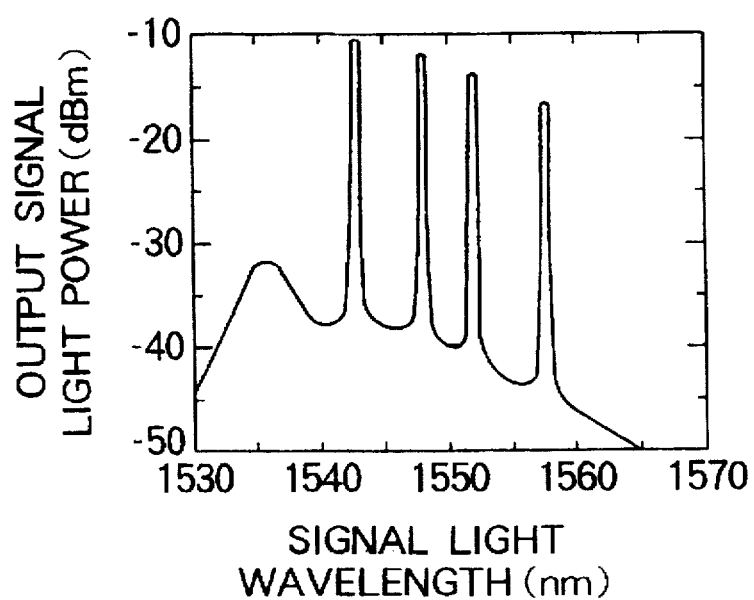

FIGS. 30A and 30B are graphs respectively showing output wave forms of an optical fiber amplifier using an EDF codoped with 1.4 wt % of Al and that using an EDF codoped with 5 wt % of P and 1 wt % of Al during multiple-wavelength collective amplification of a wavelength-multiplexed optical signal. For this measurement of output waveforms, a backward pumping method was used under conditions where the excitation wavelength was 1.47 μm, the pumping power was 50 mW, the input signal light power was −20 dBm/channel, the signal light wavelengths were 1,540; 1,546; 1,552; and 1,558 nm, fiber length of the EDF codoped with 1.4 wt % of Al was 22 m, the fiber length of the EDF codoped with 5 wt % of P and 1 wt % of Al was 9 m.

As shown in the graphs of FIGS. 30A and 30B, at the wavelength band of 1.55 μm, the optical fiber amplifier using the EDF codoped with 1.4 wt % of Al has a tendency that the output signal light power becomes higher as the wavelength of the signal light is longer, while the optical fiber amplifier using the EDF codoped with 5 wt % of P and 1 wt % of Al has a tendency that the output signal light power becomes lower as the wavelength of the signal light is longer. Such a wavelength dependency of the output signal light power corresponds to the multiple-wavelength collective amplification characteristics of the optical fiber amplifier using the EDF codoped with 1.4 wt % of Al and that using the EDF codoped with 5 wt % of P and 1 wt % of Al concerning the wavelength-multiplexed optical signal shown in the graph of FIG. 29.

Figure 31:
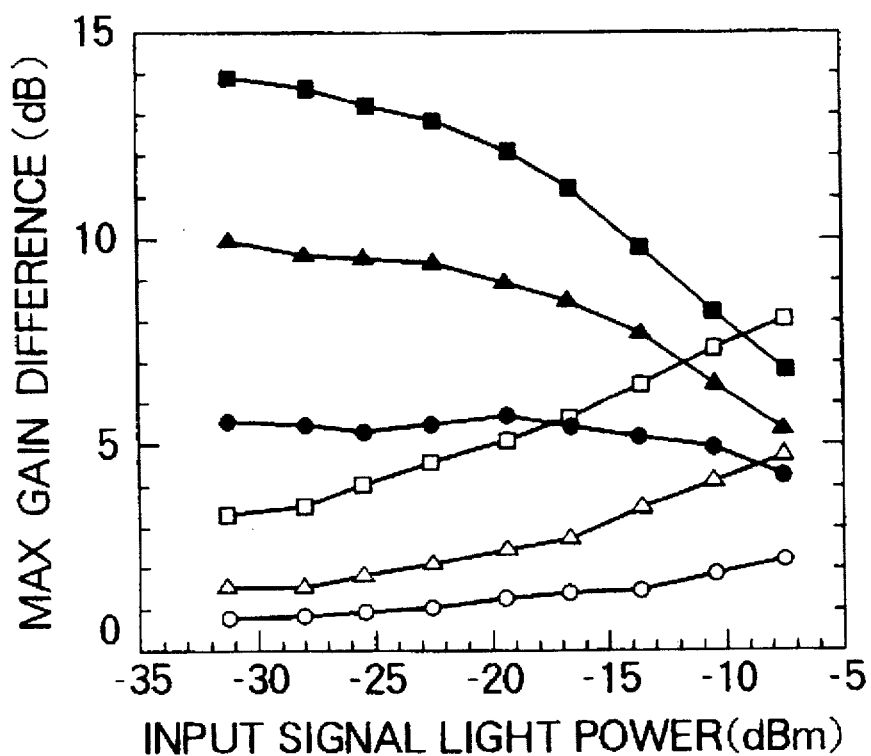
FIG. 31 is a graph showing a relationship of a maximum gain difference between wavelengths concerning a wavelength-multiplexed optical signal to power of input signal light in an optical fiber amplifier using an EDF codoped with 1.4 wt % of Al and that using an EDF codoped with 5 wt % of P and 1 wt % of Al.

FIG. 31 is a graph showing a relationship of the maximum gain difference between wavelengths (i.e., difference between the maximum gain and minimum gain in the amplification gains in individual wavelengths) concerning a wavelength-multiplexed optical signal to the power of input signal light in an optical fiber amplifier using an EDF codoped with 1.4 wt % of Al and that using an EDF codoped with 5 wt % of P and 1 wt % of Al. This measurement of the amplification gain was performed with a method and condition similar to those in the case of FIG. 29.

As shown in the graph of FIG. 31, in both of the optical fiber amplifier using the EDF codoped with 1.4 wt % of Al and that using the EDF codoped with 5 wt % of P and 1 wt % of Al, there is a tendency for the maximum gain difference between wavelengths becomes constant as their fiber length is shorter. However, since the output of each optical fiber amplifier depends on the number of $Er^{+3}$ ions in the EDF codoped with 1.4 wt % of Al and EDF codoped with 5 wt % of P and 1 wt % of Al, the output of the optical fiber amplifiers becomes lower as their fiber length is shorter.

The relationship between the optical fiber amplifier using the EDF codoped with 1.4 wt % of Al and that using the EDF codoped with 5 wt % of P and 1 wt % of Al with respect to the characteristics shown in FIGS. 29 to 31 is considered to be similar to the relationship between the first optical fiber amplifier 736a using the EDF 731a codoped with 1.4 wt % of Al and the second optical fiber amplifier 736b using the EDF 731b codoped with 5 wt % of P and 1 wt % of Al shown in the above-mentioned FIGS. 28A and 28B.

In the following, explanation will be provided for various characteristics of the optical amplifier repeater 630 in which the first and second optical fiber amplifiers 736a and 736b are serially connected.

Figure 32:
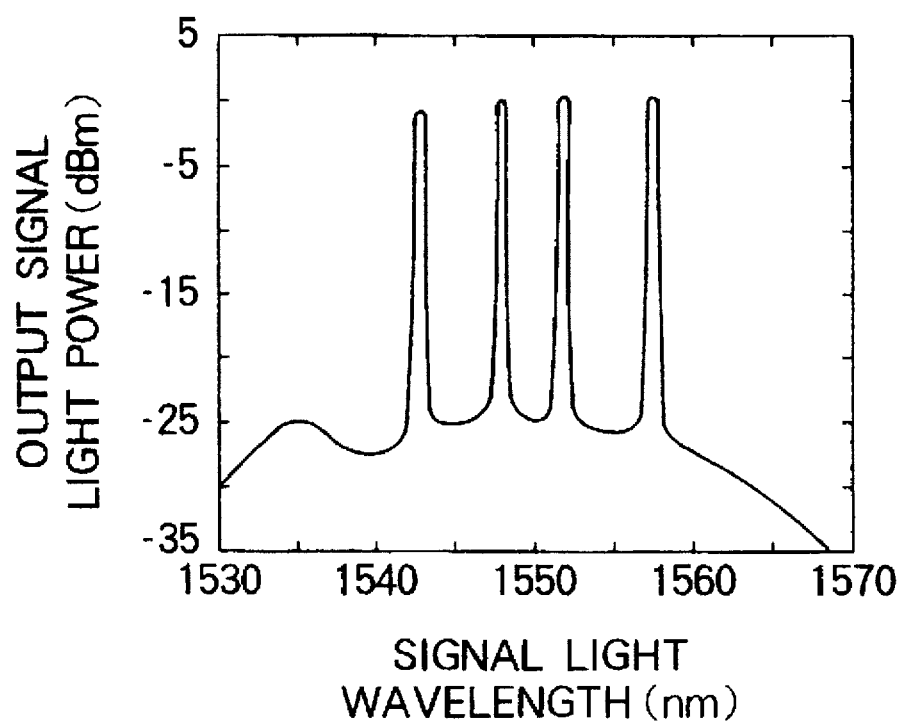
FIG. 32 is a graph showing an output wave form of the optical amplifier repeater in the seventh embodiment of the present invention during multiple-wavelength amplification of a wavelength-multiplexed optical signal.

FIG. 32 is a graph showing an output spectrum of the optical amplifier repeater 630, in which the first optical fiber amplifier 736a using the EDF 731a and the second optical fiber amplifier 736b using the EDF 731b are serially connected, during multiple-wavelength collective amplification of a wavelength-multiplexed optical signal. This measurement of the output wave form was performed using a method and condition similar to those in the case of FIGS. 30A and 30B although the fiber lengths of the EDF 731a and EDF 731b were set to 16 m and 9 m, respectively.

As shown in the graph of FIG. 32, at the wavelength band of 1.55 μm, in the optical amplifier repeater 630 in which the first optical fiber amplifier 736a using the EDF 731a having a fiber length of 16 m and the second optical fiber amplifier 736b using the EDF 731b having a fiber length of 9 m are serially connected, the output signal light power is flattened to a substantially constant level even when the signal light wavelength varies, thereby greatly lowering the wavelength dependency of the output signal light power.

FIG. 33 is a graph showing the output signal light power of the optical amplifier repeater 630, in which the first optical fiber amplifier 736a using the EDF 731a and the second optical fiber amplifier 736b using the EDF 731b are serially connected, with respect to the signal light wavelength. For comparison, the output signal power of the first optical fiber amplifier 736a using the EDF 731a with fiber lengths of 13, 16 and 22 m are also indicated. The measurement of these output signal light powers was performed with a method and conditions similar to those in the case of FIGS. 30A and 30B.

As shown in the graph of FIG. 33, at the wavelength band of 1.55 μm, the output signal light power of the optical amplifier repeater 630, in which the first optical fiber amplifier 736a using the EDF 731a having a fiber length of 16 m and the second optical fiber amplifier 736b using the EDF 731b having a fiber length of 9 m are serially connected, is as high as that of the first optical fiber amplifier 736a using the EDF 731a having a fiber length of 22 m. Also, the flatness of the output signal light power with respect to the signal light wavelength is as good as that of the first optical fiber amplifier 736a using the EDF 731a having a fiber length of 13 m.

In the following, based on the characteristics of the optical amplifier repeater 630 shown in FIGS. 32 and 33, an optical communication method using the optical repeating and transmitting apparatus shown in FIG. 28A will be explained.

In the first place, at the transmitting terminal station 616, the optical transmitters 611, 612, 613, and 614 convert 4 pieces of information signals into optical signals with wavelengths λ1, λ2, λ3, and λ4 in the wavelength band of 1.55 μm, respectively. Then, these 4 waves of the optical signals are wavelength-multiplexed by the optical multiplexer 615 and then output to the optical fiber transmission path 617.

While being transmitted through the optical fiber transmission path 617, thus wavelength-multiplexed optical signal is 4-wavelength collectively amplified by the optical amplifier repeater 630 disposed in the optical fiber transmission path 617 in order to compensate for loss in transmission.

Namely, in the optical amplifier repeater 630, the signal light transmitted through the optical fiber transmission path 617 selectively passes through the isolator 735a only in the direction of progress of the input signal light and is input, by way of the multiplexer 733a, to the EDF 731a of the first optical fiber amplifier 736a.

On the other hand, the excitation light generated by the excitation light source 732a of the excitation device 734a is input, also by way of the multiplexer 733a, to the EDF 731a; while the excitation light generated by the excitation light source 732b of the excitation device 734b is input, by way of the multiplexer 733b and the EDF 731b, to the EDF 731a.

Accordingly, in the first optical fiber amplifier 736a, by the excitation light supplied from the excitation device 734a using a forward pumping method and that supplied from the excitation device 734b using a backward pumping method, Er within the EDF 731a which has been adjusted to a predetermined fiber length is excited so as to amplify the input signal light. Namely, due to induced radiation of the thus excited Er within the EDF 731a, the input signal light is amplified with wavelength dependency characteristics such as those shown in the above-mentioned graphs of FIGS. 29 to 31.

The amplified input signal light is then input to the EDF 731b of the second optical fiber amplifier 736b, which is serially connected to the EDF 731a by fusion. Also, the excitation light generated by the excitation light source 732a of the excitation device 734a is input, by way of the multiplexer 733a and the EDF 731a, to the EDF 731b; while the excitation light generated by the excitation light source 732b of the excitation device 734b is input, by way of the multiplexer 733b, to the EDF 731a.

Accordingly, in the second optical fiber amplifier 736b, by the excitation light supplied from the excitation device 734a using the forward pumping method and that supplied from the excitation device 734b the using backward pumping method, Er within the EDF 731b which has been adjusted to a predetermined fiber length is excited so as to amplify the input signal light. Namely, due to induced radiation of the excited Er within the EDF 731b, the input signal light is amplified with wavelength dependency characteristics such as those shown in the above-mentioned graphs of FIGS. 29 to 31. Then, the signal light amplified by the second optical fiber amplifier 736b passes through the optical isolator 735b only in the direction of progress thereof so as to be output to the optical fiber transmission path 617 as the output signal light.

At this moment, in the first optical fiber amplifier 736a and the second optical fiber amplifier 736b, the input signal light is multiple-wavelength collectively amplified according to their respective wavelength dependency characteristics. Since these first and second optical fiber amplifiers 736a and 736b have wavelength dependency characteristics of amplification gain with respect to signal light wavelength which tend to be different from each other as shown in FIGS. 29 to 31, in the optical repeating and transmitting apparatus 630 in which these first and second optical fiber amplifiers 736a and 736b are serially connected, the wavelength dependency characteristics of the first and second optical fiber amplifiers 736a and 736b are offset against each other, thereby flattening the amplification characteristic with respect to wavelength. Therefore, at the wavelength band of 1.55 μm, the output signal light power is flattened to substantially a constant value even when the signal light wavelength varies.

Also, since the EDF 731a having a predetermined fiber length in the first optical fiber amplifier 736a and the EDF 731b having a predetermined fiber length in the second optical fiber amplifier 736b are serially connected and unified together, the output is prevented from being lowered due to shortening of the fiber length and thereby a high output signal light power is maintained as shown in the graph of FIG. 33. In this manner, in the multiple-wavelength collective amplification by the optical amplifier repeater 630, a flat and high amplification characteristic with respect to wavelength is obtained regardless of the input signal light level, thereby compensating for losses in transmission.

The optical signal which has been multiple-wavelength collectively amplified by the optical amplifier repeater 630 and then output to the optical fiber transmission path 617 is transmitted, by way of the optical fiber transmission path 617 again, to the receiving terminal station 625. At the receiving terminal station 625, the transmitted optical signal is demultiplexed by the optical demultiplexer 620 into optical signals respectively having wavelengths of λ1, λ2, λ3, and λ4. Then, these demultiplexed optical signals are converted into 4 pieces of information signals by the optical receivers 621, 622, 623, and 624, respectively.

In this manner, in accordance with this embodiment, since the first and second optical fiber amplifiers 736a and 736b having wavelength dependency characteristics of amplification gain which tend to be different from each other are serially connected together, and since the EDF 731a having a predetermined fiber length in the first optical fiber amplifier 736a and the EDF 731b having a predetermined fiber length in the second optical fiber amplifier 736b are serially connected and unified together by fusion, the wavelength dependency characteristics of the first and second optical fiber amplifiers 736a and 736b are offset against each other so as to flatten the amplification characteristic with respect to wavelength. Also, the output is prevented from being lowered due to shortening of the fiber length and thereby a high output signal light power is maintained. Accordingly, in the multiple-wavelength collective amplification by the optical amplifier repeater 630, a flat and high amplification characteristic with respect to wavelength is obtained regardless of the input signal light level, thereby compensating for losses in transmission. Therefore, in the wavelength-multiplexed transmission of optical signals, there can be realized favorable optical repeating and transmitting apparatus and optical communication method in which the difference in signal light level between individual wavelengths is small.

Although the foregoing explanation has been provided for the case where a single optical amplifier repeater 630 is disposed in the optical fiber transmission path 617, a plurality of optical amplifier repeaters 630 may be disposed at predetermined positions in a plurality of stages so as to form a multiple-stage optical repeating and transmitting apparatus, if necessary, when the optical fiber transmission path 617 is of a long distance.

Also, although the EDF 731b codoped with 5 wt % of P and 1 wt % of Al is used as the Er-doped fiber containing at least 0.1 wt % of P, for example, in the foregoing embodiment, a similar effect can also be attained when a P-codoped EDF containing at least 0.1 wt % of P alone is used in place thereof.

(Eighth Embodiment)

The optical repeating and transmitting apparatus in this embodiment belongs to the first optical repeating and transmitting apparatus in accordance with the present invention in which, in wavelength-multiplexed transmission of an optical signal, multiple-wavelength collective amplification is performed so as to make the gains of individual wavelengths substantially constant, regardless of the level of the input signal light, thereby compensating for losses in transmission.

Figure 34A:
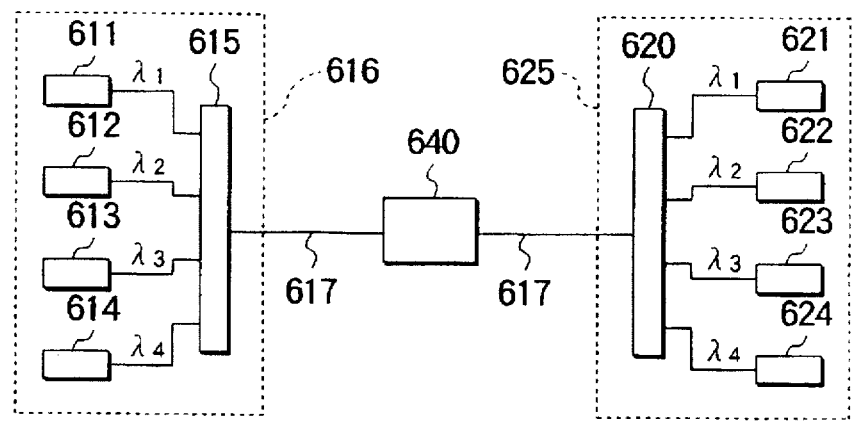
FIGS. 34A and 34B are views showing a configuration of an optical repeating and transmitting apparatus in accordance with the eighth embodiment of the present invention, respectively representing an overall configuration of the optical repeating and transmitting apparatus and a configuration of an optical amplifier repeater thereof.
Figure 34B:
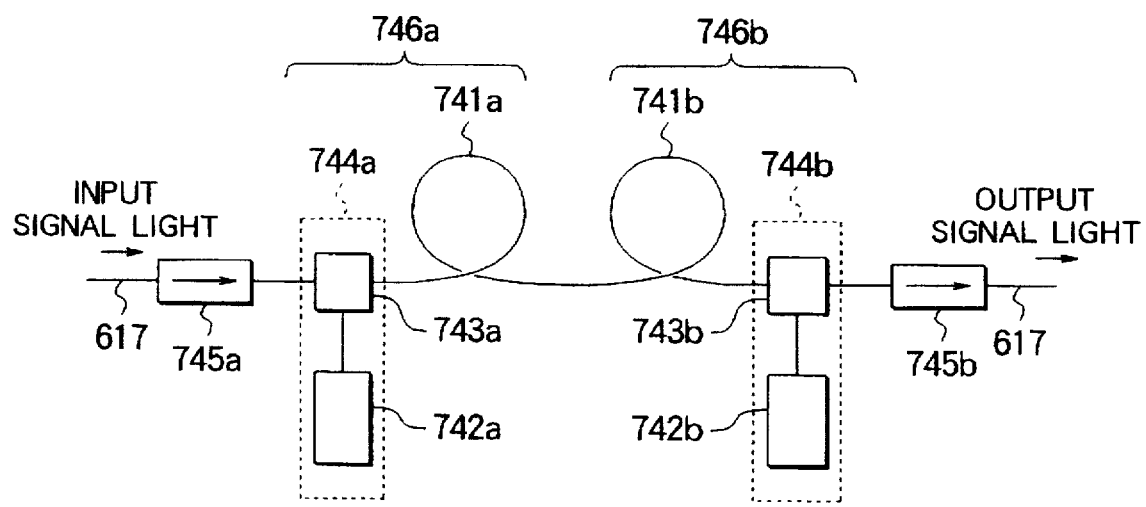

FIGS. 34A and 34B are views showing a configuration of an optical repeating and transmitting apparatus in accordance with this embodiment. Namely, FIG. 34A represents an overall configuration of the optical repeating and transmitting apparatus, while FIG. 34B represents a configuration of an optical amplifier repeater thereof.

As shown in FIG. 34A, the optical repeating and transmitting apparatus of this embodiment includes (a) a transmitting terminal station 616 comprising optical transmitters 611, 612, 613, and 614 which convert, for example, 4 pieces of information signals into optical signals with wavelengths $\lambda 1$, $\lambda 2$, $\lambda 3$, and $\lambda 4$ in the wavelength band of 1.55 µm, respectively, and an optical multiplexer 615 which wavelength-multiplexes these 4 waves of the optical signals; (b) an optical fiber transmission path 617 for transmitting the optical signal output from the optical multiplexer 615 of the transmitting terminal station 616; (c) a receiving terminal station 625 includes an optical demultiplexer 620, which demultiplexes the optical signal transmitted through the optical fiber transmission path 617 into optical signals respectively having wavelengths $\lambda 1$, $\lambda 2$, $\lambda 3$, and $\lambda 4$, and optical receivers 621, 622, 623, and 624 which convert thus demultiplexed signals into 4 pieces of information signals; and (d) an optical amplifier repeater 640 which is disposed in the optical fiber transmission path 617 and in which a plurality of optical fiber amplifiers having wavelength dependency characteristics of amplification gain with respect to the wavelength-multiplexed optical signal which tend to be different from each other are serially connected.

Namely, in the optical repeating and transmitting apparatus in this embodiment, the optical amplifier repeater 640 is used in place of the optical repeater amplifier 630 used in the optical repeating and transmitting apparatus of the above-mentioned seventh embodiment.

Also, as shown in FIG. 34B, the optical amplifier repeater 640 includes i) an EDF 741a codoped with neither Al nor P; ii) an EDF 741b codoped with 1.4 wt % of Al as an Er-doped fiber containing at least 0.1 wt % of Al; iii) an excitation device 744a for supplying excitation light to the EDF 741a and EDF 741b which includes an excitation light source 742a for generating the excitation light and a multiplexer 743a which receives the excitation light generated by the excitation light source 742a and outputs it to the input side of the EDF 741a; iv) an excitation device 744b for supplying excitation light to the EDF 741a and EDF 741b which includes an excitation light source 742b for generating the excitation light and a multiplexer 743b which receives the excitation light generated by the excitation light source 742b and outputs it to the output side of the EDF 741b; v) an optical isolator 745a which receives the signal light transmitted through the optical fiber transmission path 617 and only transmits a light component proceeding in the direction of progress of the input signal light so as to output it to the EDF 741a; and vi) an optical isolator 745b which transmits only a light component proceeding in the direction of progress of the signal light output from the EDF 741b so as to output it to the optical transmission path 617. As the excitation device for supplying excitation light to EDF 741a and EDF 741b, one or both of the excitation device 744a and the excitation device 744b may be used to excite the EDF 741a and EDF 741b by the forward pumping or backward pumping method.

Thus, a first optical fiber amplifier 746a is constructed by the EDF 741a, the excitation device 744a, and the excitation device 744b; while a second optical fiber amplifier 746b is constructed by the EDF 741b, the excitation device 744a, and the excitation device 744b.

Namely, in the optical amplifier repeater 640 in the optical repeating and transmitting apparatus in this embodiment a combination of the EDF 741a codoped with neither Al nor P and the EDF 741b codoped with 1.4 wt % of Al is used in place of the combination of the EDF 731a codoped with 1.4 wt % of Al and the EDF 731b codoped with 5 wt % of P and 1 wt % of Al in the above-mentioned seventh embodiment.

In the following, amplification characteristics of the first optical fiber amplifier 746a using the EDF 741a and the second optical fiber amplifier 746b using the EDF 741b will be explained. Here, the explanation will be based on the data of experiments which were independently performed with respect to an optical fiber amplifier using an EDF codoped with neither Al nor P and that using an EDF codoped with 1.4 wt % of Al.

Figure 35A:
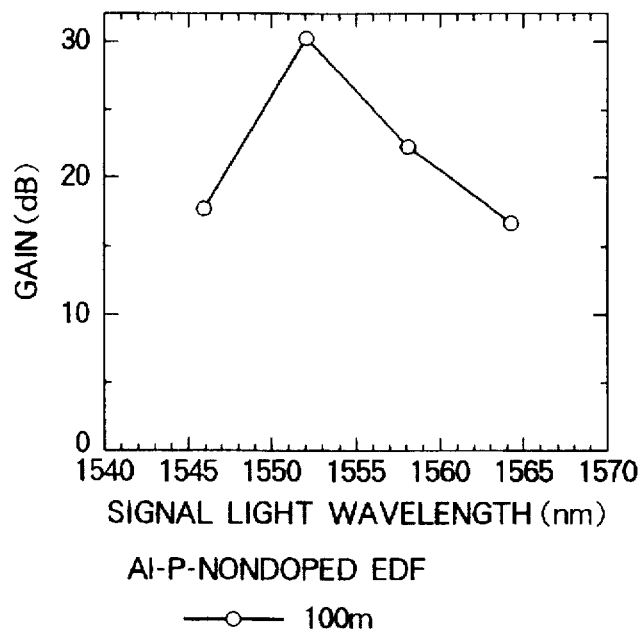
FIGS. 35A and 35B are graphs respectively showing multiple-wavelength collective amplification characteristics of an optical fiber amplifier using an EDF codoped with neither Al nor P and that using an EDF codoped with 1.4 wt % of Al with respect to a wavelength-multiplexed optical signal.
Figure 35B:
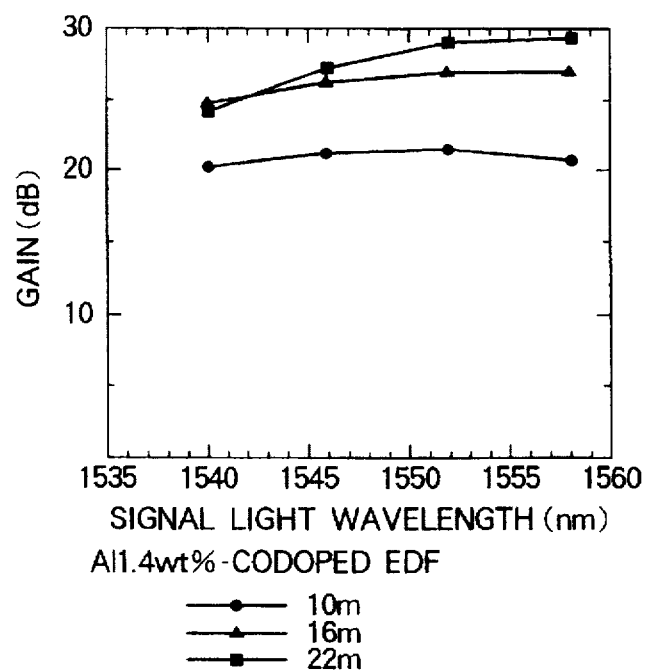

FIGS. 35A and 35B are graphs showing multiple-wavelength collective amplification characteristics of an optical fiber amplifier using an EDF codoped with neither Al nor P and that using an EDF codoped with 1.4 wt % of Al concerning a wavelength-multiplexed optical signal. Namely, FIG. 35A shows the amplification gain of the optical fiber amplifier using the EDF codoped with neither Al nor P with respect to the signal light wavelength, whereas FIG. 35B shows the amplification gain of the optical fiber amplifier using the EDF codoped with 1.4 wt % of Al with respect to the signal light wavelength. For this measurement of amplification gain, a backward pumping method was used under conditions where the excitation wavelength was 1.47 μm, the pumping power was 50 mw, the input signal light power was −20 dBm/channel, the signal light wavelengths were 1,540; 1,546; 1,552; and 1,558 nm, fiber length of the EDF codoped with neither Al nor P was 100 m, and the fiber lengths of the EDF codoped with 1.4 wt % of Al were 10, 16, and 22 m.

As shown in the graphs of FIGS. 35A and 35B, at the wavelength band of 1.55 μm, the optical fiber amplifier using the EDF codoped with neither Al nor P exhibits a maximum amplification gain at the signal light wavelength of 1,546 nm and tends to have lower amplification gains for both shorter and longer wavelengths, whereas the optical fiber amplifier having the EDF codoped with 1.4 wt % of Al has a tendency that the amplification gain becomes higher as the wavelength of the signal light is longer. Namely, their wavelength dependency characteristics of amplification gain with respect to the wavelengths of the signal light tend to be different from each other. Also, in both of the optical fiber amplifier using the EDF codoped with neither Al nor P and the EDF codoped with 1.4 wt % of Al, there is a tendency that the rate of change in amplification gain with respect to the wavelength of the signal light becomes smaller as the fiber length of the EDF is shorter. Namely, there is a tendency that the wavelength dependency of the amplification gain becomes smaller and thus the amplification characteristic at the wavelength band of 1.55 μm becomes flatter.

The relationship between the optical fiber amplifier using the EDF codoped with neither Al nor P and that using the EDF codoped with 1.4 wt % of Al with respect to the characteristics shown in FIGS. 35A and 35B is considered to be similar to the relationship between the first optical fiber amplifier 746a using the EDF 741a codoped with neither Al nor P and the second optical fiber amplifier 746b using the EDF 741b codoped with 1.4 wt % of Al shown in the above-mentioned FIGS. 34A and 34B.

Accordingly, since the first and second optical fiber amplifiers 746a and 746b having wavelength dependency characteristics of amplification gain which tend to be different from each other are serially connected together, since the EDF 741a codoped with neither Al nor P in the first optical fiber amplifier 746a and the EDF 741b codoped with 1.4 wt % of Al in the second optical fiber amplifier 746b are respectively adjusted to predetermined fiber lengths, and since the EDF 741a and EDF 741b are serially connected and unified together, the wavelength dependency characteristics of the first and second optical fiber amplifiers 746a and 746b are offset against each other so as to flatten the amplification characteristic with respect to wavelength as in the case of the above-mentioned seventh embodiment. Also, the output is prevented from being lowered due to shortening of the fiber length and thereby a high output signal light power is maintained. Accordingly, in the multiple-wavelength collective amplification by the optical amplifier repeater 640, a flat and high amplification characteristic with respect to wavelength is obtained regardless of the input signal light level.

In the following, an optical communication method using the optical repeating and transmitting apparatus of FIGS. 34A and 34B will be explained.

In the first place, at the transmitting terminal station 616, the optical transmitters 611, 612, 613, and 614 convert 4 pieces of information signals into optical signals with wavelengths λ1, λ2, λ3, and λ4 in the wavelength band of 1.55 μm, respectively. Then, these 4 waves of the optical signals are wavelength-multiplexed by the optical multiplexer 615 and then output to the optical fiber transmission path 617.

While being transmitted through the optical fiber transmission path 617, thus wavelength-multiplexed optical signal is 4-wavelength collectively amplified by the optical amplifier repeater 640 disposed in the optical fiber transmission path 617 in order to compensate for losses in transmission.

Namely, in the optical amplifier repeater 640, the signal light transmitted through the optical fiber transmission path 617 selectively passes through the isolator 745a only in the direction of progress of the input signal light and is input, by way of the multiplexer 743a, to the EDF 741a of the first optical fiber amplifier 746a. On the other hand, the excitation light generated by the excitation light source 742a of the excitation device 744a is input, also by way of the multiplexer 743a, to the EDF 741a; while the excitation light generated by the excitation light source 742b of the excitation device 744b is input, by way of the multiplexer 743b and the EDF 741b, to the EDF 741a.

Accordingly, in the first optical fiber amplifier 746a Er within the EDF 741a which has been adjusted to a predetermined fiber length is excited so as to amplify the input signal light, by the excitation light supplied from the excitation device 744a using the forward pumping method and that supplied from the excitation device 744b using the backward pumping method. Namely, due to induced radiation of thus excited Er within the EDF 741a, the input signal light is amplified with a wavelength dependency characteristic such as that shown in the above-mentioned graph of FIG. 35A.

The amplified input signal light is then input to the EDF 741b of the second optical fiber amplifier 746b which is serially connected to the EDF 741a by fusion. Also, the excitation light generated by the excitation light source 742a of the excitation device 744a is input, by way of the multiplexer 743a and the EDF 741a, to the EDF 741b; while the excitation light generated by the excitation light source 742b of the excitation device 744b is input, by way of the multiplexer 743b, to the EDF 741b.

Accordingly, in the second optical fiber amplifier 746b, by the excitation light supplied from the excitation device 744a using the forward pumping method and that supplied from the excitation device 744b using the backward pumping method, Er within the EDF 741b which has been adjusted to a predetermined fiber length is excited so as to amplify the input signal light. Namely, due to induced radiation of thus excited Er within the EDF 741b, the input signal light is amplified with wavelength dependency characteristics such as those shown in the above-mentioned graph of FIG. 35B. Then, the signal light amplified by the second optical fiber amplifier 746b passes through the optical isolator 745b only in the direction of progress thereof so as to be output to the optical fiber transmission path 617 as output signal light.

At this moment, in the first optical fiber amplifier 746a and the second optical fiber amplifier 746b, the input signal light is multiple-wavelength collectively amplified according to their respective wavelength dependency characteristics. Since these first and second optical fiber amplifiers 746a and 746b have wavelength dependency characteristics of amplification gain with respect to signal light wavelength which tend to be different from each other as shown in the above-mentioned graphs of FIGS. 35A and 35B, in the optical repeating and transmitting apparatus 640 in which these first and second optical fiber amplifiers 746a and 746b are serially connected, the wavelength dependency characteristics of the first and second optical fiber amplifiers 746a and 746b are offset against each other, thereby flattening the amplification characteristic with respect to wavelength. Therefore, at the wavelength band of 1.55 µm, the output signal light power is flattened to substantially a constant value even when the signal light wavelength varies.

Also, since the EDF 741a having a predetermined fiber length in the first optical fiber amplifier 746a and the EDF 741b having a predetermined fiber length in the second optical fiber amplifier 746b are serially connected and unified together, the output is prevented from being lowered due to shortening of the fiber length and thereby a high output signal light power is maintained. In this manner, in the multiple-wavelength collective amplification by the optical amplifier repeater 640, a flat and high amplification characteristic with respect to wavelength is obtained regardless of the input signal light level, thereby compensating for losses in transmission.

The optical signal which has been multiple-wavelength collectively amplified by the optical amplifier repeater 640 and then output to the optical fiber transmission path 617 is transmitted, by way of the optical fiber transmission path 617 again, to the receiving terminal station 625. At the receiving terminal station 625, the transmitted optical signal is demultiplexed by the optical demultiplexer 620 into optical signals respectively having wavelengths of $\lambda 1$, $\lambda 2$, $\lambda 3$, and $\lambda 4$. Then, these demultiplexed optical signals are converted into 4 pieces of information signals by the optical receivers 621, 622, 623, and 624, respectively.

In this manner, in accordance with this embodiment, since the first and second optical fiber amplifiers 746a and 746b having wavelength dependency characteristics of amplification gain which tend to be different from each other are serially connected together, and since the EDF 741a codoped with neither Al nor P which has been adjusted to a predetermined fiber length in the first optical fiber amplifier 746a and the EDF 741b codoped with 1.4 wt % of Al which has been adjusted to a predetermined fiber length in the second optical fiber amplifier 746b are serially connected and unified together by fusion, the wavelength dependency characteristics of the first and second optical fiber amplifiers 746a and 746b are offset against each other so as to flatten the amplification characteristic with respect to wavelength. Also, the output is prevented from being lowered due to shortening of the fiber length and thereby a high output signal light power is maintained. Accordingly, in the multiple-wavelength collective amplification by the optical amplifier repeater 640, a flat and high amplification characteristic with respect to wavelength is obtained regardless of the input signal light level, thereby compensating for losses in transmission. Therefore, in the wavelength-multiplexed transmission of optical signals, there can be realized a favorable optical repeating and transmitting apparatus and an optical communication method in which the difference in signal light level between individual wavelengths is small.

Although the foregoing explanation has been provided for the case where a single optical amplifier repeater 640 is disposed in the optical fiber transmission path 617, a plurality of optical amplifier repeaters 640 may be disposed at predetermined positions in a plurality of stages so as to form a multiple-stage optical repeating and transmitting apparatus, if necessary, when the optical fiber transmission path 617 is of a long distance.

(Ninth Embodiment)

The optical repeating and transmitting apparatus in this embodiment belongs to the first optical repeating and transmitting apparatus in accordance with the present invention in which, in wavelength-multiplexed transmission of an optical signal, multiple-wavelength collective amplification is performed so as to make the gains of individual wavelengths substantially constant, regardless of the level of input signal light, thereby compensating for losses in transmission.

Figure 36A:
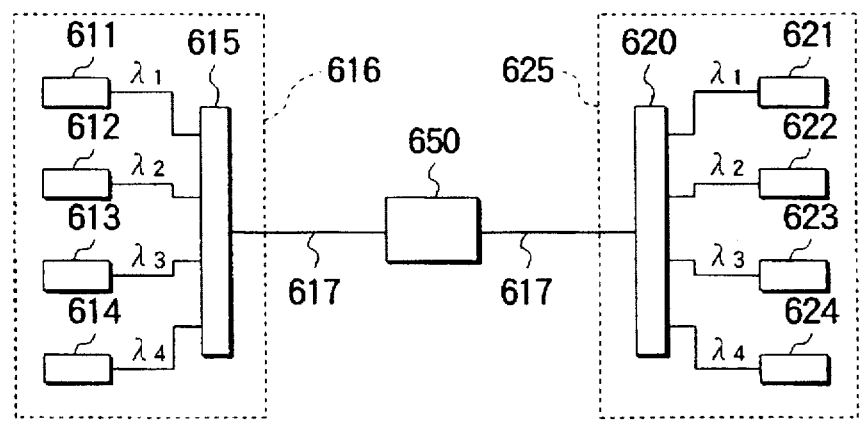
FIGS. 36A and 36B are views showing a configuration of an optical repeating and transmitting apparatus in accordance with the ninth embodiment of the present invention, respectively representing an overall configuration of the optical repeating and transmitting apparatus and a configuration of an optical amplifier repeater thereof.
Figure 36B:
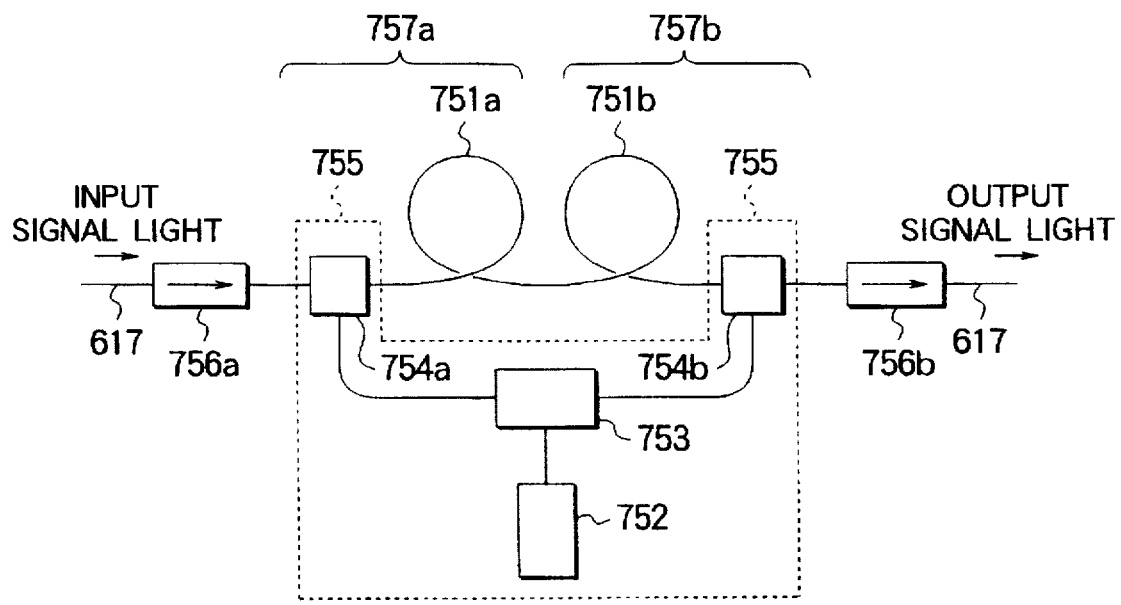

FIGS. 36A and 36B are views showing a configuration of an optical repeating and transmitting apparatus in accordance with this embodiment. Namely, FIG. 36A represents an overall configuration of the optical repeating and transmitting apparatus, while FIG. 36B represents a configuration of an optical amplifier repeater thereof.

As shown in FIG. 36A, the optical repeating and transmitting apparatus of this embodiment includes (a) a transmitting terminal station 616 comprising optical transmitters 611, 612, 613, and 614 which convert, for example, 4 pieces of information signals into optical signals with wavelengths $\lambda 1$, $\lambda 2$, $\lambda 3$, and $\lambda 4$ in the wavelength band of 1.55 µm, respectively, and an optical multiplexer 615 which wavelength-multiplexes these 4 waves of the optical signals; (b) an optical fiber transmission path 617 for transmitting the optical signal output from the optical multiplexer 615 of the transmitting terminal station 616; (c) a receiving terminal station 625 including an optical demultiplexer 620, which demultiplexes the optical signal transmitted through the optical fiber transmission path 617 into optical signals respectively having wavelengths $\lambda 1$, $\lambda 2$, $\lambda 3$, and $\lambda 4$, and optical receivers 621, 622, 623, and 624 which convert thus demultiplexed signals into 4 pieces of information signals; and (d) an optical amplifier repeater 650 which is disposed in the optical fiber transmission path 617 and in which a plurality of optical fiber amplifiers having wavelength dependency characteristics of amplification gain with respect to the wavelength-multiplexed optical signal which tend to be different from each other are serially connected.

Namely, in the optical repeating and transmitting apparatus in accordance with this embodiment the optical amplifier repeater 650 is used in place of the optical amplifier repeater 630 used in the optical repeating and transmitting apparatus in the above-mentioned seventh embodiment.

Also, as shown in FIG. 36B, the optical amplifier repeater 650 includes i) an EDF 751a codoped with 5 wt % of P and 1 wt % of Al as an Er-doped fiber containing at least 0.1 wt % of P; ii) an EDF 751b codoped with neither Al nor P serially connected to the EDF 751b by fusing; iii) an excitation device 755 for supplying excitation light to both the EDF 751a and EDF 751b which includes an excitation light source 752 for generating the excitation light, a demultiplexer 753 which receives the excitation light generated by the excitation light source 752 and outputs it toward two directions, a multiplexer 754a which receives the excitation light from the demultiplexer 753 and outputs it to the input side of the EDF 751a, and a multiplexer 754b which receives the excitation light from the demultiplexer 753 and outputs it to the output side of the EDF 751b; iv) an optical isolator 756a which receives the signal light transmitted through the optical fiber transmission path 617 and only transmits a light component proceeding in the direction of progress of the input signal light so as to output it to the EDF 751a; and v) an optical isolator 756b which transmits only a light component proceeding in the direction of progress of the signal light output from the EDF 751a so as to output it to the optical transmission path 617. As the excitation device for supplying excitation light to EDF 751a and EDF 751b, without using the demultiplexer 753, both or one of the multiplexers 754a and the excitation device 754b may be used to excite the EDF 751a and EDF 751b by a forward pumping or a backward pumping method.

Thus, a first optical fiber amplifier 757a is constructed by the EDF 751a and the excitation device 755; while a second optical fiber amplifier 757b is constructed by the EDF 751b and the excitation device 755. Namely, in the optical amplifier repeater 650 in the optical repeating and transmitting apparatus in this embodiment, a combination of the EDF 751a and the EDF 751b is used in place of the combination of the EDF 731a and the EDF 731b in the optical repeating and transmitting apparatus of the above-mentioned seventh embodiment. Also, a single excitation device 655 is used to simultaneously supply the excitation light to both of the EDF 751a and EDF 751b.

In the following, amplification characteristics of the first optical fiber amplifier 757a using the EDF 751a and the second optical fiber amplifier 757b using the EDF 751b will be explained. Here, the explanation will be based on the data of experiments which were independently performed with respect to an optical fiber amplifier using an EDF codoped with 5 wt % of P and 1 wt % of Al and that using an EDF codoped with neither Al nor P.

Figure 37A:
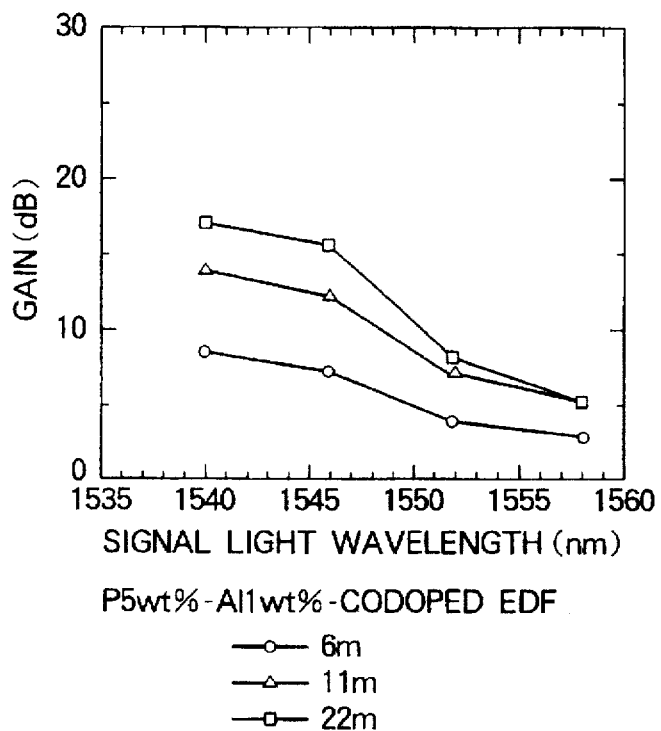
FIGS. 37A and 37B are graphs respectively showing multiple-wavelength collective amplification characteristics of an optical fiber amplifier using an EDF codoped with 5 wt % of P and 1 wt % of Al and that using an EDF codoped with neither Al nor P with respect to a wavelength-multiplexed optical signal.
Figure 37B:
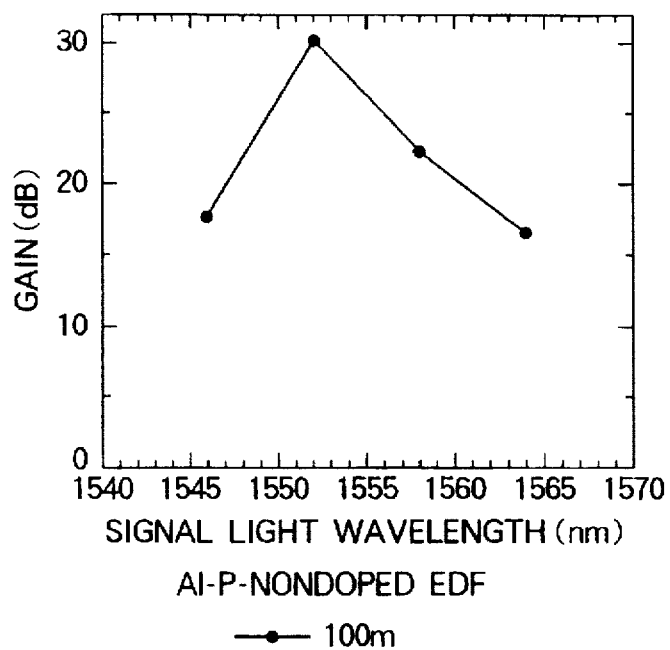

FIGS. 37A and 37B are graphs showing multiple-wavelength collective amplification characteristics of an optical fiber amplifier using an EDF codoped with 5 wt % of P and 1 wt % of Al and that using an EDF codoped with neither Al nor P concerning a wavelength-multiplexed optical signal. Namely, FIG. 37A shows the amplification gain of the optical fiber amplifier using the EDF codoped with 5 wt % of P and 1 wt % of Al with respect to the signal light wavelength, whereas FIG. 37B shows the amplification gain of the optical fiber amplifier using the EDF codoped with neither Al nor P with respect to the signal light wavelength. For this measurement of amplification gain, a backward pumping method was used under conditions where the excitation wavelength was 1.47 μm, the pumping power was 50 mW, the input the signal light power was −20 dBm/channel, signal light wavelength were 1,540; 1,546; 1,552; and 1,558 nm, fiber lengths of the EDF codoped with 5 wt % of P and 1 wt % of Al were 6, 11, and 22 m, and the fiber length of the EDF codoped with neither Al nor P was 100 m.

As shown in the graphs of FIGS. 37A and 37B, at the wavelength band of 1.55 μm, the optical fiber amplifier having the EDF codoped with 5 wt % of P and 1 wt % of Al has a tendency for the amplification gain becomes lower as the wavelength of the signal light is longer, whereas the optical fiber amplifier using the EDF codoped with neither Al nor P exhibits a maximum amplification gain at the signal light wavelength of 1,546 nm and tends to have lower amplification gains for both shorter and longer wavelengths. Namely, the wavelength dependency characteristics of amplification gain with respect to the wavelength of the signal light tend to be different from each other. Also, in both the optical fiber amplifier using the EDF codoped with 5 wt % of P 1 wt % of Al and the EDF codoped with neither Al nor P, there is a tendency for the rate of change in amplification gain with respect to the wavelength of the signal light to becomes smaller as the fiber length of the EDF is shorter. Namely, there is a tendency for the wavelength dependency of the amplification gain to become smaller and thus amplification characteristics at the wavelength band of 1.55 μm become flatter.

The relationship between the optical fiber amplifier using the EDF codoped with 5 wt % of P and 1 wt % of Al and that using the EDF codoped with neither Al nor P with respect to the characteristics shown in FIGS. 37A and 37B is considered to be similar to the relationship between the first optical fiber amplifier 757a using the EDF 751a codoped with 5 wt % of P and 1 wt % of Al and the second fiber amplifier 757b using the EDF 751b codoped with neither Al nor P shown in FIGS. 36A and 36B.

Accordingly, since the first and second optical fiber amplifiers 757a and 757b having wavelength dependency characteristics of amplification gain which tend to be different from each other are serially connected together, since the EDF 751a codoped with 5 wt % of P and 1 wt % of Al in the first optical fiber amplifier 757a and the EDF 751b codoped with neither Al nor P in the second optical fiber amplifier 757b are respectively adjusted to predetermined fiber lengths, and since these EDF 751a and EDF 751b are serially connected and unified together, the wavelength dependency characteristics of the first and second optical fiber amplifiers 757a and 757b are offset against each other so as to flatten the amplification characteristic with respect to wavelength as in the case of the above-mentioned seventh embodiment. Also, the output is prevented from being lowered due to shortening of the fiber length and thereby a high output signal light power is maintained. Accordingly, in the multiple-wavelength collective amplification by the optical amplifier repeater 650, a flat and high amplification characteristic with respect to wavelength is obtained regardless of the input signal light level.

In the following, an optical communication method using the optical repeating and transmitting apparatus of FIGS. 36A and 36B will be explained.

In the first place, at the transmitting terminal station 616, the optical transmitters 611, 612, 613, and 614 convert 4 pieces of information signals into optical signals with wavelengths λ1, λ2, λ3, and λ4 in the wavelength band of 1.55 μm, respectively. Then, these 4 waves of the optical signals are wavelength-multiplexed by the optical multiplexer 615 and then output to the optical fiber transmission path 617.

While being transmitted through the optical fiber transmission path 617, the wavelength-multiplexed optical signal is 4-wavelength collectively amplified by the optical amplifier repeater 650 disposed in the optical fiber transmission path 617 in order to compensate for losses in transmission.

Namely, in the optical amplifier repeater 650, the signal light transmitted through the optical fiber transmission path 617 selectively passes through the isolator 756a only in the direction of progress of the input signal light and is input, by way of the multiplexer 754a, to the EDF 751a of the first optical fiber amplifier 757a. On the other hand, the excitation light generated by the excitation light source 752 of the excitation device 755 is input, by way of the demultiplexer 753 and the multiplexer 754a, to the EDF 751a; while being input, by way of the demultiplexer 753, the multiplexer 754b, and the EDF 751b, to the EDF 751a.

Accordingly, in the first optical fiber amplifier 757a, by the excitation light supplied from the excitation device 755 using forward and backward pumping methods, Er within the EDF 751a which has been adjusted to a predetermined fiber length is excited so as to amplify the input signal light. Namely, due to induced radiation of thus excited Er within the EDF 751a, the input signal light is amplified with a wavelength dependency characteristic such as that shown in the above-mentioned graph of FIG. 37A.

Thus amplified input signal light is then input to the EDF 751b of the second optical fiber amplifier 757b which is serially connected to the EDF 751a by fusion. Also, the excitation light generated by the excitation light source 752 of the excitation device 755 is input, by way of the demultiplexer 753, the multiplexer 754a, and the EDF 751a, to the EDF 751b; while being input, by way of the demultiplexer 753 and the multiplexer 754b, to the EDF 751b.

Accordingly, in the second optical fiber amplifier 757b, by the excitation light supplied from the excitation device 755 using forward and backward pumping methods, Er within the EDF 751b which has been adjusted to a predetermined fiber length is excited so as to amplify the input signal light. Namely, due to induced radiation of thus excited Er within the EDF 751b, the input signal light is amplified with a wavelength dependency characteristics such as that shown in the above-mentioned graph of FIG. 37B. Then, the signal light amplified by the second optical fiber amplifier 757b passes through the optical isolator 756b only in the direction of progress thereof so as to be output to the optical fiber transmission path 617 as output signal light.

At this moment, in the first optical fiber amplifier 757a and the second optical fiber amplifier 757b, the input signal light is multiple-wavelength collectively amplified according to their respective wavelength dependency characteristics. Since these first and second optical fiber amplifiers 757a and 757b have wavelength dependency characteristics of amplification gain with respect to signal light wavelength which tend to be different from each other, as shown in the above-mentioned graphs of FIGS. 37A and 37B, in the optical repeating and transmitting apparatus 650 in which these first and second optical fiber amplifiers 757a and 757b are serially connected, the wavelength dependency characteristics of the first and second optical fiber amplifiers 757a and 757b are offset against each other, thereby flattening the amplification characteristic with respect to wavelength. Therefore, at the wavelength band of 1.55 μm, the output signal light power is flattened to a substantially constant value even when the signal light wavelength varies.

Also, since the EDF 751a having a predetermined fiber length in the first optical fiber amplifier 757a and the EDF 751b having a predetermined fiber length in the second optical fiber amplifier 757b are serially connected and unified together, the output is prevented from being lowered due to shortening of the fiber length and thereby a high output signal light power is maintained. In this manner, in the multiple-wavelength collective amplification by the optical amplifier repeater 650, a flat and high amplification characteristic with respect to wavelength is obtained regardless of the input signal light level, thereby compensating for loss in transmission.

The optical signal which has been multiple-wavelength collectively amplified by the optical amplifier repeater 650 and then output to the optical fiber transmission path 617 is transmitted, by way of the optical fiber transmission path 617 again, to the receiving terminal station 625. At the receiving terminal station 625, the transmitted optical signal is demultiplexed by the optical demultiplexer 620 into optical signals respectively having wavelengths of λ1, λ2, λ3, and λ4. Then, these demultiplexed optical signals are converted into 4 pieces of information signals by the optical receivers 621, 622, 623, and 624, respectively and extracted.

In this manner, in accordance with this embodiment, since the first and second optical fiber amplifiers 757a and 757b having wavelength dependency characteristics of amplification gain which tend to be different from each other are serially connected together, and since the EDF 751a which has been adjusted to a predetermined fiber length in the first optical fiber amplifier 757a and the EDF 751b which has been adjusted to a predetermined fiber length in the second optical fiber amplifier 757b are serially connected and unified together by fusion, the wavelength dependency characteristics of the first and second optical fiber amplifiers 757a and 757b are offset against each other so as to flatten the amplification characteristic with respect to wavelength. Also, the output is prevented from being lowered due to shortening of the fiber length and thereby a high output signal light power is maintained. Accordingly, in the multiple-wavelength collective amplification by the optical amplifier repeater 650, a flat and high amplification characteristic with respect to wavelength is obtained regardless of the input signal light level, thereby compensating for loss in transmission. Therefore, in the wavelength-multiplexed transmission of optical signals, there can be realized favorable optical repeating and transmitting apparatus and optical communication method in which the difference in signal light level between individual wavelengths is small.

Although the foregoing explanation has been provided for the case where a single optical amplifier repeater 650 is disposed in the optical fiber transmission path 617, a plurality of optical amplifier repeaters 650 may be disposed at predetermined positions in a plurality of stages so as to form a multiple-stage optical repeating and transmitting apparatus, if necessary, when the optical fiber transmission path 617 is of a long distance.

Also, though the EDF 751a codoped with 5 wt % of P and 1 wt % of Al is used as an Er-doped fiber containing at least 0.1 wt % of P, an EDF codoped with at least 0.1 wt % of P alone may be used in place thereof to attain a similar result.

(Tenth Embodiment)

The optical repeating and transmitting apparatus in this embodiment belongs to the second optical repeating and transmitting apparatus in accordance with the present invention in which, in wavelength-multiplexed transmission of an optical signal, multiple-wavelength collective amplification is performed so as to make the gains of individual wavelengths substantially constant, regardless of the level of input signal light, thereby compensating for losses in transmission.

Figure 38A:
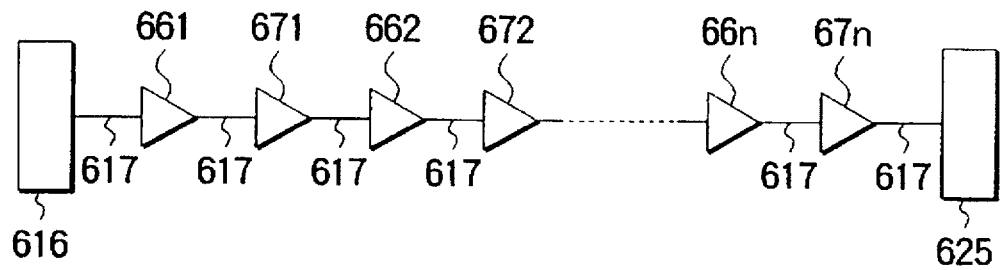
FIGS. 38A to 38C are views showing a configuration of an optical repeating and transmitting apparatus in accordance with the tenth embodiment of the present invention, respectively representing an overall configuration of the optical repeating and transmitting apparatus, a configuration of a first optical fiber amplifier thereof, and a configuration of a second optical fiber amplifier thereof.
Figure 38B:
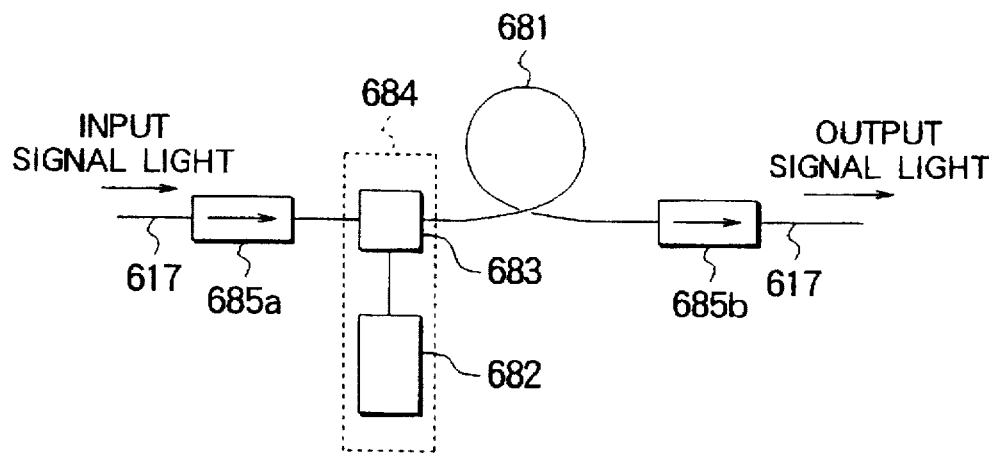
Figure 38C:
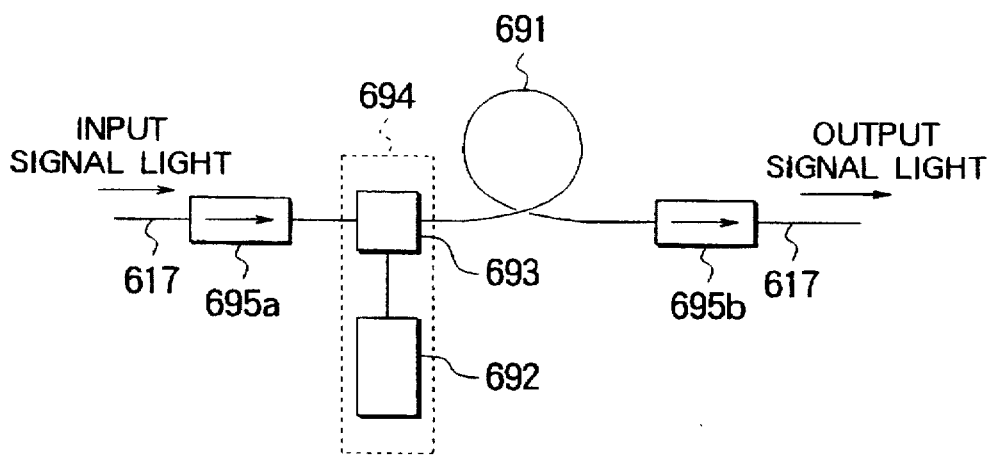

FIGS. 38A to 38C are views showing a configuration of an optical repeating and transmitting apparatus in accordance with this embodiment. Namely, FIG. 38A represents an overall configuration of the optical repeating and transmitting apparatus, FIG. 38B represents a configuration of a first optical fiber amplifier repeater thereof, and FIG. 38C represents a configuration of a second optical fiber amplifier repeater thereof.

As shown in FIG. 38A, the optical repeating and transmitting apparatus of this embodiment includes (a) a transmitting terminal station 616 which converts, for example, 4 pieces of information signals into optical signals with wavelengths λ1, λ2, λ3, and λ4 in the wavelength band of 1.55 μm; (b) an optical fiber transmission path 617 for transmitting the optical signal output from the transmitting terminal station 616; (c) a receiving terminal station 625 which demultiplexes the optical signal transmitted through the optical fiber transmission path 617 into optical signals respectively having wavelengths λ1, λ2, λ3, and λ4, and then converts thus demultiplexed signals into 4 pieces of information signals; and (d) first optical fiber amplifiers 661, 662, . . . , and 66n and second optical fiber amplifiers 671, 672, . . . , and 67n, which tend to have wavelength dependency characteristics of amplification gain with respect to the wavelength-multiplexed optical signal different from each other and are alternately disposed in the optical fiber transmission path 617.

Namely, in the optical repeating and transmitting apparatus in this embodiment, the first optical fiber amplifier 661, the second optical fiber amplifier 671, the first optical fiber amplifier 662, the second optical fiber amplifier 672, . . . , the first optical fiber amplifier 66n, and the second optical fiber amplifier 67n are disposed in this order in the optical fiber transmission path 617. A desired total number of these first optical fiber amplifiers 661, 662, . . . , and 66n and second optical fiber amplifiers 671, 672, . . . , and 67n are disposed according to the length of the optical fiber transmission path 617.

Also, as shown in FIG. 38B, each of the first optical fiber amplifiers 661, 662, . . . , and 66n includes i) an EDF 681 codoped with 1.4 wt % of Al, for example, as an Er-doped fiber containing at least 0.1 wt % of Al and ii) an excitation device 684 for supplying excitation light to the EDF 681 which includes an excitation light source 682 for generating the excitation light, and a multiplexer 683 which receives the excitation light generated by the excitation light source 682 and outputs it to the input side of the EDF 681.

An optical isolator 685a which receives the signal light transmitted through the optical fiber transmission path 617 and only transmits a light component proceeding in the direction of progress of the input signal light so as to output it to the EDF 681 by way of the multiplexer 683, and an optical isolator 685b which receives the light output from the EDF 681 and only transmits a light component proceeding in the direction of progress of the signal light so as to output it to the optical fiber transmission path 617, are respectively disposed upstream and downstream each of the first optical fiber amplifiers 661, 662, . . . , and 66n.

Also, as shown in FIG. 38C, each of the second optical fiber amplifiers 671, 672, . . . , and 67n includes i) an EDF 691 codoped with 5 wt % of P and 1 wt % of Al, for example, as an Er-doped fiber containing at least 0.1 wt % of P and ii) an excitation device 694 for supplying excitation light to the EDF 691 which includes an excitation light source 692 for generating the excitation light, a multiplexer 693 which receives the excitation light generated by the excitation light source 692 and outputs it to the input side of the EDF 691.

An optical isolator 695a which receives the signal light transmitted through the optical fiber transmission path 617 and only transmits a light component proceeding in the direction of progress of the input signal light so as to output it to the EDF 691 by way of the multiplexer 693, and an optical isolator 695b which receives the light output from the EDF 691 and only transmits a light component proceeding in the direction of progress of the signal light so as to output it to the optical fiber transmission path 617, are respectively disposed upstream and downstream each of the second optical fiber amplifiers 671, 672, . . . , and 67n.

The amplification and output characteristics of each of the first optical fiber amplifiers 661, 662, . . . , and 66n using the EDF 681 and each of the second optical fiber amplifiers 671, 672, . . . , and 67n using the EDF 691 are similar to those shown in the above-mentioned graphs of FIGS. 29, 30A, and 30B as explained in the above-mentioned seventh embodiment.

Namely, at the wavelength band of 1.55 μm, the first optical fiber amplifiers 661, 662, . . . , and 66n using the EDF 681 have a tendency for the amplification gain to become higher as the wavelength of the signal light is longer, whereas the second optical fiber amplifiers 671, 672, . . . , and 67n using the EDF 691 have a tendency for the amplification gain to become lower as the wavelength of the signal light is longer. Namely, their wavelength dependency characteristics of amplification gain with respect to the wavelength of the signal light tend to be opposite to each other.

Also, in both of the first optical fiber amplifiers 661, 662, . . . , and 66n using the EDF 681 and the second optical fiber amplifiers 671, 672, . . . , and 67n using the EDF 691, there is a tendency that for the rate of change in amplification gain with respect to the wavelength of the signal light to become smaller as the fiber length of the EDF is shorter. Namely, there is a tendency for the wavelength dependency of the amplification gain to become smaller and thus for the amplification characteristic at the wavelength band of 1.55 μm to become flatter.

Further, at the wavelength band of 1.55 μm, the first optical fiber amplifiers 661, 662, . . . , and 66n using the EDF 681 have a tendency for the output signal light power to become higher as the wavelength of the signal light is longer, whereas the second optical fiber amplifiers 671, 672, . . . , and 67n using the EDF 691 have a tendency for the output signal light power to become lower as the wavelength of the signal light is longer. Namely, their wavelength dependency characteristics of output signal light power with respect to the wavelength of the signal light tend to be opposite each other.

Accordingly, since the first optical fiber amplifiers 661, 662, . . . , and 66n and second optical fiber amplifiers 671, 672, . . . , and 67n having wavelength dependency characteristics which tend to be different from each other are alternately disposed and since the EDF 681 and the EDF 691 are respectively adjusted to predetermined fiber lengths, the wavelength dependency characteristics of the first and second optical fiber amplifiers 661 and 671, 662 and 672, . . . , 66n and 67n can be offset against each other so as to flatten the amplification and output characteristics with respect to wavelength. Accordingly, in the alternately disposed first optical fiber amplifier 661, second optical fiber amplifier 671, first fiber amplifier 662, second optical fiber amplifier 672, . . . , first optical fiber amplifier 66n, and second optical fiber amplifier 67n as a whole, a flat amplification characteristic with respect to wavelength can be obtained regardless of the input signal light level.

Figure 3:
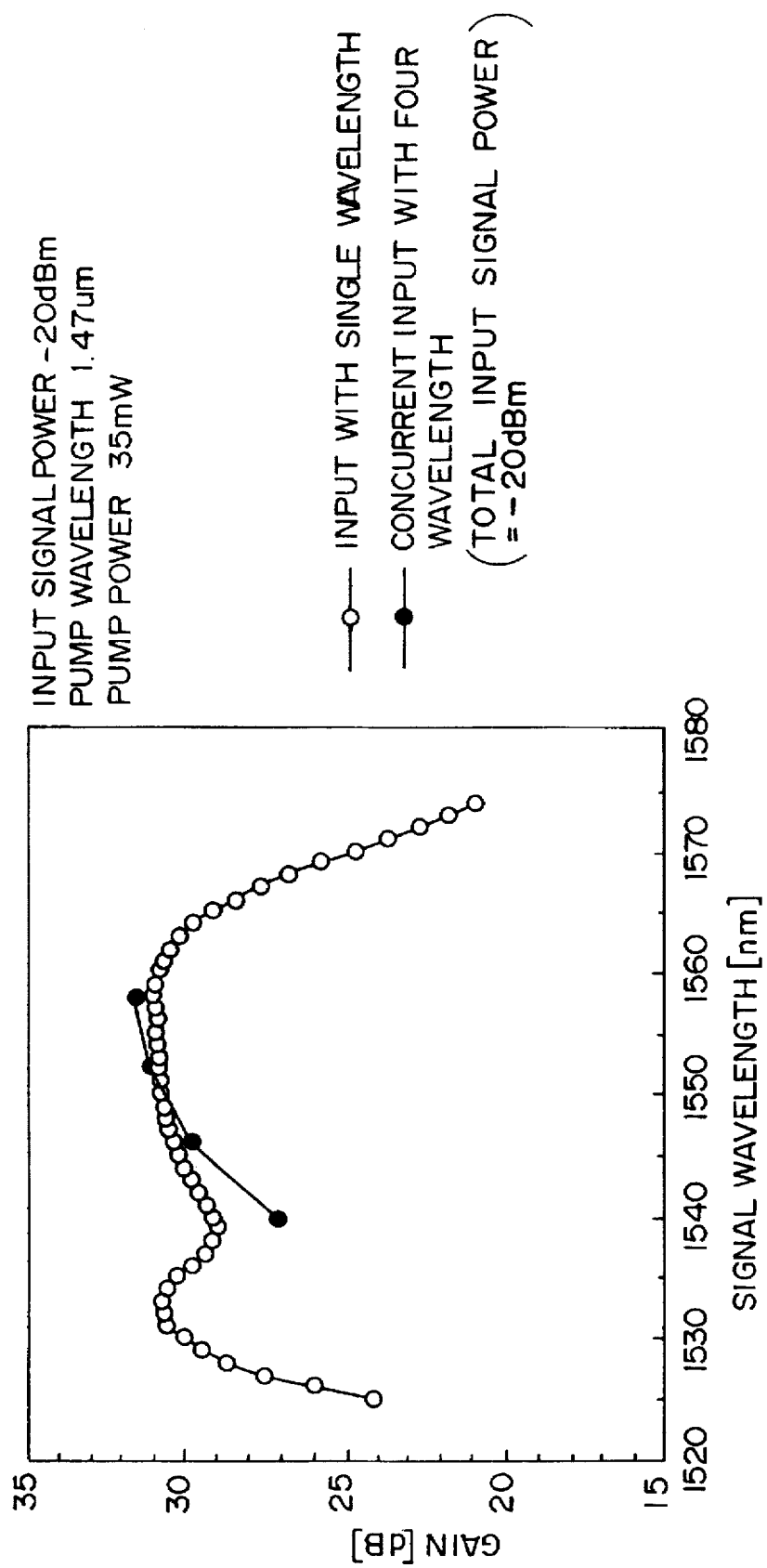
FIG. 3 is a graph showing wavelength dependency of gain in a case of four-wavelength amplification and in a case of single wavelength amplification.

In the following, an optical communication method using the optical repeating and transmitting apparatus of FIGS. 3BA to 38C will be explained.

Initially at the transmitting terminal station 616, 4 pieces of information signals are converted into optical signals with wavelengths λ1, λ2, λ3, and λ4 in the wavelength band of 1.55 μm, respectively. Then, these 4 waves of the optical signals are wavelength-multiplexed by the optical multiplexer 615 and then output to the optical fiber transmission path 617.

While being transmitted through the optical fiber transmission path 617, thus wavelength-multiplexed optical signal is 4-wavelength collectively amplified by the first optical fiber amplifier 661, second optical fiber amplifier 671, first optical fiber amplifier 662, second optical fiber amplifier 672, . . . , first optical fiber amplifier 66n, and second optical fiber amplifier 67n which have wavelength dependency characteristics of amplification gain tending to be different from each other, and are alternately disposed in the optical fiber transmission path 617 in order to compensate for loss in transmission.

For example, in the first optical fiber amplifier 661, the signal light transmitted through the optical fiber transmission path 617 selectively passes through the isolator 685a only in the direction of progress of the input signal light and is input, by way of the multiplexer 683, to the EDF 681 of the first optical fiber amplifier 661. On the other hand, the excitation light generated by the excitation light source 682 of the excitation device 684 is input, also by way of the multiplexer 683, to the EDF 681.

Accordingly, in the first optical fiber amplifier 661, by the excitation light supplied from the excitation device 684 using a forward pumping method, Er within the EDF 681 which has been adjusted to a predetermined fiber length is excited so as to amplify the input signal light. Namely, due to induced radiation of the excited Er within the EDF 681, the input signal light is amplified and output with wavelength dependency characteristics such as those shown in the above-mentioned graphs of FIGS. 29 and 30A.

The input signal light amplified by the first optical fiber amplifier 661 is output as the output signal light to the optical fiber transmission path 617 again and then input to the second optical fiber amplifier 671. Namely, the signal light passes through the optical isolator 695a only in the direction of progress of the input signal light so as to be input to the EDF 691 of the second optical fiber amplifier 671 by way of the multiplexer 693. Also, the excitation light is generated by the excitation light source 692 of the excitation device 694 and then input, also by way of the multiplexer 693, to the EDF 691.

Accordingly, in the second optical fiber amplifier 671, by the excitation light supplied from the excitation device 694 using the forward pumping method, Er within the EDF 691 which has been adjusted to a predetermined fiber length is excited so as to amplify the input signal light. Namely, due to induced radiation of the excited Er within the EDF 691, the input signal light is amplified and output with wavelength dependency characteristics such as those shown in the above-mentioned graphs of FIGS. 29 and 30B. Then, the signal light amplified by the second optical fiber amplifier 671 passes through the optical isolator 695b in the direction of progress thereof and is output to the optical fiber transmission path 617 as the output signal light.

At this moment, in the first optical fiber amplifier 661 and the second optical fiber amplifier 671, the input signal light is multiple-wavelength collectively amplified according to their respective wavelength dependency characteristics. Since these first and second optical fiber amplifiers 661 and 671 have wavelength dependency characteristics of amplification gain and output signal light power with respect to signal light wavelength which tend to be different from each other as shown in the above-mentioned graphs of FIGS. 29, 30A, and 30B, when these first and second optical fiber amplifiers 661 and 671 are considered as a unit, the wavelength dependency characteristics of the first and second optical fiber amplifiers 661 and 671 are offset against each other, as a whole, thereby flattening the amplification and output characteristics with respect to wavelength.

Such a relationship between the first optical fiber amplifier 661 and the second optical fiber amplifier 671 is similar to that between the first optical fiber amplifier 662 and the second optical fiber amplifier 672, . . . , or that between the first optical fiber amplifier 66n and the second optical fiber amplifier 67n. Accordingly, in the alternately disposed first optical fiber amplifier 661, second optical fiber amplifier 671, first fiber amplifier 662, second optical fiber amplifier 672, . . . , first optical fiber amplifier 66n, and second optical fiber amplifier 67n as a whole, a flat amplification characteristic with respect to wavelength can be obtained regardless of the input signal light level, thereby compensating for losses in transmission.

The optical signal transmitted through the optical fiber transmission path 617 in this manner reaches the receiving terminal station 625. At the receiving terminal station 625, the transmitted optical signal is demultiplexed by the optical demultiplexer 620 into optical signals respectively having wavelengths of λ1, λ2, λ3, and λ4. Then, these demultiplexed optical signals are converted into 4 pieces of information signals and extracted.

In this manner, in accordance with this embodiment, since the first optical fiber amplifiers 661, 662, . . . , and 66n and the second optical fiber amplifiers 671, 672, . . . , and 67n having wavelength dependency characteristics which tend to be different from each other are alternately disposed, the wavelength dependency characteristics of the first and second optical fiber amplifiers are offset against each other so as to flatten the amplification and output characteristics with respect to wavelength. Accordingly, in the multiple-wavelength collective amplification of the wavelength-multiplexed signal, flat amplification and output characteristics with respect to wavelength are obtained regardless of the input signal light level. Therefore, in the wavelength-multiplexed transmission of optical signals, there can be realized favorable optical repeating and transmitting apparatus and optical communication method in which the difference in signal light level between individual wavelengths is small.

Although the first optical fiber amplifiers 661, 662, . . . , and 66n using the EDF 681 and the second optical fiber amplifiers 671, 672, . . . , and 67n using the EDF 691 are used as the alternately disposed first and second optical fiber amplifiers having wavelength dependency characteristics which tend to be different from each other in the foregoing embodiment, they are not restricted to this combination. In addition to this combination, there may be a combination of a first optical fiber amplifier using an EDF codoped with neither Al nor P and a second optical fiber amplifier using an EDF codoped with 1.4 wt % of Al as an Er-doped fiber containing at least 0.1 wt % of Al or a combination of a first optical fiber amplifier using an EDF codoped with 5 wt % of P and 1 wt % of Al as an Er-doped fiber containing at least 0.1 wt % of P and a second optical fiber amplifier using an EDF codoped with neither Al nor P. Also, the invention is not restricted to two kinds of optical fiber amplifiers having wavelength dependency characteristics of amplification gain which tend to be different from each other. For example, a first optical fiber amplifier using an EDF codoped with 1.4 wt % of Al, a second optical fiber amplifier using an EDF codoped with 5 wt % of P and 1 wt % of Al, and a third optical fiber amplifier using an EDF codoped with neither Al nor P may be alternately disposed in this order.

Further, though the EDF 691 codoped with 5 wt % of P and 1 wt % of Al is used, for example, as the Er-doped fiber containing at least 0.1 wt % of P, a similar result can be obtained when a P-codoped EDF containing at least 0.1 wt % of P alone is used in place thereof.

Also, although forward pumping method is used throughout the foregoing embodiment as the pumping method in the optical fiber amplifiers, a backward pumping method or a bidirectional pumping method may also be used.

As explained in detail in the foregoing, in the optical repeating and transmitting apparatus in accordance with the present invention, since a repeater is used in which a plurality of optical fiber amplifiers having different amplification factors with respect to individual wavelengths of the wavelength-multiplexed optical signal are serially connected, the serially connected plurality of optical fiber amplifiers, as a whole, make the amplification gains of the individual wavelengths of the optical signal substantially constant. Accordingly, in the wavelength-multiplexed transmission of optical signals, there can be realized a favorable optical repeating and transmitting apparatus, in which the difference in signal light level between individual wavelengths is small.

Also, in the optical repeating and transmitting apparatus in accordance with the present invention, since a plurality of optical fiber amplifiers having different amplification factors with respect to the individual wavelengths of the optical signal having a plurality of wavelength components are disposed in a predetermined order, the alternately disposed plurality of optical fiber amplifiers, as a whole, make the amplification gains with respect to the individual wavelengths of the optical signal substantially constant. Accordingly, in the transmission of optical signals, there can be realized a favorable optical repeating and transmitting apparatus in which the difference in signal light level between individual wavelengths is small.

Further, in the optical communication method in accordance with the present invention, in the repeater disposed in the optical fiber transmission path, since the optical signal is sequentially amplified with respective wavelength dependency characteristics by a plurality of optical fiber amplifiers having different amplification factors with respect to the individual wavelengths of the wavelength-multiplexed optical signal while the serially connected plurality of optical fiber amplifiers in the repeater, as a whole, make the amplification gains with respect to the individual wavelengths of the optical signal substantially constant. Accordingly, in the transmission of optical signals, there can be realized a favorable optical communication method in which the difference in signal light level between individual wavelengths is small.

The present invention is not limited by this. That is, the amplifier may includes first and second fibers connected to each other, and only Er is doped in the first fiber and Er and P are doped in the second fiber. Further, The amplifier may includes first and second fiber connected to each other, and Er and Al are doped in the first fiber and Er and P are doped in the second fiber.

Also, in the optical communication method in accordance with the present invention, as the optical signal is sequentially amplified with respective wavelength dependency characteristics by a plurality of optical fiber amplifiers which are disposed in the optical fiber transmission path and have different amplification factors with respect to the individual wavelengths of the optical signal having a plurality of wavelength components while the alternately disposed plurality of optical fiber amplifiers, as a whole, make the amplification gains with respect to the individual wavelengths of the optical signal substantially constant. Accordingly, in the transmission of optical signals, there can be realized a favorable optical communication method in which the difference in signal light level between individual wavelengths is small.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application Nos. 293440/1993 (5-293440) filed on Nov. 24, 1993, 291625/1994 (6-291625) filed on Nov. 25, 1994, and 36902/1995 (7-36902) filed on Feb. 24, 1995, are hereby incorporated by reference.

What is claimed is:

1. An optical amplifier, comprising:
   (a) a first fiber in which Er is doped, and no P is doped, having a first end and a second end;
   (b) a second fiber in which Er and P are doped, having a first end and a second end, wherein the first end of said second fiber is optically coupled to the second end of said first fiber; and
   (c) only one light source for emitting an excitation light which can excite Er, into one of said fibers, wherein said second fiber having Al therein and the relationship between said P and Al concentrations satisfies following expression:

$$C(P)/C(Al) > 2,$$

where,

C(P) is P concentration in said second fiber, and

C(Al) is Al concentration in said second fiber.

2. A method for communication using optical fibers, comprising the steps of:
   introducing light signals having different wavelengths into an optical amplifier, wherein said optical amplifier has a plurality of fibers with rare earth elements doped therein and P is selectively doped in said fibers; and
   introducing excitation light into said fibers, said excitation light being able to excite the rare earth element;
   wherein Al is doped in at least one of said fibers, and the relationship between said P and Al concentrations satisfies the following expression $$C(P)/C(AL) > 2,$$

where,

C(P) is P concentration in said fiber, and

C(AL) is Al concentration in said fiber.

3. A system comprising:
   a first amplifier group including a plurality of first type optical amplifiers, each of said first type optical amplifiers having a first type fiber into which are introduced signal light and excitation light which can excite a rare earth element, said first type fiber including a rare earth element and a dopant therein so as to increase the gain of each of said first type optical amplifiers as the wavelength of the signal light increases within a predetermined wavelength range; and
   a second amplifier group including a plurality of second type optical amplifiers, each of said second type optical amplifiers having a second type fiber into which are introduced the signal light and excitation light which can excite a rare earth element, said second type fiber including a rare earth element and a different dopant therein so as to decrease the gain of each of said second type optical amplifiers as the wavelength of the signal light increases within the predetermined wavelength range,
   wherein said first and second type fibers are connected in series, and
   wherein said first and second type optical amplifiers are optically coupled via optical transmission fibers in series.

4. A system comprising:
   a first amplifier group including a plurality of first type optical amplifiers, each of said first type optical amplifiers having a first type fiber into which are introduced signal light and excitation light which can excite a rare earth element, said first type fiber including a rare earth element and a dopant therein so as to increase the gain of each of said first type optical amplifiers as the wavelength of the signal light increases within a predetermined wavelength range; and
   a second amplifier group including a plurality of second type optical amplifiers, each of said second type optical amplifiers having a second type fiber into which are introduced the signal light and excitation light which can excite a rare earth element, said second type fiber including a rare earth element and a different dopant therein so as to decrease the gain of each of said second type optical amplifiers as the wavelength of the signal light increased within the predetermined wavelength range, wherein said first and second type fibers are connected in series, and wherein said first and second amplifiers are optically coupled via optical fibers in series, wherein said rare earth element in said first type optical fiber is Er, said dopant in said first type optical fiber is Al, said rare earth element in said second type optical fiber is Er, and said different dopant in said second type optical fiber is P.

5. A system accordingly to claim 4, wherein a concentration of Al in said first type optical fiber is 0.1 wt % or more, and a concentration of P in said second type optical fiber is 0.1 wt % or more.

6. A system according to claim 4, wherein said first and second type fibers alternate and are connected in series.

7. A system comprising:

a first amplifier group including one or more first type optical amplifiers, each of said first type optical amplifiers having a first type fiber into which are introduced signal light and excitation light which can excite a rare earth element, said first type fiber including a rare earth element and a dopant therein so as to increase the gain of each of said first type optical amplifiers as the wavelength of the signal light increases within a predetermined wavelength range; and a second amplifier group including one or more second type optical amplifiers, each of said second type optical amplifiers having a second type fiber into which are introduced the signal light and excitation light which can excite a rare earth element, said second type fiber including a rare earth element and a different dopant therein so as to decrease the gain of each of said second type optical amplifiers as the wavelength of the signal light increases within the predetermined wavelength range, wherein said first and second type fibers are connected in series, and wherein said first and second type optical amplifiers are optically coupled via optical transmission fibers in series.

* * * * *